(12) United States Patent
Szeto et al.

(10) Patent No.: US 10,713,594 B2
(45) Date of Patent: Jul. 14, 2020

(54) SYSTEMS, METHODS, AND APPARATUSES FOR IMPLEMENTING MACHINE LEARNING MODEL TRAINING AND DEPLOYMENT WITH A ROLLBACK MECHANISM

(71) Applicant: salesforce.com, inc., San Francisco, CA (US)

(72) Inventors: Kit Pang Szeto, Sunnyvale, CA (US); Simon Chan, Belmont, CA (US)

(73) Assignee: salesforce.com, inc., San Francisco, CA (US)

( * ) Notice: Subject to any disclaimer, the term of this patent is extended or adjusted under 35 U.S.C. 154(b) by 785 days.

(21) Appl. No.: 15/407,147

(22) Filed: Jan. 16, 2017

(65) Prior Publication Data

US 2017/0124487 A1 May 4, 2017

Related U.S. Application Data

(63) Continuation-in-part of application No. 15/404,052, filed on Jan. 11, 2017, now Pat. No. 10,192,172,
(Continued)

(51) Int. Cl.
*G06N 20/00* (2019.01)
*G06F 11/14* (2006.01)
*G06Q 30/02* (2012.01)

(52) U.S. Cl.
CPC ......... *G06N 20/00* (2019.01); *G06F 11/1448* (2013.01); *G06Q 30/0204* (2013.01)

(58) Field of Classification Search
None
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

Ahsan et al., Impact Analysis of SCRs using Single and Multi-Label Machine Learning Classification, ESEM10, Sep. 16-17, 2010, Total pp. 4 (Year: 2010).*
(Continued)

*Primary Examiner* — Alan Chen
(74) *Attorney, Agent, or Firm* — Elliot, Ostrander & Preston, P.C.

(57) ABSTRACT

In accordance with disclosed embodiments, there are provided systems, methods, and apparatuses for implementing machine learning model training and deployment with a rollback mechanism within a computing environment. For example, an exemplary machine learning platform includes means for receiving training data as input at the machine learning platform, in which the training data includes a multiple transactions, each of the transactions specifying a plurality of features upon which to make a prediction and a label representing a correct answer for the plurality of features according to each respective transaction; specifying a model to be trained by the machine learning platform using the training data, in which the model includes a plurality of algorithms and source code; generating a new predictive engine variant by training the model to algorithmically arrive upon the label representing the correct answer as provided with the training data based on the plurality of features for each of the multiple transactions; versioning the new predictive engine variant based at least on the time the new predictive engine variant was generated a version of the source code utilized within the model and the training data received as input; deploying the new predictive engine variant into a production environment to replace a prior version of the predictive engine variant; and rolling back the
(Continued)

new predictive engine variant from the production environment to a specified version which is less than a version of the new predictive engine variant. Other related embodiments are disclosed.

25 Claims, 34 Drawing Sheets

Related U.S. Application Data which is a continuation of application No. 14/997,662, filed on Jan. 18, 2016, now abandoned, which is a continuation of application No. 14/797,125, filed on Jul. 11, 2015, now Pat. No. 9,269,095, which is a continuation of application No. 14/684,418, filed on Apr. 12, 2015, now Pat. No. 9,135,559.

(60) Provisional application No. 62/279,755, filed on Jan. 16, 2016, provisional application No. 62/136,311, filed on Mar. 20, 2015.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,389,277 B2 | 6/2008 | Chen et al. |
| 7,480,640 B1 | 1/2009 | Elad et al. |
| 7,620,655 B2 | 11/2009 | Larsson et al. |
| 7,949,552 B2 | 5/2011 | Korenblit et al. |
| 7,953,692 B2 | 5/2011 | Bower et al. |
| 8,010,337 B2 | 8/2011 | Narayanan et al. |
| 8,706,750 B2 | 4/2014 | Hansson et al. |
| 9,135,559 B1 | 9/2015 | Chan et al. |
| 9,171,253 B1 * | 10/2015 | Wright .................... G06N 5/02 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0234761 A1 * | 10/2005 | Pinto .................... G06F 17/50 705/7.28 |
| 2008/0028364 A1 * | 1/2008 | Triou .................... G06F 11/3676 717/104 |
| 2008/0086730 A1 | 4/2008 | Vertes |

(56) References Cited

U.S. PATENT DOCUMENTS

| | | | |
|---|---|---|---|
| 2008/0126273 A1* | 5/2008 | Carus | G06N 20/00 706/12 |
| 2009/0177744 A1 | 7/2009 | Marlow et al. | |
| 2011/0040612 A1 | 2/2011 | Simmons et al. | |
| 2012/0284069 A1 | 11/2012 | Kemp | |
| 2014/0090061 A1* | 3/2014 | Avasarala | G06F 21/56 726/24 |
| 2014/0280193 A1 | 9/2014 | Cronin et al. | |
| 2014/0344193 A1 | 11/2014 | Bilenko et al. | |
| 2015/0339572 A1* | 11/2015 | Achin | G06N 5/02 706/46 |
| 2015/0379429 A1* | 12/2015 | Lee | G09B 5/00 706/11 |
| 2016/0034270 A1* | 2/2016 | Swierc | G06F 11/3668 717/126 |
| 2016/0182553 A1* | 6/2016 | Tripp | H04L 63/1433 726/25 |
| 2016/0260023 A1* | 9/2016 | Miserendino, Jr. | G06N 20/00 |
| 2019/0213252 A1* | 7/2019 | Simard | G06F 3/0482 |

OTHER PUBLICATIONS

Chan, S., "PredictionIO—A Machine Learning Server in Scala," talk presented in San Francisco, CA, on Feb. 9, 2015. Available at https://www.hakkalabs.co/articles/predictionio-build-deploy-ml-applications-fraction-time, 12 pages.

Chan, S., et al., "Continuous Hyperparameter Optimization for Large-scale Recommender Systems," Proceedings of the IEEE International Conference on Big Data, California, US, Oct. 2013, 9 pages.

Chan, S., Thomas Stone, Kit Pang Szelo, and Ka Hou Chan. "PredictionIO: A Distributed Machine Learning Server for Practical Software Development." Proceedings of the ACM Conference of Information and Knowledge Management (CIKM). California, US, Oct. 2013, 3 pages.

Cloudera, Inc., "The Platform for Big Data and the Leading Solution for Apache Hadoop in the Enterprise-Cloudera," Cloudera website, available at http://www.cloudera.com/content/cloudera/en/home.html. Accessed on Apr. 12, 2015, 2 pages.

DataRobot, Inc.,"DataRobot—Better Predictions. Faster," DataRobot, http://www.datarobot.com, accessed on Apr. 12, 2015, 4 pages.

Dato, "Dato-Fast, Scalable Machine Learning Platform," Dato, https://dato.com, accessed on Apr. 12, 2015, 12 pages.

GitHub, Inc., "Cloudera/oryx . GitHub," Cloudera Oryx at GitHub, available at https://github.com/cloudera/oryx Accessed on Apr. 12, 2015, 7 pages.

Komer, B. et al., "Hyperopt-sklearn: Automatic hyperparameter configuration for scikit-learn," Proceedings of the 13th Python in Science Conference (SCIPY), 2014, 7 pages.

Low, Y., "GraphLab: A Distributed Abstraction for Large Scale Machine Learning," PhD dissertation, Carnegie Mellon University, Pittsburgh, PA, US, Jun. 2013, 122 pages.

Low, Y., et al., "Graphlab: A distributed framework for machine learning in the cloud," arXiv preprint, arXiv:1107.0922, 2011, 14 pages.

Low, Y., et al., "Distributed GraphLab: A framework for machine learning and data mining in the cloud," Proceedings of the VLDB Endowment 5, No. 8, 2012, pp. 716-727.

Low, Y., et al., "Graphlab: A new framework for parallel machine learning," arXiv preprint, arXiv:1408.2041, 2014, 10 pages.

Pedregosa, F., et al. "Scikit-learn: Machine learning in Python," The Journal of Machine Learning Research 12, pp. 2825-2830, 2011.

Sato, M., "Online model selection based on the variational bayes," Neural Computation, vol. 13, No. 7, 2001, pp. 1649-1681.

Skytree, Inc., "Platform-Skytree," Skytree Infinity website, available at http://www.skytree.net/products/skytree-infinity/platform/ Accessed on Apr. 12, 2015, 3 pages.

Yhat, "Yhat-Data Science Operations Platform," Yhat website, available at https://yhathq.com/ Accessed on Apr. 12, 2015, 4 pages.

International Search Report and Written Opinion for Application No. PCT/US2016/023028 dated Aug. 5, 2016, 14 pages.

* cited by examiner

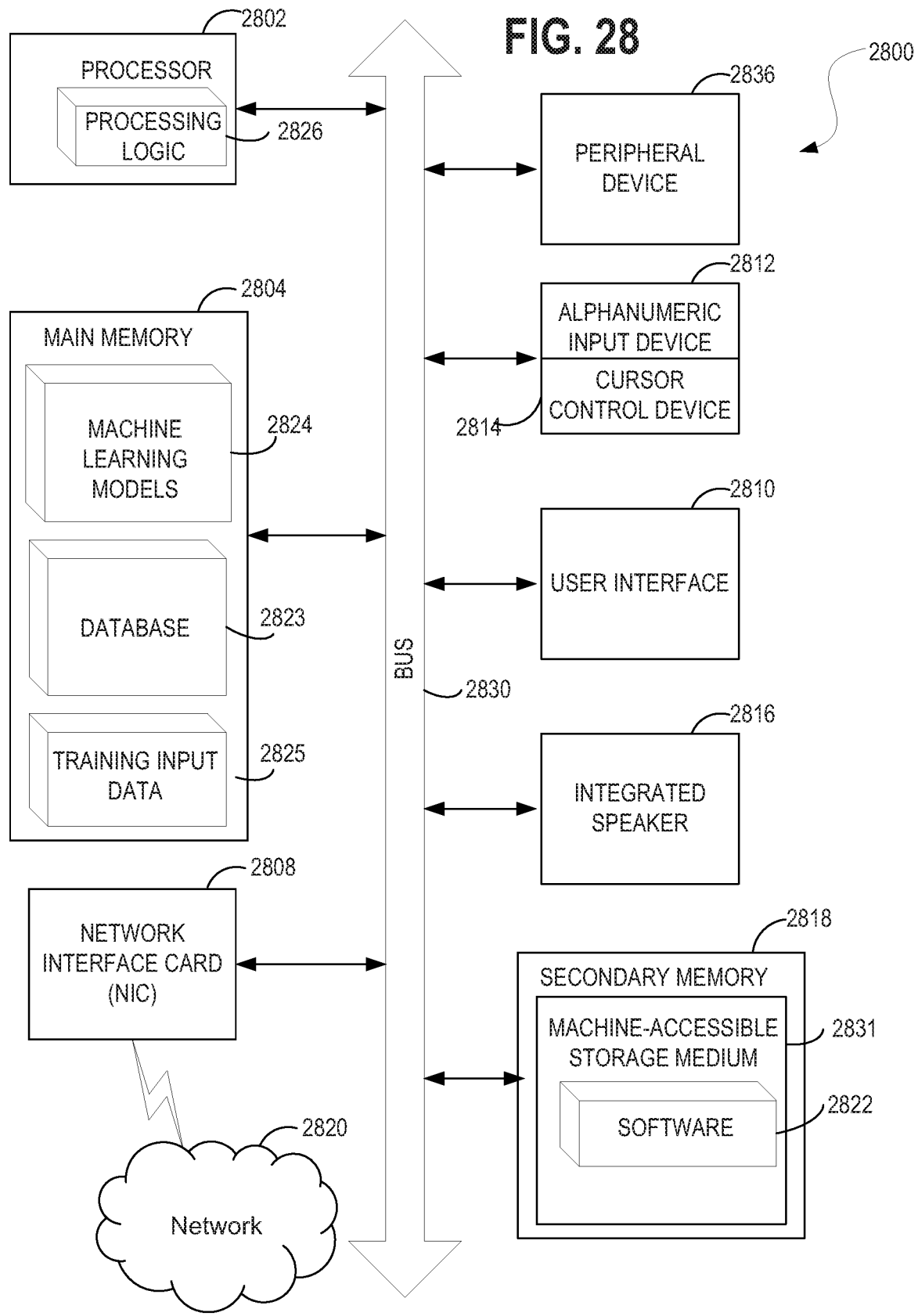

SYSTEMS, METHODS, AND APPARATUSES FOR IMPLEMENTING MACHINE LEARNING MODEL TRAINING AND DEPLOYMENT WITH A ROLLBACK MECHANISM

CLAIM OF PRIORITY

This utility patent application is a non-provisional of, and claims priority to, the provisional utility application entitled "METHODS AND SYSTEMS FOR MACHINE LEARNING MODEL MANAGEMENT," filed on Jan. 16, 2016, identified as U.S. Provisional Patent Application No. 62/279,755, and this application is also a Continuation-In-Part (CIP) patent application of, and claims priority to, U.S. patent application Ser. No. 15/404,052, filed Jan. 11, 2017, now pending, which is a continuation of, and claims priority to, U.S. patent application Ser. No. 14/997,662, filed Jan. 18, 2016, now pending, which is a continuation of, and claims priority to, U.S. patent application Ser. No. 14/797,125, filed Jul. 11, 2015, which issued as U.S. Pat. No. 9,269,095, which is a continuation of, and claims priority to, U.S. patent application Ser. No. 14/684,418, filed Apr. 12, 2015, which issued as U.S. Pat. No. 9,135,559, which is a non-provisional utility patent which claims the benefit of provisional U.S. Patent Application No. 62/136,311, filed Mar. 20, 2015, the entire contents of each being incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Disclosed embodiments relate to the field of computing, and more particularly, to systems, methods, and apparatuses for implementing machine learning model training and deployment with a rollback mechanism within a computing environment such as a database system implementation supported by a processor and a memory to execute such functionality. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section shall not be assumed to be prior art merely as a result of its mention in the background section. Similarly, a problem mentioned in the background section or associated with the subject matter of the background section are not to be assumed as having been previously recognized in the prior art. The subject matter in the background section merely represents different approaches, which in and of themselves may also correspond to the claimed embodiments.

Machine learning systems analyze data and establish models to make predictions and decisions. Examples of machine learning tasks include classification, regression and clustering. A predictive engine is a machine learning system that typically includes a data processing framework and one or more algorithms trained and configured based on collections of data. Such predictive engines are deployed to return prediction results upon request. A simple example is a recommendation engine for suggesting a certain number of products to a customer based on pricing, product availabilities, product similarities, current sales strategy, and other factors. Such recommendations may be personalized to a specific user by taking into account user purchase history, browsing history, geographical location, or other user preferences or settings. Exemplary software tools for building machine learning systems include Apache Spark MLlib, Apache Mahout™, scikit-learn, and R.

With the advent of big data analytics there is heightened interest in the design of machine learning systems and smart applications. However, even with the wide availability of processing frameworks, algorithm libraries, and data storage systems, various issues exist in bringing machine learning applications from prototyping into production. In addition to data integration and system scalability, real-time deployment of predictive engines in a possibly distributed environment requires dynamic query responses, live model update with new data, inclusion of business logics, and most importantly, intelligent and possibly live evaluation and tuning of predictive engines to update the underlying predictive models or algorithms to generate new engine variants.

Certain software solutions provide tools for building machine learning systems as encapsulated solutions. Unfortunately, such encapsulations, while facilitating fast integration into deployment platforms and systems, also make it difficult to identify causes for inaccurate prediction results and also make it difficult to extensively track sequences of events that trigger particular prediction results.

As the number of models employed and data analyzed continues to grow, there is a need for a systematic model management platform to streamline the logistics of training and severing up predictive models to multiple users as well as the need for model collection and maintenance, including the reproduction of historical models for auditing, debugging, delayed evaluation and state rollback with automatic version control and tracking.

The present state of the art may therefore benefit from the systems, methods, and apparatuses for implementing machine learning model training and deployment with a rollback mechanism within a computing environment as is described herein which address the previously unsolved need for easy and efficient creation, deployment, evaluation, and tuning of machine learning systems for developers and data scientists.

BRIEF DESCRIPTION OF THE DRAWINGS

Embodiments are illustrated by way of example, and not by way of limitation, and will be more fully understood with reference to the following detailed description when considered in connection with the figures in which:

FIG. 28 illustrates a diagrammatic representation of a machine in the exemplary form of a computer system, in accordance with one embodiment.

DETAILED DESCRIPTION

Figure 1A:
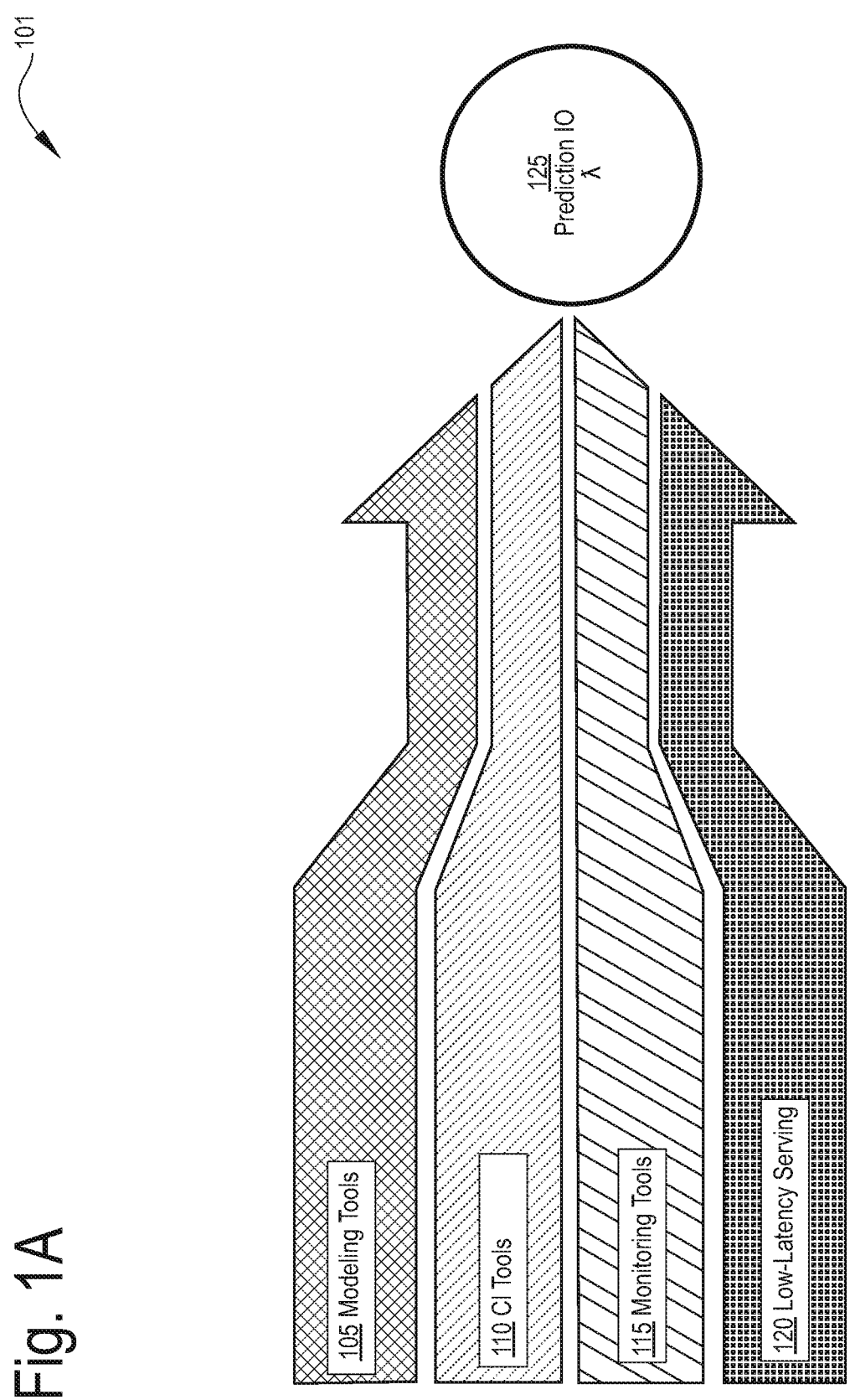
FIG. 1A depicts an exemplary stack integration diagram in accordance with described embodiments.

Described herein are systems, methods, and apparatuses for implementing machine learning model training and deployment with a rollback mechanism within a computing environment. An exemplary system machine learning platform may include, for example, means for: receiving training data as input at the machine learning platform, in which the training data includes a multiple transactions, each of the transactions specifying a plurality of features upon which to make a prediction and a label representing a correct answer for the plurality of features according to each respective transaction; specifying a model to be trained by the machine learning platform using the training data, in which the model includes a plurality of algorithms and source code; generating a new predictive engine variant by training the model to algorithmically arrive upon the label representing the correct answer as provided with the training data based on the plurality of features for each of the multiple transactions; versioning the new predictive engine variant based at least on the time the new predictive engine variant was generated a version of the source code utilized within the model and the training data received as input; deploying the new predictive engine variant into a production environment to replace a prior version of the predictive engine variant; and rolling back the new predictive engine variant from the production environment to a specified version which is less than a version of the new predictive engine variant.

According to certain embodiments there are means for building and deploying machine learning systems for predictive analytics. Certain embodiments relate to creating, evaluating, and tuning predictive engines in production. Other embodiments relate to replaying the performance of predictive engines for predictive engine design and analysis. Such predictive engines may include one or more predictive models which are trained on collected data for predicting future user behaviors, future events, or other desired information. Such prediction results are useful in various business settings such as in marketing and sales. Disclosed embodiments enable customization of engine components targeted for specific business needs, allow for systematic evaluation and tuning of multiple engines or engine variants, and provide means by which to replay engine performances during or after the evaluation and tuning processes. Additional embodiments enable a rollback mechanism, for instance to a specific previously known version or to the prior version available within a model repository. Such a rollback mechanism is beneficial when a newer version of a trained model is not performing as expected or yields sub-par results in comparison to a previously known and utilized version of the trained model.

Definitions

Several definitions are provided to assist in understanding the disclosed embodiments. Such definitions are not to be read as restricting the scope of the presently claimed embodiments, but rather, viewed as illustrative and shall thus provide a greater context for richer understanding of the disclosed embodiments. Any of the terms defined below may be utilized in the form of nouns, verbs or adjectives, within the scope of the definitions.

"Prediction engine" and "predictive engine" refer to program code components that are used to make predictions, for example, of how a user might behave given certain inputs. The terms "prediction" and "predictive" are used interchangeably in this description.

"Data source" refers to a component of a predictive engine for reading data from one or more source(s) of data storage, wherein the data could be training data, test data, real data, live data, historical data, simulated data, and so forth.

"Data preparator" refers to a component of a predictive engine for automatic preprocessing of data from any data source, possibly into a desired format. The data preparator prepares and cleanses data according to what the predictive engine expects.

"Algorithm" refers to an algorithmic component of a predictive engine for generating predictions and decisions. The Algorithm component includes machine learning algorithms, as well as settings of algorithm parameters that determine how a predictive model is constructed. A predictive engine may include one or more algorithms, to be used independently or in combination. Parameters of a predictive engine specify which algorithms are used, the algorithm parameters used in each algorithm, and how the results of each algorithm are congregated or combined to arrive at a prediction engine result, also known as an output or prediction.

"Serving" component refers to a component of a predictive engine for returning prediction results, and for adding custom business logic. If an engine has multiple algorithms, the Serving component may combine multiple prediction results into one.

"Evaluator" or "Evaluation" component refers to a component of a predictive engine for evaluating the performance of the prediction process to compare different algorithms as well as different engine variants.

"DASE" is an acronym for Data (including Data source and Data preparator), Algorithm (including algorithm parameters), Serving, and Evaluation components, as defined above. All DASE inputs are customizable.

"Engine variant", "variant", and "predictive engine variant" refer to a deployable instance of a predictive engine, specified by a given engine parameter set. An engine parameter set includes parameters that control each component of a predictive engine, including its Data Source, Data Preparator, Algorithm, Serving, and/or Evaluator components.

"Query" and "Q" is a request from an end-user or end-user device for information. For example, a recommendation for a product, a recommended product and its associated price, or other data to be served to the end-user. A query can be seen as an explicit or implicit request for one or more predictive results.

"Predicted result", "prediction result", and "P" is a prediction made by a prediction engine. For example, a predicted result could be an end-user purchasing a given recommended product.

"Actual result" and "A" includes correct values, actual events, as well as user actions or "subsequent end-user behaviors." Actual results can be correct values to predictive problems such as classifications, actual outcomes or results of future events, and/or any user actions or behaviors from the end-user device specifying what the end-user has done in response to a prediction result provided in response to a query, and so on. Actual results include actual outcomes in the case of a prediction engine predicting actual events. For example, if a prediction engine is used to predict whether a tree will fall down within 24 hours, the "actual result" will be the correct value of whether that particular tree actually falls down within the predicted time period. In addition, actual results also include any subsequent end-user behaviors, including but not limited to, purchasing the recommended product, clicking on various locations on the end-user device, performing various actions on the end-user application, and so forth. If P=A for a given Q, then it is considered an excellent prediction. The deviation of P from A can be used to define a metric of the accuracy or correctness of a given prediction engine for a given Q.

"End-user" or simply "user" are users of an end-user application that is being implemented and tested using the prediction engine. In one embodiment, the end-users are consumers who utilize a consumer application that is employing a prediction engine to serve recommendations to the end-user using the consumer application.

"Operators" are system users who replay prediction scenarios during evaluation. An operator uses a replay system or product, and may be a developer of predictive engines. An operator, in contrast to an ordinary end-user, may be a software developer, a programmer, and/or a data scientist.

"Prediction Score" and "Prediction Score of a Query" is a value that represents the prediction performance of a deployed engine variant for a given query. A prediction score is calculated by at least one pre-defined or operator-defined score function, based on prediction result(s) and actual result(s) associated with the query.

"Replay Groups" refer to segments of queries that may be created with query segment filters, examples of which include engine variant filter, user attribute filter, item attribute filter, query attribute filter, and other conditional filters capable of selecting a subset of available queries for performance analysis and monitoring.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary stack integration diagram 101 in accordance with described embodiments.

More particularly, FIG. 1A depicts the integration of modeling tools 105, continuous integration (CI) tools 110 providing the ability to merge all developer working copies to a shared mainline throughout the day, along with monitoring tools 115, and low-latency (or real-time) serving 120 capability with the predictionIO λ 125 platform in accordance with described embodiments. Such integration supports third party platforms and utilities such as NumPy, SciPy, matplotlib, IPython interactive computing IP[y]: platform, Spark, R, and pandas, among others.

Through such a machine learning management platform it is possible to provide continuous delivery from the data science laboratory into a production environment, with the integration providing capability for model and versioning as well as release management, which facilities the reproduction of historical data models for auditing, debugging, delayed evaluation, and state rollback capabilities with automated versioning control and tracking. Further enabled is continuous evaluation and monitoring which ensures that newly trained models meet pre-defined business and production requirements through the seamless integration with existing continuous integration (CI) tools 110 and alerting systems and monitoring tools 115. Still further provided is multi-tenant support for Enterprise Software as a service (SaaS) and other on-demand, service based, or cloud computing regimes, thus streamlining the logistics of training and serving predictive models for multiple customers within any given application.

Figure 1B:
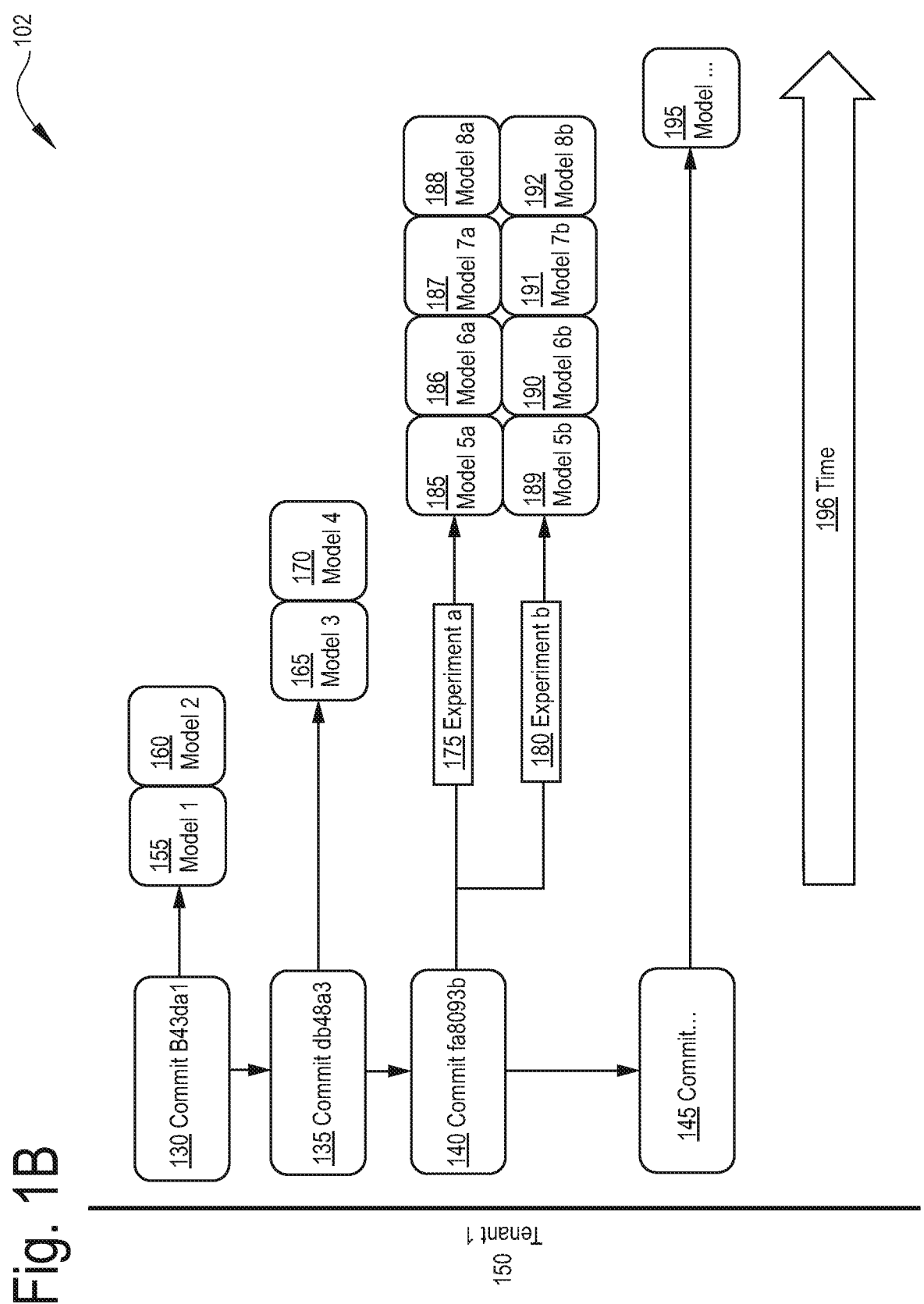
FIG. 1B depicts an exemplary machine learning deployment scenario using PredictionIO Lambda in accordance with described embodiments.

FIG. 1B depicts an exemplary machine learning deployment scenario 102 using PredictionIO Lambda in accordance with described embodiments.

PredictionIO Lambda provides an enterprise-grade machine learning model management software that integrates with existing software control management systems and continuous integration (CI) infrastructure. According to various embodiments, PredictionIO is agnostic to the underlying machine learning technology stack and programming language, allowing developers to manage their models as produced by different technologies and environments.

For instance, as depicted by FIG. 1B, there is a Tenant 1 at element 150 which owns a repository containing machine learning code that produces models. As shown here, there is a commit 130 process versioned B43da1 which outputs model 1 at element 155 and model 2 at element 160. However, subsequent commit process 135 db48a3 outputs model 3 at element 165 and model 4 at element 170.

Described embodiments and use of the PredictionIO or machine learning platform permits the platform to associate itself with tenant and the underlying versioning repository, from which users may then run code from different commit processes 130 and 135 to produce varying models, such as models 1-4 at elements 155, 160, 165, and 170 as depicted here.

According to additional embodiments there is support provided for experiments using any existing or new commit processes. For instance, developers and certain advanced users can define multiple data sources and multiple experiments to be run in parallel, as is depicted here, with commit process 140 versioned fa8093b being utilized to run experiment a at element 175 and experiment b at element 180, each running in parallel in time 196 and thus outputting models 5a and 5b (elements 185 and 189) and models 6a and 6b (elements 186 and 190) and models 7a and 7b (elements 187 and 191) and lastly models 8a and 8b (elements 188 and 192).

Subsequent to the various experiments, a user or developer may then leverage the PredictionIO or machine learning platform to tune and finalize their configuration resulting in commit process 145 which then yields their final chosen model 195 which may then be released into a production environment.

According to described embodiments, further features provided include model version control such that use of the PredictionIO or machine learning platform to generate machine learning models results in a specific generated prediction engine variant such that user may precisely identify exactly which software version was utilized to generate any given model as well as time stamping and other time identifiers indicating when the particular model was generated and exactly what experiment was run and what training data source or sources were utilized in the generation of that particular model. Still further provided are the tenant or customer organization associated with every model created utilizing the PredictionIO or machine learning platform such that back end systems and other customer GUI's may readily identify relevant models for any particular user based on associations between the user and the customer organization to which the user belongs along with which prediction engine variants and generated models have been created and stored for that particular customer organization.

The PredictionIO or machine learning platform additionally leverages existing infrastructure to control model evaluation and deployment such that developers may utilize existing version control tools and interfaces. Developers may further execute multiple evaluations, experiments, and specify multiple deployments simultaneously, including deployment of multiple concurrent or simultaneous experiments on live or simulated or historical data depending upon the particular needs of the developer.

Where necessary, developers are further enabled to control evaluation and deployment schedules including scheduling future (e.g., non-real-time) deployments and specify alerts to be triggered upon any evaluation that fails to meet expectations according to one or more pre-specified conditions or comparisons, such as A/B testing and comparisons for determining which of multiple prediction engine variants are yield the best results according to the developer's specified criteria. Scheduling of future deployments further includes the automated deployment of new yet to be created models once those models are generated and have passed evaluations as defined by the developer.

Multi-tenancy is natively supported by the PredictionIO or machine learning platform including the ability for administrators to quickly and easily clone any existing tenant to a new one to handle any special needs and corner cases.

The PredictionIO or machine learning platform additionally integrates directly into third-party version control systems such as Git, and continuous integration infrastructure such as Jenkins.

According to described embodiments, the PredictionIO or machine learning platform includes a server component which operates as a bookkeeper for all model information accessible by the PredictionIO or machine learning platform system implementation. According to such embodiments, the server component centralizes its information to a SQL and/or NoSQL type database. According to certain embodiments, the PredictionIO or machine learning platform server requires access to the continuous integration infrastructure being utilized so as to function correctly.

With the various implementation requirements having been satisfied, starting the PredictionIO or machine learning platform server involves issuing the following exemplary shell command $LAMBDA_INSTALL_DIR/bin/lambda-server, where the term $LAMBDA_INSTALL_DIR is the installation location of the PredictionIO or machine learning platform. The platform server will listen on a networked port and accept commands from command-line interface clients.

Initializing the PredictionIO or machine learning platform within a source code repository, such as Git, involves moving to the desired directory for a code repository and then executing the command lambda init my-text-cls, such that the PredictionIO or machine learning platform will then create for the current code repository within that chosen directory a new tenant named "my-text-cls". Once initialized, all subsequent PredictionIO or machine learning platform commands will be automatically associated with the specified name.

Checking or inspecting status of the PredictionIO or machine learning platform once a code repository has been associated with PredictionIO or machine learning platform simply requires execution of the command lambda status, which will return exemplary output such as the following:

Project ID: my-text-cls
Default Repo: git@github.com:myusername/textcls.git
Default Branch: master
Schedule (cron):
Schedule (scm):
Git Commit: 8037562633ccdb71fd0e2efb808f9cb0dce6bbea
Eval Command: (blank)
=> (no result)

This exemplary status indicates successful initiation of a blank PredictionIO Lambda project within the previously specified code repository where the initialization command (init) was executed.

Once initialized, evaluations may be performed or added to under the management of the PredictionIO or machine learning platform by executing the add evaluation command abbreviated as "aec", as follows: lambda aec "python nb.py". Execution of such a command creates a new evaluation based on the quoted Python command. If the lamda status check is now executed again, the user may verify that one evaluation is now under the management of the PredictionIO or machine learning platform, as follows:

Project ID: my-text-cls
Default Repo: git@github.com:myusername/textcls.git
Default Branch: master
Schedule (cron):
Schedule (scm):
Git Commit: 8037562633ccdb71fd0e2efb808f9cb0dce6bbea
Eval Command: python nb.py
=> (no result)

Similarly, removing an evaluation is performed by running the remove evaluation command which is abbreviated "rec" as follows: lambda rec "python nb.py", thus causing the specified evaluation passed with the quoted Python command will be removed.

Running all managed evaluations is then performed by executing the command, lambda eval, which will then cause the PredictionIO or machine learning platform to reference and utilize the previously associated continuous integration infrastructure to run all managed evaluations. If the lambda status is then checked again via the command lambda status, then exemplary output may appear as follows:

Project ID: my-text-cls
Default Repo: git@github.com:myusername/textcls.git
Default Branch: master
Schedule (cron):
Schedule (scm):
Git Commit: 8037562633ccdb71fd0e2efb808f9cb0dce6bbea
Eval Command: python nb.py
=> (in queue) Tue Jan. 5 09:37:12 2016-0800

Upon completion of the evaluations, checking status via the command lambda status, will then provide exemplary output as follows:

Project ID: my-text-cls
Default Repo: git@github.com:myusername/textcls.git
Default Branch: master
Schedule (cron):
Schedule (scm):
Git Commit: 8037562633ccdb71fd0e2efb808f9cb0dce6bbea
Eval Command: python nb.py
Model ID: my-text-cls-eval--8b447c8b-1
=> SUCCESS Thu Jan. 7 21:08:50 2016-0800

As noted above, it is further permissible to execute multiple simultaneous or concurrent evaluations via the PredictionIO or machine learning platform simply by executing additional lambda aec commands, which will then yield status as follows:

Project ID: my-text-cls
Default Repo: git@github.com:myusername/textcls.git
Default Branch: master
Schedule (cron):
Schedule (scm):
Git Commit: 8037562633ccdb71fd0e2efb808f9cb0dce6bbea
Eval Command: python nb.py
Model ID: my-text-cls-eval--8b447c8b-1
=> SUCCESS Thu Jan. 7 21:08:50 2016-0800
Eval Command: python svm.py
=> (no result)

With multiple evaluations now having been added via the lambda aec command, executing lambda eval again, will cause both evaluations to run in parallel, or however many evaluations have been added if more than two.

As stated above, future scheduling of evaluation runs is additionally supported, as are periodic runs as is execution through the underlying continuous integration infrastructure, for instance, simply by instructing the PredictionIO or machine learning platform to execute the following exemplary periodic repeating 5 minute command execution: lambda schedule "H/5 * * * *".

It is also possible to automate the execution of evaluations such that they are checked and evaluations are run only when there is a code change detected, for instance, by executing the following command, lambda schedule "H * * * *" s cm, the PredictionIO or machine learning platform will detect whether or not a code change is present by checking the repository every hour.

Numerous data sources may be utilized with the PredictionIO or machine learning platform providing a highly versatile platform upon which to schedule and run multiple evaluations in parallel with a single command. For instance, by defining x data sources and y evaluations, running the evaluation command will automatically run all x times y evaluations in parallel in a fully automated fashion, with each of the evaluations being a unique combination of a particular data source and a particular command.

For instance, consider a developer seeking to run the same evaluation command on two different data sources. The developer will first define two data sources via the lamda datasource add command, as follows:

lambda datasource add data1 training1.csv
lambda datasource add data2 training2.csv In a similar manner, the developer may remove a data source by executing the command: lambda datasource remove data2.

In the examples used here, the data sources reside within the global scope and are therefore manually associated with the respective project, as follows:

lambda aeds data1
lambda aeds data2

Upon completion of the above commands, checking status via the command lambda status, will then provide exemplary output as follows:

Project ID: my-text-cls
Default Repo: git@github.com:myusername/textcls.git
Default Branch: master
Schedule (cron):
Schedule (scm):
Git Commit: 8037562633ccdb71fd0e2efb808f9cb0dce6bbea
Eval Data Source: data1
Eval Command: python nb.py
=> SUCCESS Thu Jan. 7 21:08:50 2016-0800
Model ID: my-text-cls-eval-data1-8b447c8b-1
Eval Command: python svm.py
=> (no result)
Eval Data Source: data2
Eval Command: python nb.py
=> (no result)
Eval Command: python svm.py
=> (no result)

Execution of the lambda eval command will then launch four evaluation runs for parallel execution.

All present data sources may be listed at any time via the lambda datasource list command, which will provide output such as follows:

Data Source ID: data1
Value: training1.csv
Data Source ID: data2
Value: training2.csv Deployment of a selected prediction engine variant or other model created via the PredictionIO or machine learning platform is then performed similar to evaluations except that only one command is utilized and there is no data source to be associated with the deployment.

Thus, for adding a deployment, the following exemplary command may be utilized: lambda adc "python deploy_model.py".

Upon completion of the above commands, checking status via the command lambda status, will then provide exemplary output as follows:

Project ID: my-text-cls
    Default Repo: git@github.com:myusername/textcls.git
    Default Branch: master
Schedule (cron):
Schedule (scm):
    Git Commit: 8037562633ccdb71fd0e2efb808f9cb0dce6bbea
Eval Data Source: data1
    Eval Command: python nb.py
    => SUCCESS Thu Jan. 7 21:08:50 2016-0800
    Model ID: my-text-cls-eval--8b447c8b-1
    Eval Command: python svm.py
    => (no result)
Eval Data Source: data2
    Eval Command: python nb.py
    => (no result)
    Eval Command: python svm.py
    => (no result)
    Deploy Command: python deploy_model.py
    => (no result)

Similar to evaluation, deployments are then initiated by executing the following command: lambda deploy. In the event it becomes necessary to perform a rollback of a deployed prediction engine variant or a deployed trained machine learning model, it is permissible to do so via the following command: lambda deploy <previous_model_id>. Unlike previously known platforms, the PredictionIO or machine learning platform tracks every instance and variant of created prediction engine variants and trained machine learning models associated with any given code base including the version of the software, the time, the tenant, organizational ID, and data sources utilized in its creation, and provides a unique ID for the deployment. Consequently, it is possible to downrev or rollback a deployed model simply by re-deploying the appropriate previous_model_id for the model in question.

Inspecting run logs for deployed models may be performed via the following command: lambda model log <model_id>, which will then yield the following exemplary output:
+python nb.py
Accuracy: 0.911451398136

|  | precision | recall | f1-score | support |
|---|---|---|---|---|
| alt.atheism | 0.95 | 0.81 | 0.88 | 319 |
| comp.graphics | 0.87 | 0.98 | 0.92 | 389 |
| sci.med | 0.96 | 0.88 | 0.92 | 396 |
| soc.religion.christian | 0.90 | 0.95 | 0.92 | 398 |
| avg/total | 0.92 | 0.91 | 0.91 | 1502 |

Finished: SUCCESS

It is additionally permissible to perform a lambda model log without a model ID argument, in which case logs of all latest runs of the current repository commit will be displayed, possibly generating a large amount of output, but which may be captured to a file or other data store for later analysis or archiving at the discretion of the developer.

Listing models available, such as all models having been generated via any datasource, any selected algorithm, and any given software version, is performed via the following command: lambda model list, in which case the PredictionIO or machine learning platform which keeps track of all models produced by all evaluation and deployment runs will simply output all known models, providing output similar to the following example:

my-text-cls eval models
    Model ID: my-text-cls deploy-data1-8b447c8b-3
    Run Result: SUCCESS
Run Start Time: Mon Jan. 4 12:30:44 2016-0800
    Model ID: my-text-cls deploy-data1-8b447c8b-2
    Run Result: SUCCESS
Run Start Time: Mon Jan. 4 12:30:07 2016-0800
    Model ID: my-text-cls deploy-data1-8b447c8b-3
    Run Result: SUCCESS
Run Start Time: Mon Jan. 4 12:25:27 2016-0800

Additionally, evaluation models may be inspected via the following command: lambda model list eval.

Support for multi-tenancy is provided by the PredictionIO or machine learning platform, thus enabling different tenants to define multiple projects within the same code repository. The lambda clone command permits the quick replication of any given setup for a project with the exception of models, by executing the following command: lambda clone alice-text-cls, where the passed parameter "alice-text-cls" represents the project to be replicated or cloned for another tenant. Once cloned, the developer may again list the available projects via the lamda list command, which will then output:
    lambda list
    * alice-text-cls
    my-text-cls Upon completion of the above commands, checking status via the command lambda status, will then provide exemplary output as follows:
    Project ID: alice-text-cls
    Default Repo: git@github.com:myusername/textcls.git
    Default Branch: master
Schedule (cron):
Schedule (scm):
    Git Commit: 8037562633ccdb71fd0e2efb808f9cb0dce6bbea
Eval Data Source: data1
    Eval Command: python nb.py
    => (no result)
    Eval Command: python svm.py
    => (no result)
Eval Data Source: data2
    Eval Command: python nb.py
    => (no result)
    Eval Command: python svm.py
    => (no result)
Deploy Command: python deploy_model.py
    => (no result)

Because the runs and models of different projects are completely isolated, the developer may wish to switch between tenants by executing the following command: lambda switch my-text-cls, which will change context for the tenancy associated with the project in question in the event that a single developer needs to work on multiple different tenant projects.

The PredictionIO or machine learning platform knows a set of system variables and substitutes them with appropriate values as necessary so as to enable user interaction with the data source and model version control system.

According to described embodiments, various models are built to analyze data, process data and produce or generate what are referred to as predictive models, predictive engines, prediction engines, or trained machine learning recommendation models which are then utilized to output predictions about possible future outcomes and behaviors.

Consider for instance a recommendation model having been created through such machine learning techniques. An application may then utilize the trained recommendation model to inquire, for example, for a given user, what products will this user likely purchase or what products would be most beneficial to recommend to such a user. The trained recommendation model will then output a purchase prediction or a recommendation for what products to display to such a user as a recommendation. In the context of fraud detection, a trained model may be requested to render a prediction as to whether or not a given transaction is fraudulent or not fraudulent, and approval or denial of such a transaction may then be based upon that recommendation.

Such trained models are updated regularly as new data comes in from actual user experiences and actual transaction data and it is desirable to train a new model periodically based on such data. For instance, perhaps 30 days worth of new data may be utilized to train or re-train a given prediction model. A week later, still more data is available and so the developers may seek to again train the model using the new week's worth of additional data, or train the model with a month and a week's worth of data, or simply train the model using only the least 1-week period worth of data. Alternatively, the developers may simply seek to train the model utilizing a different range of data.

Regardless of the reasons or period selected, a new model is created with different data from before and will therefore have different machine learning and therefore different predictive results. Certain model updates include simply updating the model as new data becomes available in real time whereas other update schemes involve batch updates, such as daily, or every 12 hours, and so forth.

Regardless, there will be multiple models and multiple predictive engine variants created, each having differing predictive behaviors. It is therefore in accordance with the described embodiments that the many different versions created over time are tracked and maintained in a way that the developers may differentiate between the many variants and if necessary, even roll back or down-rev a given deployed model, such as in the case of having trained the model or updated a trained model with bad data or with new data which yields unacceptable performance results.

For example, in the case of automated batch updates or real-time training updates it is possible that some anomaly in the data is introduced which through the machine learning process causes the trained predictive engine to yield predictions, recommendations, and other results that while algorithmically valid and mathematically accurate in terms of the machine learning process, nevertheless yield results which are not suitable for real world applications. It is also possible that a re-training process is performed with bad or erroneous source data which thus yields an unsuitably trained prediction engine. It is also possible that a newly trained model or an updated model is corrupted in some way.

Regardless of how or why the trained model is trained on the erroneous or simply unsuitable data or why the trained model is not suitable for production, the reality is that a trained model may need to be down-revisioned or rolled back to a prior or earlier engine variant.

It is therefore in accordance with described embodiments that every time an update, batch update, or other type of model training occurs, a version for that resulting prediction engine variant is produced such that earlier variants of models may be unambiguously referenced or alternatively, such that an active model from a specified time may be identified or alternatively such that a model corresponding to training data from a specified range or time period may be identified, and then released, including rolling back a newer trained version of the model to the identified older version of the model.

Consider for example a newly trained model with fiscal year 2016 data which is found to perform poorly when compared to the same base model but for which the trained model was trained utilizing fiscal year 2015 data, despite the fiscal year 2016 data trained model being more up to date with respect to actual transactions.

The rollback mechanism permits developers to identify a prior predictive engine variant, such as the fiscal year 2015 trained model and deploy that identified model to production while rolling back the fiscal year 2016 trained model.

Other reasons for model behavior changes are likewise possible, such as changes to underlying source code, for instance, when working in a collaborative environment. It is conceivable that changes to the source code were not expected to change a model's predictive behavior, but nevertheless result in an undesirable change necessitating a rollback, for instance, to a pre-sourcecode-change predictive engine variant from last week. It is possible that datascientists changed the underlying model itself, resulting in an undesirable behavior, or changed the parameters or changed the selected algorithm, or weightings, or base assumptions, or any number of other possible changes which ultimately result in an undesirable change to the trained model's predictive behaviors and thus necessitate a rollback to a prior version or variant.

By keeping track of the model, keeping track of the source code, keeping track of the algorithm parameters, and keeping track of the data source or sources utilized, it is possible to uniquely identify every possible trained model variant such that a rollback may be initiated to effectively re-deploy to production an earlier version or variant of a trained predictive model.

Additionally supported is A/B testing or comparisons of two or more different trained model variants such that an evaluation or experiment may determine which of the two or more possible trained model variants yield the preferred real-world behaviors according to some specified condition. Comparison testing may additionally be performed upon trained model variants belonging to different customer organizations utilizing the same multi-tenant database system in the event that appropriate access permissions permit the comparisons.

According to one embodiment, a model management system is utilized to track the model variants and the various underlying changes to the source code, algorithm parameters, weightings, source data, range of data, etc., which result in any given trained model variant.

In accordance with a particular embodiment, there is a PredictionIO or machine learning platform database which tracks every trained model variant. For instance, according to one embodiment, such a database persistently stores a link to every generated model with a unique ID. According to such an embodiment, the unique ID associates the generated trained model variant with a designated source control repository utilized in conjunction with the PredictionIO or machine learning platform and provides a pointer via the link which points to or references the model (e.g., such as commits 130, 135, 140, and 145, etc.) along with the actual source code version utilized to generate that particular trained model 195 variant, as well as the time 196 the specific model variant was generated, and the input data sets utilized for the generation of that particular model and also the particular tenant(s) 150 or customer organization(s) associated with or issuing the particular modeling run.

Figure 1C:
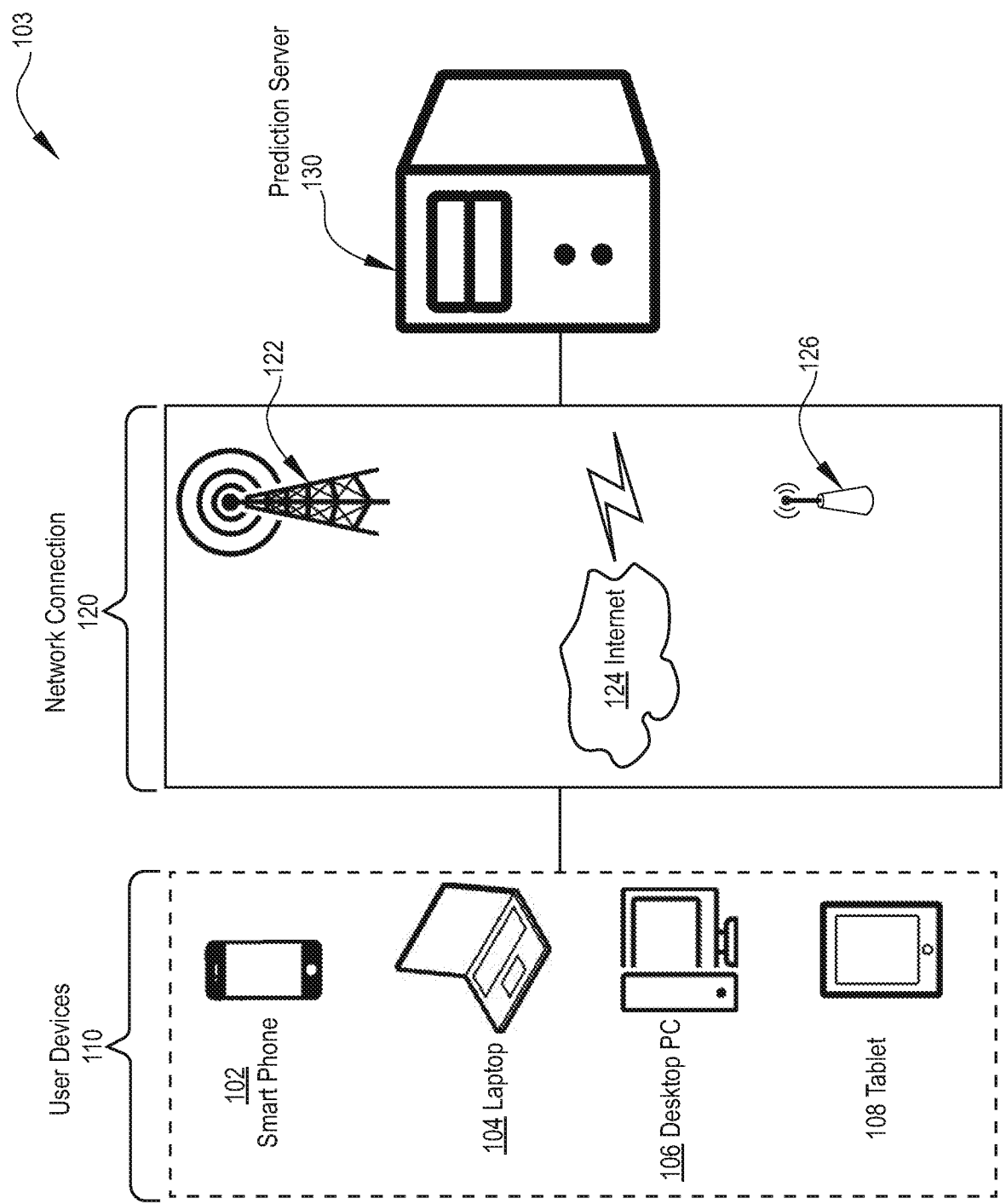
FIG. 1C depicts an exemplary network configuration diagram in accordance with described embodiments.

FIG. 1C depicts an exemplary network configuration diagram 103 in accordance with described embodiments.

More particularly, FIG. 1C depicts a schematic diagram of a network configuration 103 for practicing disclosed embodiments. A user-device or devices 110 may be connected to a PredictionIO or machine learning server or platform 130 through network connection 120. For example, a user-device may be a smart phone 102, laptop 104, desktop PC 106, or tablet 108. A user-device may also be wearable devices such as a watch, smart glasses, or an electronic tag. A user-device may be activated by user actions, or pre-installed programs. PredictionIO or machine learning server 130 is a platform for creating, deploying, evaluating, and tuning machine learning systems. In some embodiments, PredictionIO or machine learning server 130 is a predictive engine deployment platform where predictive engines are machine learning systems for generating predictions and decisions. In some embodiments, the PredictionIO or machine learning server 130 is a distributed system. For example, data store and processing algorithms may be located on different devices; engine deployment, monitoring, and evaluation may also be implemented separately. In this embodiment, the PredictionIO or machine learning server 130 is connected to one or more user devices 110 through the wireless network or the wired network 124. The wireless network comprises a cellular tower 122, or a wireless router 126. The wired network 124 or the wireless network may employ technologies and protocols comprising Ethernet technology, Local Area network (LAN), Wide Area Network (WAN), and optical network, and the like. In another embodiment, the PredictionIO or machine learning server 130 may be implemented directly in a user-device such as 102, 104, 106, or 108. Local installations of the PredictionIO or machine learning service remove remote connectivity requirements in the network configuration 103. Local installations of the PredictionIO or machine learning server 130 may be subjected to additional software or hardware constraints.

Described embodiments provide means for building and deploying machine learning systems for data analytics. Such machine learning systems may reside on one or more dedicated servers, or on on-site client terminals such as desk PCs or mobile devices.

According to certain embodiments there are means for creating and deploying predictive engines in production, and systematically evaluating and tuning predictive engine parameters to compare different algorithms, engine variants or engines. In addition, embodiments enable the tracking and replaying of queries, events, prediction results, and other necessary metrics for deducing and determining factors that affect the performance of a machine learning system of interest. A replay loop may serve to provide operators (developers and data scientists) insights into the selection and tuning of data sources, algorithms, algorithm parameters, as well as other engine parameters that may affect the performance of a predictive engine.

Creation of a smart application involving a machine learning system, requires that a developer first establish and train machine learning models or algorithms using training data collected from one or more sources. Such training data may also be simulated by historical data collected internally or externally by the machine learning system. A system parameter may indicate how training data is prepared and sampled for training predictive models. Next, training data are cleansed and unified into a consolidated format, and may be further randomly sampled or additionally processed, before being passed to and analyzed by the machine learning algorithms to determine system parameters that may specify which algorithms are to be evoked during deployment, and the corresponding algorithmic parameters. The resulting algorithmic parameters provide a trained predictive model. Collectively, parameters for a machine learning system control and specify data sources, algorithms, as well as other components within the system.

For example, to establish an algorithmic trading system, past prices and market trends may be analyzed to regress and extrapolate for future trading decisions. In this case, analysis of training data may determine regression coefficients for computing future trading prices or volume thresholds. Another example of a machine learning system is a recommendation engine for predicting products that users of an e-commerce website may potentially purchase. Such product recommendations may be personalized, or filtered according to business rules such as inventory conditions and logistical costs. Analysis of training data may determine brand names, price ranges, or product features for selecting and ranking products for display to one or a group of customers. In this example, system parameters may specify which sources are to be employed as training data, what type of data cleansing is carried out, which algorithms are to be used, regression coefficients, and what business rules are to be applied to prediction results.

Once a machine learning system is established, it can be deployed as a service, for example, as a web service, to receive dynamic user queries and to respond to such queries by generating and reporting prediction results to the user. Alternatively, prediction results may be served in desired formats to other systems associated or not associated with the user. As subsequent user actions or actual correct results can be collected and additional data may become available, a deployed machine learning system may be updated with new training data, and may be re-configured according to dynamic queries and corresponding event data. In addition, predictive models may be configured to persist, thus become re-usable and maintainable.

In addition to creating and deploying machine learning systems, described herein are methods and systems for evaluating and tuning machine learning systems in production. For instance, variants of predictive engines and algorithms are evaluated by an evaluator, using one or more metrics with test data. Test data include user queries, predicted results, and actual results or corresponding subsequent user behaviors or sequences of user actions captured and reported to the evaluator. Test data, including actual results, can also be simulated using data collected internally or externally by the machine learning system. Evaluation results thus generated are used in automatic parameter set generation and selection for the machine learning system. Multiple instances of a predictive engine, or engine variants, may be evaluated at the same time and subsequently compared to determine a dynamic allocation of incoming traffic to the machine learning system.

Further disclosed are methods and systems for monitoring and replaying queries, predicted results, subsequence end-user actions/behaviors, or actual results, and internal tracking information for determining factors that affect the performance of the machine learning system. For example, iterative replay of dynamic queries, corresponding predicted results, and subsequent actual user actions may provide to operators insights into the tuning of data sources, algorithms, algorithm parameters, as well as other system parameters that may affect the performance of the machine learning system. Prediction performances may be evaluated in terms of prediction scores and visualized through plots and diagrams. By segmenting available replay data, prediction performances of different engines or engine variants may be compared and studied conditionally for further engine parameter optimization.

In addition, through an Application Programming Interface (API), these monitoring and replaying methods and systems may work for not only engines deployed on the machine learning system specified here, but also external engines and algorithms. In other words, implementations of monitoring and replaying of engine configuration and performances may be separate from the engine deployment platform, thus allowing external monitoring and replaying services to be provided to existing predictive engines and algorithms.

According to certain embodiments another feature focuses on engine parameters instead of just algorithmic parameters. Engine parameters include hyperparameters such as data sources, algorithms employed, and business logic parameters in addition to configuration and data inputs to individual algorithms. Such engine level considerations allow engine level comparisons. Instead of tuning algorithmic parameters alone, embodiments allow additional selection of data sources, algorithms, business rules, and any other characteristic of the engine under consideration. Engine variants may be chosen by an operator or a developer, based on a template with default values, or generated automatically. Multiple variants of an engine deployed according to different engine parameter sets can thus utilize different algorithms or data sources, offering a much wider variety of deployable engine instances for comparison and much more flexibility for performance optimization.

Another feature of the disclosed embodiments is that it is capable of tracking multiple user actions, behaviors, or responses both immediately and over a delayed time frame. Sequences of user actions, such as mouse clicks followed by an online purchase, may be grouped and tracked under the same tracking tag or replay tag associated with a particular query. In addition, user actions may be tracked across different sessions, cohorts, according to different segmentation rules.

With the ability to track and replay prediction history, disclosed embodiments not only allow developers and data scientists to track prediction accuracy, but also enable them to troubleshoot and reconfigure the system as needed. Instead of just returning prediction success or failure rates for determining whether one variant performs better than another, disclosed embodiments can replay the whole prediction scenario, from engine parameters, queries, prediction results, to actual results, user interactions, and evaluation metrics, to help developers understand particular behaviors of engine variants of interest, and to tailor and improve prediction engine design. The graphical or textual visual replay of evaluation and tuning results not only makes the whole process easier to use, but also allows interactive engine parameter tuning by an operator.

According to certain embodiments, the methodologies integrate with existing software control management systems and provides a continuous integration infrastructure. In addition to creating, evaluating, tuning, and replaying machine learning models from the ground up, disclosed embodiments are agnostic to a machine learning technology stack and programming language, and allow the management, evaluation, update, and maintenance of models produced by different technologies and environments. Such model management features include model version control, model evaluation and employment, multi-tenancy support, and external infrastructure support.

PredictionIO is a trademark name for a software product suite which embodies many of the described embodiments and as such, the aforementioned trademark name is interchangeably used in the specification and drawings to refer to the products/services offered by disclosed embodiments. The term PredictionIO may be used in this specification to describe the overall machine learning system creation, evaluation, and tuning processes of the disclosed embodiments. The term "PredictionIO Enterprise Edition," "PredictionIO Lambda," or "PredictionIO λ" is one version of the PredictionIO platform offered and sold to enterprise customers, with enhanced features above the baseline version. Described embodiments are not limited to the trademark names PredictionIO and PredictionIO λ and may therefore be utilized by any naming convention or trademark name whatsoever.

Figure 2A:
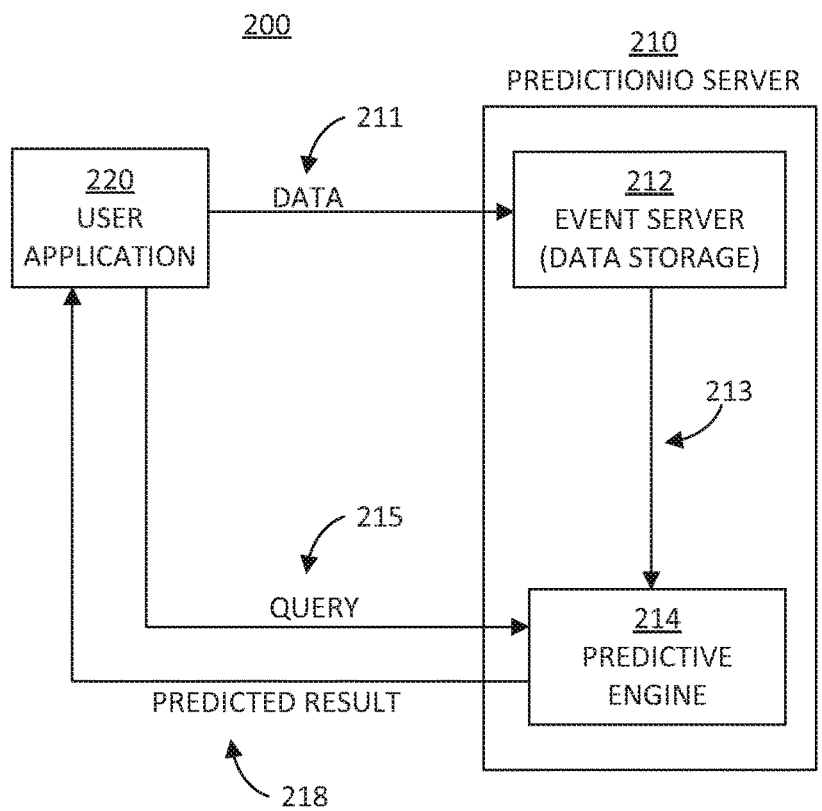
FIG. 2A depicts a machine learning framework based on a single predictive engine in accordance with described embodiments.

FIG. 2A depicts a machine learning framework based on a single predictive engine in accordance with described embodiments.

More particularly, FIG. 2A depicts an architectural overview 200 of a deployable machine learning framework based on a single predictive engine, according to an exemplary embodiment. In this embodiment, the PredictionIO or machine learning server 210 is composed of event server 212 and a predictive engine 214. Event server 212 is a scalable data collection and analytics layer. Event server 212 is responsible for importing data 211, in real-time or in batch, from user application 220, which may be a mobile application, a website, an email campaign, an analytical tool, or any other type of applications that may receive or collect user input, action, or information. "User" refers to an entity that interacts with the PredictionIO or machine learning server 210 or predictive engine 214, and may or may not be a person. In one embodiment, event server 212 uses Apache HBase as the data store. Event server 212 unifies data received from multiple channels or sources into unified data 213. For example, such multiple channels or sources may be one or more user applications, or different logical storage units on one or more user applications or devices. In some embodiments, one data source may indicate what a user or customer has done on a mobile application, another data source may indicate the customer's browsing history, yet another data source may indicate user behaviors within a retail store. In this example, data 211 may comprise user IDs, product IDs, product attributes, user preferences and user ratings for particular products, as well as other user actions. Event server 212 unifies or aggregates data 211, possibly into a preferred format, under a user email address or user login ID if such information is known. Alternatively, data 211 may be tagged with an entity ID such as a cookie ID for users or visitors who have not logged into the system. In production, new event data may be continuously pushed into event server 212, which in turn integrates the new data with existing datastore. When new data are integrated, predictive engine 214 may be trained automatically or upon request, and the resulting new model may be exchanged with the existing model. In summary, event server 212 serves two main purposes. It provides data to predictive engines for model training and evaluation, and offers a unified view for data analysis. In addition, like a database server, an event server can host multiple applications.

In some embodiments, event server 212 may be a component of predictive engine 214 instead of being an independent entity. In addition, not all input data to predictive engine 214 must be streamed from event server 212. In some embodiments, predictive engine 214 may read data from another datastore instead of event server 212.

Based on unified data 213, predictive engine 214 can be created. Predictive algorithms can be selected to represent a given type of prediction problem or task. Examples of prediction tasks include recommendations and classifications. For instance, a similar item recommendation task may seek to predict items that are similar to those on a given list; a personalized recommendation task may seek to predict which items a given user or users are inclined or more likely to take actions on; and a classification task may seek to predict whether a given document of text body is a suggestion or a complaint. The PredictionIO or machine learning server 210 may provide template predictive engines that can be modified by a developer for rapid development of system 200. Predictive engine 214 may contain one or more machine learning algorithms. It reads training data to build predictive models, and may be deployed as a web service through a network configuration 103 as shown in FIG. 1C after being trained. A deployed engine responds to prediction queries from user application 220, possibly in real-time, or over a given span of time.

After data 211 are sent to event server 212, continuously or in a batch mode, predictive engine 214 can be trained and deployed as a web service. User application 220 may then communicate with engine 214 by sending a query 215, through an Application Programming Interface (API) or a REST interface; such interfaces may be automatically provided by the PredictionIO or machine learning platform 210. An exemplary query is a user ID. In response, predictive engine 214 returns predicted result 218 in a pre-defined format through a given interface. An exemplary predicted result is a list of product IDs. In the classification example previously discussed, query 215 may be a paragraph of text input, and predicted result 218 may be an alphanumerical string that indicates whether the input text is a suggestion or a complaint. In the similar item recommendation task, query 215 may be a set of item IDs such as (P1, P2, P3), while predicted result 218 may be another set of item IDs such as (P10, P11), indicating that products P10 and P11 are similar to the given products P1, P2, and P3. Similarity among different items may be defined through numerical scores and/or non-numerical criteria. In the personalized recommendation task, query 215 may be a user ID, while predicted result 218 may be a set of item IDs such as (P10, P11), indicating that the user with the given ID is more likely to take actions on products P10 and P11.

Figure 2B:
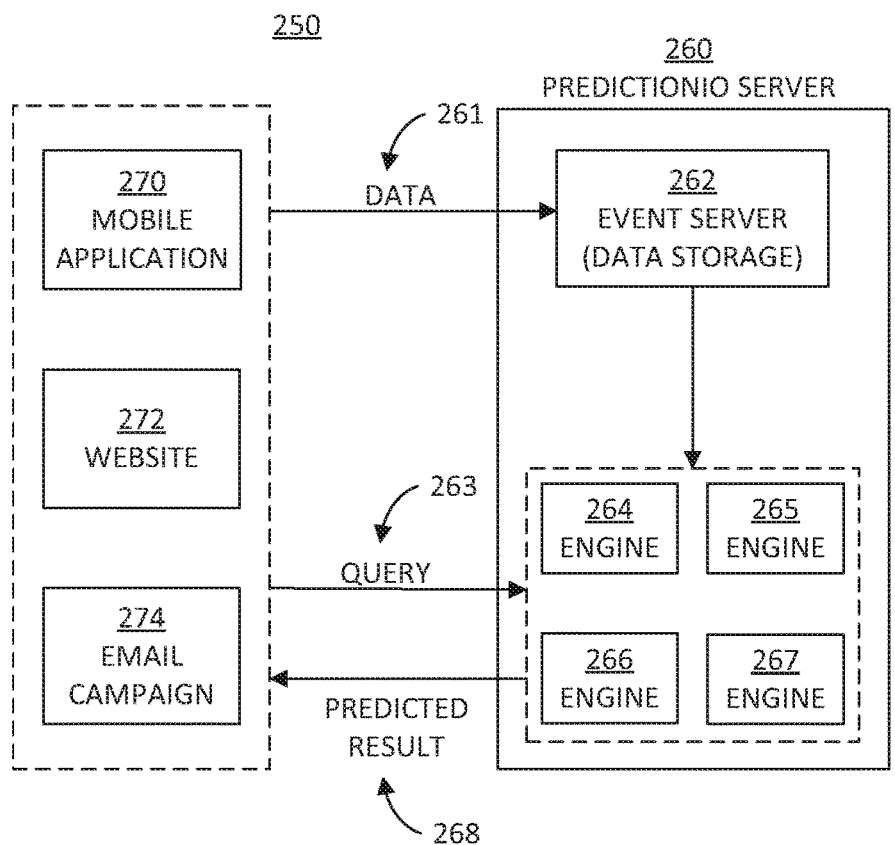
FIG. 2B depicts a machine learning framework based on multiple predictive engines in accordance with described embodiments.

FIG. 2B depicts a machine learning framework based on multiple predictive engines in accordance with described embodiments.

More particularly, FIG. 2B depicts an architectural overview of a deployable machine learning framework 250 based on multiple predictive engines, according to one embodiment. Here each of mobile application 270, website 272, and email campaign 274 sends user input, behavior, and/or other related data 261 to event server 262, continuously or in a batch mode. Instead of a single predictive engine, different engines, shown as engines 264, 265, 266, and 267, may be built for different purposes within the PredictionIO or machine learning server or platform 260. In the product recommendation example, engine 264 may help a customer browsing an e-commerce website discover new products of interest. Another engine 265 may be used for generating product recommendations or sales notifications in an email campaign. For instance, based on what the customer has browsed in the past few days, a similar or a related product may be presented in an email newsletter to the customer so the customer will return to the e-commerce website. In this particular example, browsing history in the form of data 261 may be collected through mobile application 270 and website 272 over a given span of time such as an hour, a day, or a week; query 263 may be generated automatically by an email client; and predicted result 268 may be served in the form of texts or graphical elements through email campaign 274.

Similar to system 200 shown in FIG. 2A, each of mobile application 270, website 272, and email campaign 274 may communicate with engines 264, 265, 266, 267 by sending in data 261 or query 263. A subset or all of the available predictive engines may be active, depending on data 261, or other engine parameter settings as configured through the PredictionIO or machine learning server 260. In response, predictive engines return one or more predicted results 268, individually or in combination, in a possibly pre-defined format.

Even though only three user applications 270, 272, 274, and four predictive engines 264, 265, 266, 267 are shown in FIG. 2B, system 250 may be scaled to include many more user applications, and the PredictionIO or machine learning server 260 may be scaled to include fewer or many more predictive models. Additional user applications may each reside on the same or separate devices or storage media. In addition, the PredictionIO or machine learning server 260 may be scaled to include multiple predictive engines of different types on the same platform. Event server 262 may function to provide input data to all predictive engines, or more than one event server may be implemented within the PredictionIO or machine learning server 260. For example, depending on the type of prediction required, subsets of data 261 may be stored separately into multiple event servers and indexed correspondingly.

Figure 3A:
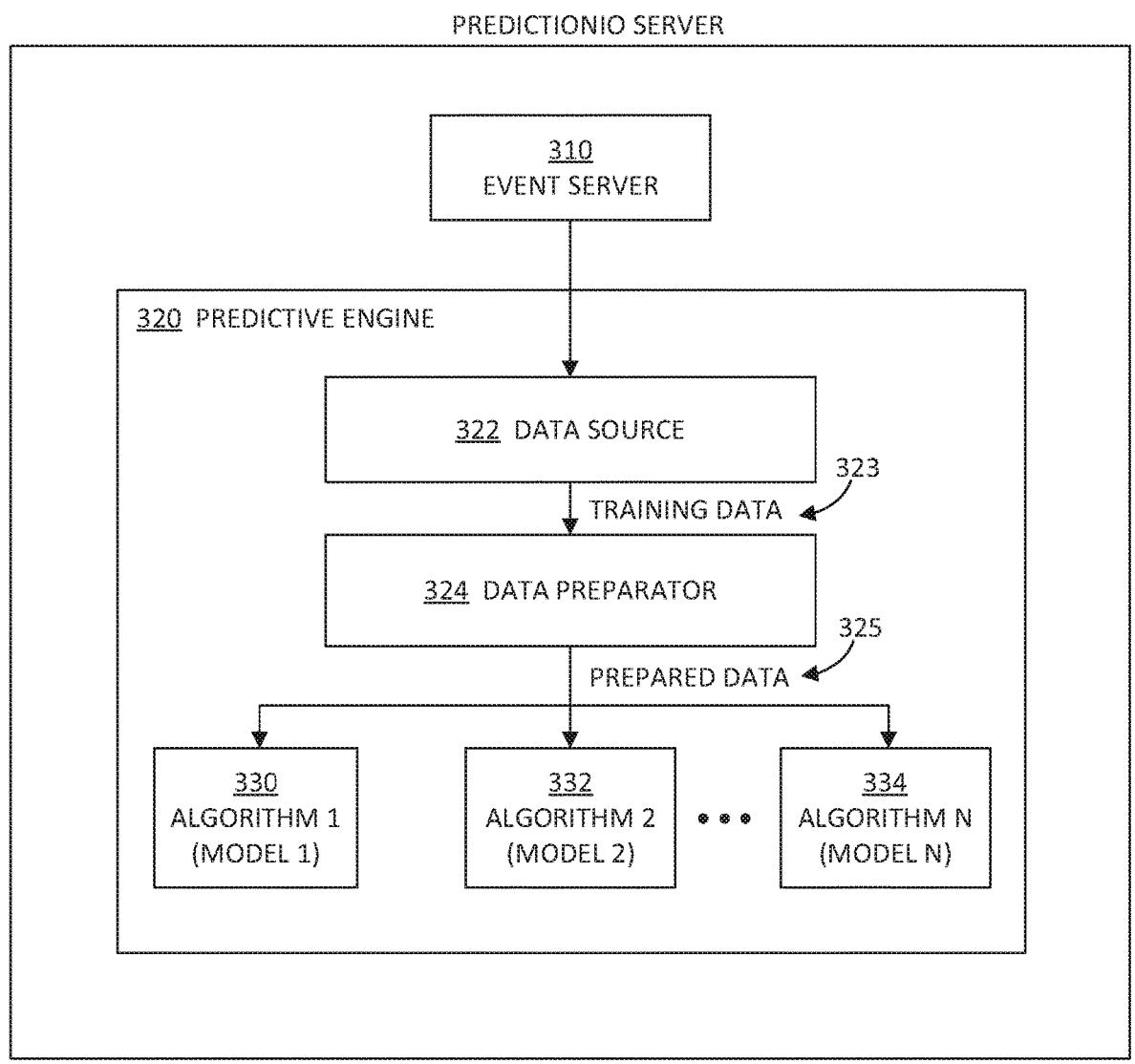
FIG. 3A depicts a machine learning framework and the components of a predictive engine involved in training predictive models in accordance with described embodiments.

FIG. 3A depicts a machine learning framework and the components of a predictive engine involved in training predictive models in accordance with described embodiments.

More particularly, FIG. 3A depicts the components of a predictive engine involved in training predictive models within the predictive engine, according to one embodiment. After user data has been collected into event server 310, they can be pulled into data source 322 of predictive engine 320. In addition to reading data from a datastore, data source 322 may further process data from event server 310 according to particular settings of predictive engine 320. Data source 322 then outputs training data 323 to data preparator 324, which cleanses and possibly reformats training data 323 into prepared data 325. Prepared data 325 are then passed to all algorithms 330 to 334, automatically or upon request. Predictive algorithms such as algorithms 330 to 334 here are components of a predictive engine for generating predictions and decisions. A predictive engine may include one or more algorithms, to be used independently or in combination. For example, separate algorithms may be employed to handle different types of user event data, or a single algorithm may be implemented to take different types of user event data into account. Each algorithm is configured to perform at least two functions, train and predict. One is for training the corresponding predictive model, the other is for employing the predictive model for generating a predicted result. During training, each algorithm returns a predictive model, which is in turn cached by the PredictionIO or machine learning server 300 such that models may persist and can be returned once recommendations need to be made. The models may be in a distributed or a non-distributed object format, and the PredictionIO or machine learning server 300 may provide dedicated programming class interfaces for accessing such model objects.

To facilitate the creation and deployment of a predictive engine, a PredictionIO or machine learning server such as 300 may provide programming templates for creating each component of predictive engine 320. For example, a read function of data source 322 may be called directly to return training data 323, and a prepare function of data preparator 324 may be called to process training data 323 into prepared data 325. Each of algorithms 330 to 334 processes prepared data 325 to determine model or object parameters.

Figure 3B:
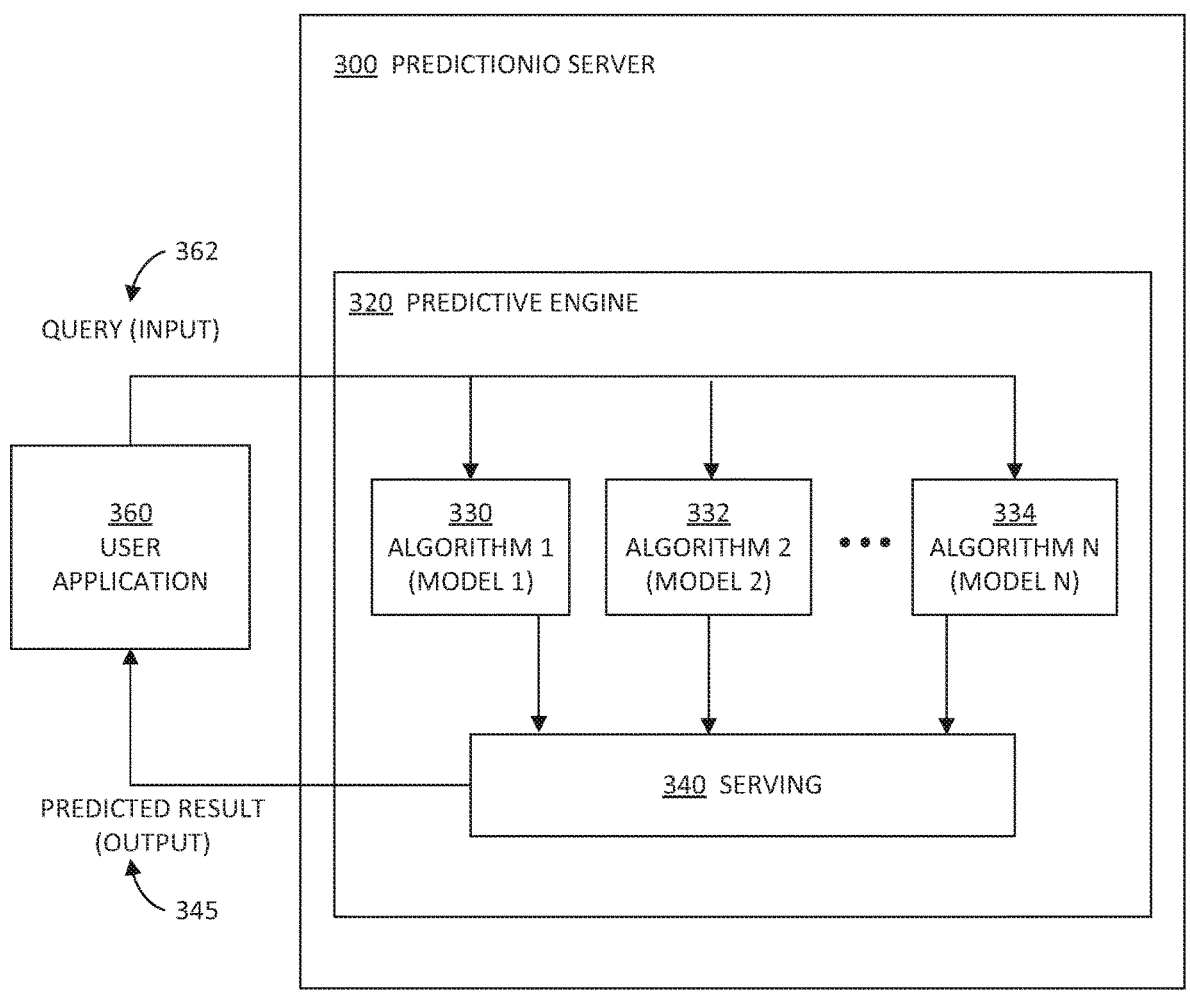
FIG. 3B depicts a machine learning framework and the components of a predictive engine involved in responding to dynamic queries to the predictive engine in accordance with described embodiments.

FIG. 3B depicts a machine learning framework and the components of a predictive engine involved in responding to dynamic queries to the predictive engine in accordance with described embodiments.

More particularly, FIG. 3B depicts the components of a predictive engine involved in responding to dynamic queries to the predictive engine, according to one embodiment. After predictive engine 320 has been trained, it can be deployed, as a web service through network 120 as shown in FIG. 1C, or as a local installation on client devices. Once trained and deployed, predictive engine 320 may respond to dynamic query 362 from user application 360. Query 362 may be in a predefined format, and predictive engine 320 may conduct further conversion of query data 362 before passing it to one or more trained algorithms or models 330 to 334, to trigger a predict function within each algorithm that has defined this particular function. As a result, each active algorithm or predictive model returns a predicted result in response to dynamic query 362. For example, the predicted result may be a list of product IDs, or a list of product recommendation scores associated with a list of product IDs. The predicted results are passed to a serving component 340 of predictive engine 320. Serving component 340 further processes and aggregates the prediction results to generate a predicted result 345 for output back to user application 360. An algorithm's predict function and Serving 340 may further include real time business logics for filtering and processing prediction results from some of algorithms 330 to 334. For example, while in production, a product inventory may become depleted, thus a product recommendation for purchase may need to be adjusted accordingly. In another example, serving 340 may take into account logistical costs to determine whether products within a particular price range are more likely to be considered by a customer, and may therefore be recommended to the customer through user application 360. Alternatively, serving 340 may combine prediction results from a selected subset of algorithms. The returned predicted result 345 may be automatically structured into a programming object easily convertible to other formats by the PredictionIO or machine learning platform 300.

To facilitate evaluation and tuning of predictive engine 320, its inputs, outputs, and internal parameters may be tagged and replayed. More detailed descriptions will be provided with reference to FIGS. 4 to 8.

Figure 4:
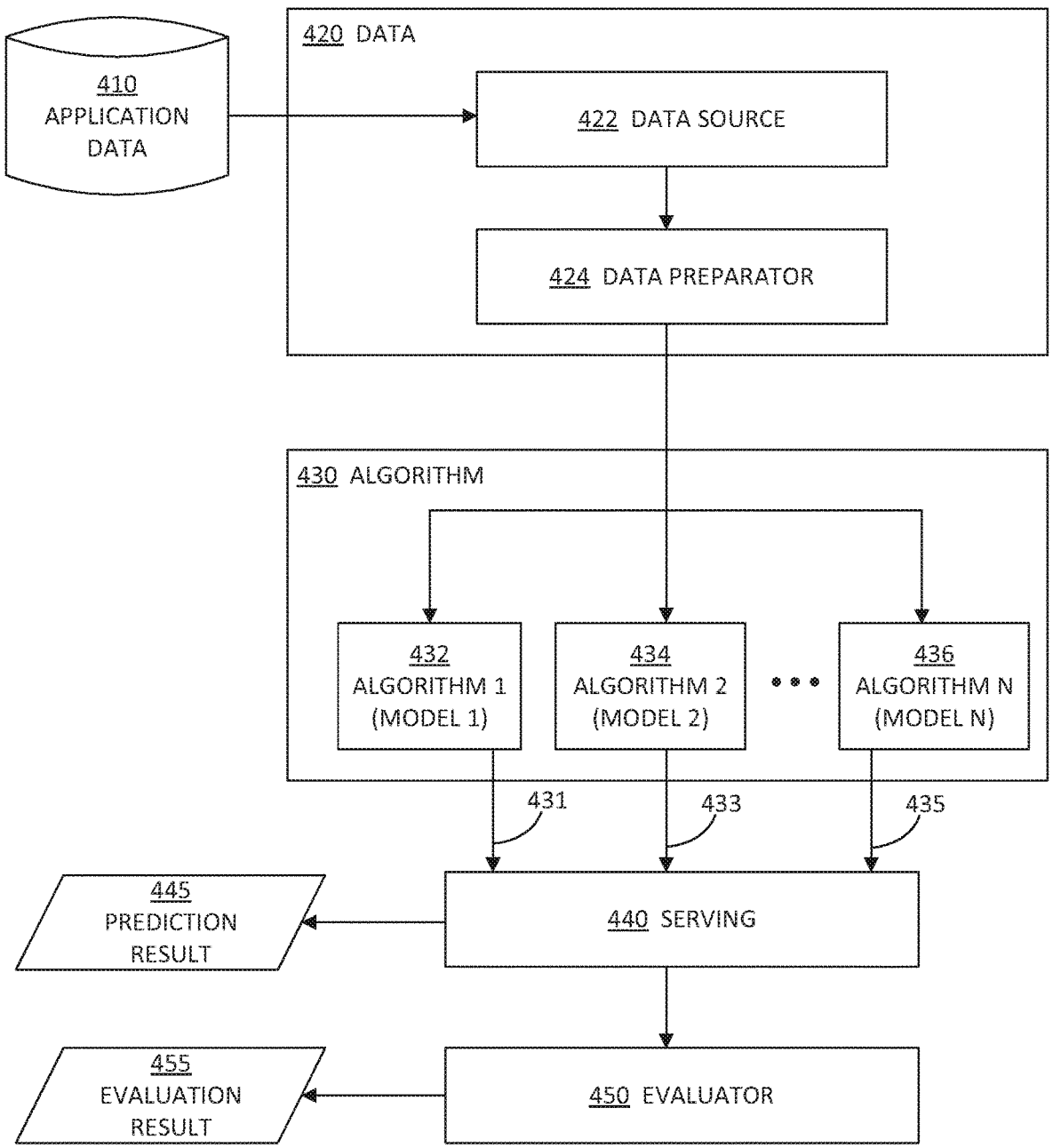
FIG. 4 depicts the structure of a predictive engine in accordance with described embodiments.

FIG. 4 depicts the structure of a predictive engine in accordance with described embodiments.

More particularly, FIG. 4 depicts the overall structure of a predictive engine 400, according to one embodiment. Predictive engine 400 may be separated into four major components, Data 420, Algorithm 430, Serving 440, and Evaluator 450, also known as a "DASE" architecture. The first three components Data 420, Algorithm 430, and Serving 440 have been discussed with reference to FIGS. 3A and 3B. This DASE architecture provides a separation of concerns (SoC) that allows developers to exchange and replace individual components in predictive engine design. In other words, the DASE architecture is a Model-View-Controller (MVC) for machine learning systems. All components of the DASE architecture are controlled by an engine factory object (not shown here) defined as part of a PredictionIO or machine learning server.

The first Data component 420 refers to data source 422 and data preparator 424. In FIG. 3A, data source 322 and data preparator 324 receive data from event server 310. Similarly, in FIG. 4 here, data source 422 imports application data 410, possibly from an event server implemented on a PredictionIO or machine learning platform. Data source 422 functions as a reader of internal or external datastores, while data preparator 424 cleanses training data before passing prepared data to Algorithm component 430 of predictive engine 400. Some exemplary functions of data preparator 424 are to reformat and aggregate training data as desired, and to sample a subset of training data using a pre-defined random sampling strategy. In some embodiments, data preparator 424 may be excluded from Data component 420, and training data may be passed directly from data source 422 to Algorithm component 430 of predictive engine 400. The inclusion or exclusion of data preparator 424 may be useful in evaluating the performance of predictive engine 400 under different settings or configurations.

The second Algorithm component 430 of predictive engine 400 comprises one or more algorithms, denoted as algorithms 432 to 436 in FIG. 4. A very simple example of an algorithm within Algorithm component 430 is a non-personalized, trending algorithm that recommends products which are most popular in the store at the moment. A more complicated example may be a personalized algorithm that takes into account products a particular customer has purchased in the past. A single predictive engine 400 may contain multiple algorithms; each can be trained as discussed previously with reference to FIG. 3A, and activated or called upon request as discussed previously with reference to FIG. 3B. However, not all algorithms have to be trained or called at the same time. The selection of algorithms within Algorithm component 430 could depend on the availability of training data, computing resources, or other factors. The selection of algorithms is specified by parameters of predictive engine 400. In addition, a subset of algorithms can be selected for best performance, as will be discussed with reference to FIG. 8. Furthermore, data from preparator 424 may be sampled separately for each algorithm for best performance. In some embodiments, the output of the training process includes a model part and a meta-data part. The trained models and meta-data are stored in a local file system, in HDFS, or another type of storage. Meta-data may include model versions, engine versions, application ID mappings, and evaluation results.

Predicted results such as 431, 433 and 435 from activated algorithms are passed to Serving component 440. Serving component 440 can combine, filter, and further process prediction results according to real time business rules to generate predicted result 445. Such business rules may be updated periodically or upon request.

In addition, to evaluate the performance of the prediction process to compare different algorithms, algorithm parameter settings, as well as different engine variants, an Evaluator component 450 receives data from Serving component 440, and applies one or more metrics to compute evaluation result 455 as an output. An engine variant is a deployable instance of a predictive engine, specified by an engine parameter set. The engine parameter set includes parameters that control each component of a predictive engine. An evaluation metric may quantify prediction accuracy with a numerical score. Evaluation metrics may be pre-defined with default computation steps, or may be customizable by developers who utilize the PredictionIO or machine learning platform.

Although not explicitly shown in FIG. 4, Evaluator 450 may receive actual results, including correct values, user actions, or actual user behaviors from a datastore or a user application for computing evaluation metrics. An actual result refers to a correct prediction result or an actual outcome of a prediction task. If a predicted result is the same as an actual result, the predicted result can be considered as an excellent prediction. Recall the exemplary queries and corresponding predicted results discussed with reference to FIG. 2A. In the classification task, an actual result may be the string "complaint", which is a correct classification of the text input. In the similar item recommendation task, an actual result may be product IDs (P10, P20), indicating that products P10 and P20 are similar to given items (P1, P2, P3), although the predictive engine suggests products P10 and P11. In a personalized recommendation task, an actual user behavior may be product IDs (P10, P20), indicating that the user selected products P10 and P20 for further viewing and purchase, after products P10 and P11 are recommended by the predictive engine. Another example of actual results is in algorithmic trading, where an actual result may be the actual opening or closing price of a particular stock on the next day. Actual results may be collected through user devices, read from storage, or simulated.

Prediction result 445 and evaluation result 455 can be passed to other components within a PredictionIO or machine learning server. As discussed previously, a PredictionIO or machine learning server is a predictive engine deployment platform that enables developers to customize engine components, evaluate predictive models, and tune predictive engine parameters to improve performance of prediction results. A PredictionIO or machine learning server may also maintain adjustment history in addition to prediction and evaluation results for developers to further customize and improve each component of an engine for specific business needs.

In certain embodiments, Apache Spark can be used to power the Data, Algorithm, Serving, and Evaluator components. Apache Spark is a large-scale data processing engine. In this case, distributed algorithms and single-machine algorithms may both be supported by the PredictionIO or machine learning Server.

Engine Parameter Tuning

A predictive engine within a PredictionIO or machine learning platform is governed by a set of engine parameters. Engine parameters determine which algorithms are used and what parameters are to be used for each algorithm chosen. In addition, engine parameters dedicate the control of the Data component, Algorithm component, and Serving component of a predictive engine. In other words, engine parameters include parameters for each component controller. As engine parameters essentially teach how an engine is to function, engine parameters are hyperparameters. A given set of engine parameters specifies an engine variant.

The determination and tuning of engine parameters is the key to generating good predictive engines. The evaluator component, also called an evaluation module, facilitates the engine tuning process to obtain the best parameter set. For example, in a classification application that uses a Bayesian algorithm, an optimal smoothing parameter for making the model more adaptive to unseen data can be found by evaluating the prediction quality against a list of parameter values to find the best value.

In some embodiments, to evaluate engine parameters, available data can be split into two sets, a training set and a validation set. The training set is used to train the engine, as discussed with reference to FIG. 3A, while the validation set is used to validate the engine by querying the engine with the validation set data, as discussed with reference to FIG. 3B. Validation set data include actual results or actual user behaviors. One or more metrics can be defined to compare predicted results returned from the engine with actual results among the validation data. The goal of engine parameter tuning is to determine an optimal engine parameter set that maximizes evaluation metric scores. The higher the score, the better the engine parameter set. For example, a precision score may be used to measure the portion of correct predictions among all data points. In some embodiments, training and validation data are simulated by the PredictionIO or machine learning platform.

Figure 5A:
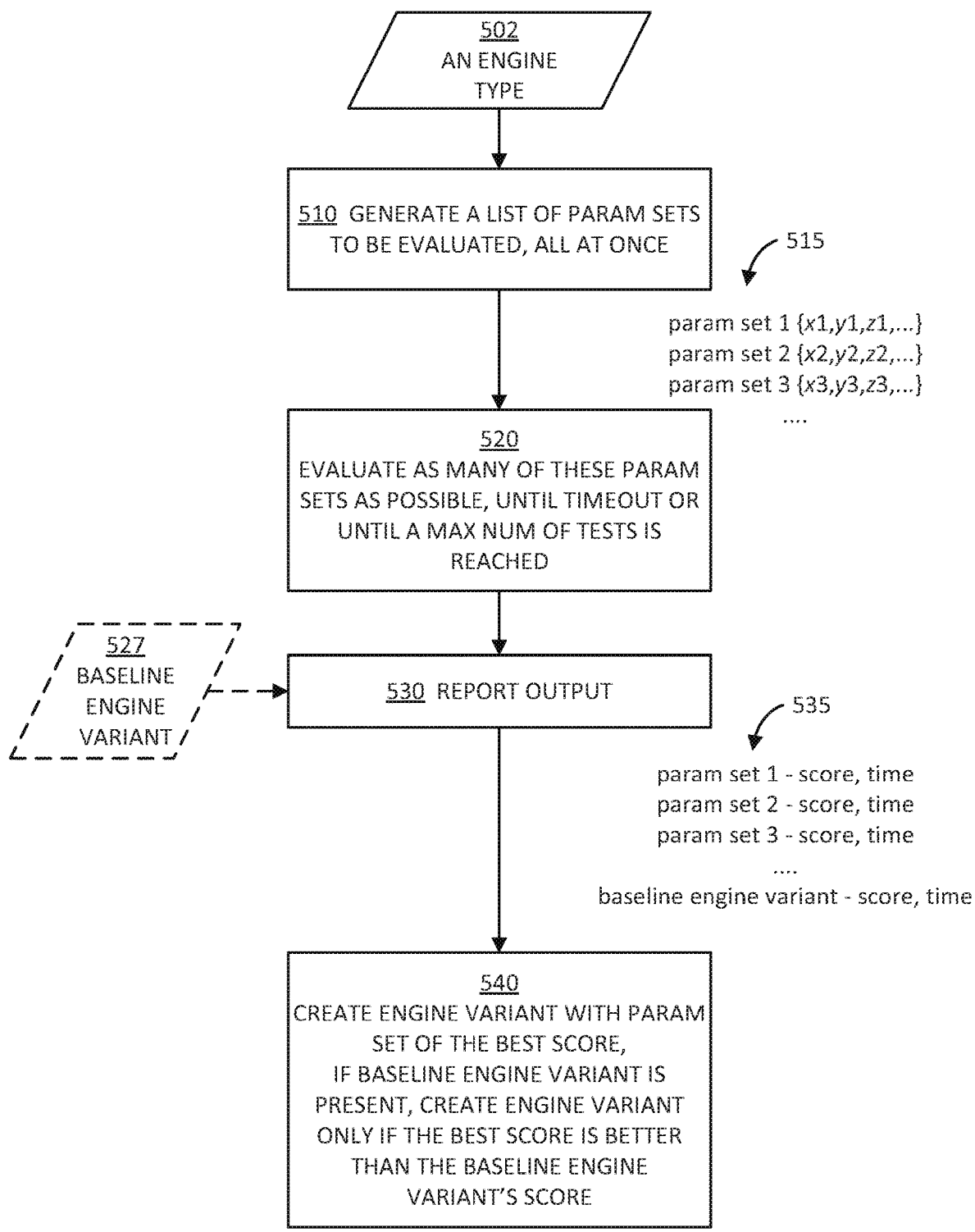
FIG. 5A depicts a method for automatically tuning parameters of a predictive engine by evaluating a generated list of parameters sets in accordance with described embodiments.

FIG. 5A depicts a method for automatically tuning parameters of a predictive engine by evaluating a generated list of parameters sets in accordance with described embodiments.

Figure 5B:
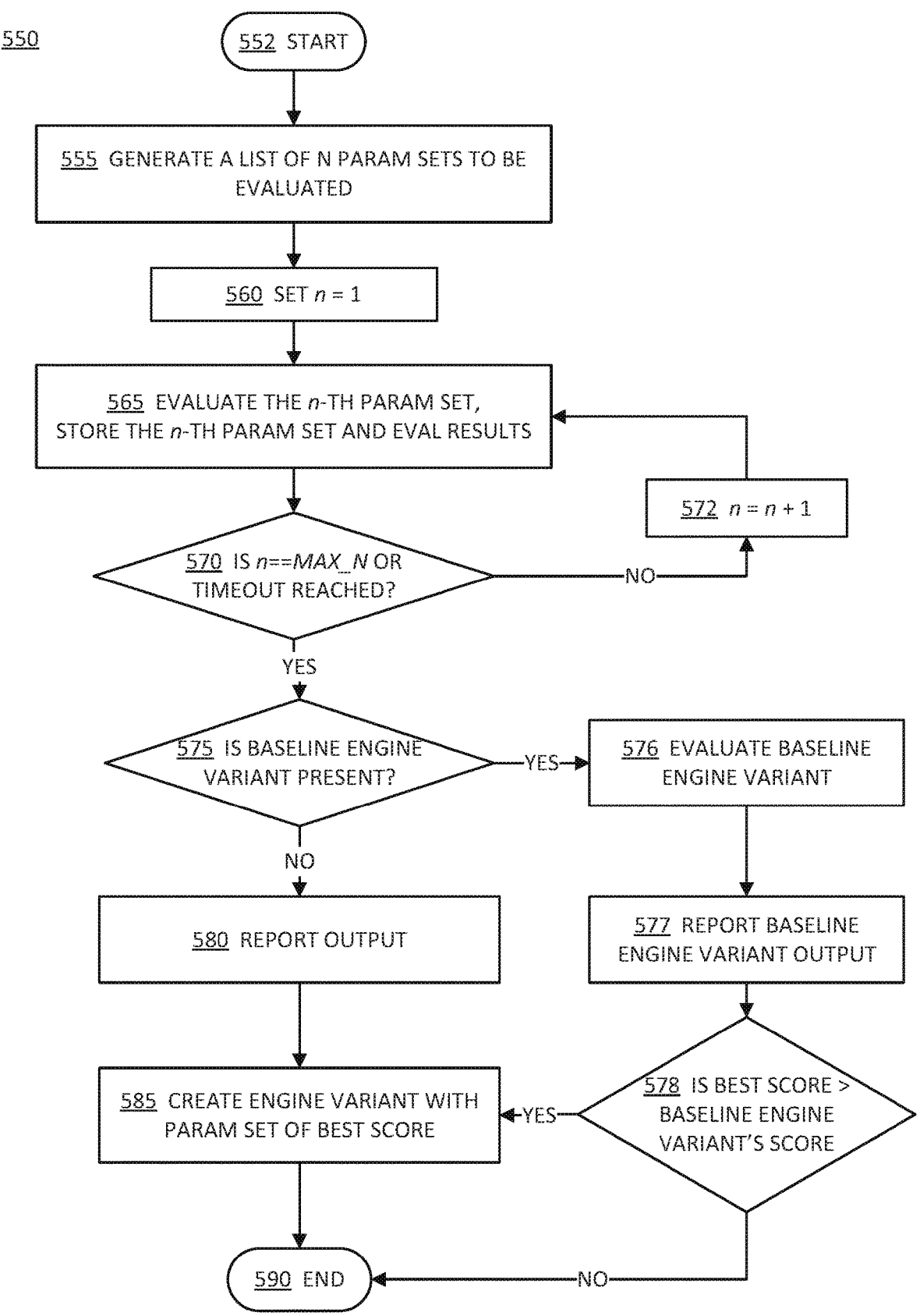
FIG. 5B depicts a method for automatically tuning parameters of a predictive engine by evaluating a generated list of parameters sets in accordance with described embodiments.

More particularly, FIG. 5A depicts a use flow diagram 500 showing a method of automatically tuning parameters of a predictive engine by evaluating a generated list of parameter sets, according to one embodiment. Correspondingly, FIG. 5B is an exemplary flow diagram 550 showing a detailed implementation of the use flow 500 shown in FIG. 5A. In FIG. 5A, given an engine type 502, a parameter generator generates a list of engine parameter sets all at once at step 510. In some embodiments, a list of engine parameter sets can be generated from a base engine parameter set by adding or replacing controller parameters. In some embodiments, a list of engine parameter sets can be generated from a base engine parameter set by incrementally changing the value of one parameter within the base parameter set. The base engine parameter set may take on default values stored in a PredictionIO or machine learning platform, may be generated manually by an operator, or may be generated automatically. In some embodiments, the base engine parameter set may be derived from previous engine parameter set tuning and evaluation steps not shown in FIG. 5A. The base engine parameter set may also be included in the newly generated engine parameter sets. In other words, one of the newly generated engine parameter sets may equal to the base engine parameter set.

The generated list of engine parameter sets 515 are evaluated one by one at step 520 according to a chosen evaluation metric or multiple chosen metrics, until timeout or until a maximum number of tests is reached. In this example shown in FIG. 5A, the n-th engine parameter set is represented as the tuple ($x_n$, $y_n$, $z_n$, . . . ), where each element of the parameter set may take on different variable types. In some embodiments, a baseline engine variant is presented as an optional input 527 and is also evaluated. Baseline engine variant 527 is of engine type 502, and may take on default engine parameter values stored in a PredictionIO or machine learning platform, may be generated manually by an operator, or may be generated automatically. The parameter value, evaluation score, and computation time of each of the engine parameter set and the baseline engine variant are reported at step 530 as output 535. Subsequently, a new predictive engine variant is created at step 540 with the parameter set having the best score. If a baseline engine variant is present, an engine variant is created only if the best score is better than the baseline engine variant's score. The whole engine and its complete parameter set (entire DASE stack, see definitions section), or any sub-component and its associated parameters, may be tuned. This illustrative example shows the tuning of engine parameter sets. In other words, the Data source/data preparator, Algorithm, Serving, and Evaluation components and their parameters can all be tuned in this manner as presented herein.

FIG. 5B depicts a method for automatically tuning parameters of a predictive engine by evaluating a generated list of parameters sets in accordance with described embodiments.

More particularly, FIG. 5B illustrates an exemplary implementation of the engine parameter tuning process shown in FIG. 5A as a flow diagram 550. The flow diagram 550 starts 552 with step 555, where a list of a given N number of parameter sets is generated to be evaluated. At step 560, an iteration index n is set to 1. Evaluation of the n-th parameter set is carried out at step 565, and the evaluation result is stored in addition to the n-th parameter set itself. If neither a maximum number of tests MAX_N nor timeout has been reached at step 570, the parameter generation and evaluation processes continue through step 572, where the iteration index n is incremented. Otherwise, the presence of a baseline engine variant is considered at step 575. Without a baseline engine variant, the parameter sets and corresponding evaluation results are reported at step 580, and a new engine variant with a parameter set of the best score is created at step 585 before the tuning process terminates at step 590. If a baseline engine variant is present, the evaluation result for the baseline engine variant is evaluated at step 576, reported at step 577, and compared to that of the best score out of the list of parameter sets at step 578. A new engine variant is then created only if the best score is better. In addition to the process shown in flow chart 550, alternative implementations of the use flow 500 is also possible.

Figure 6A:
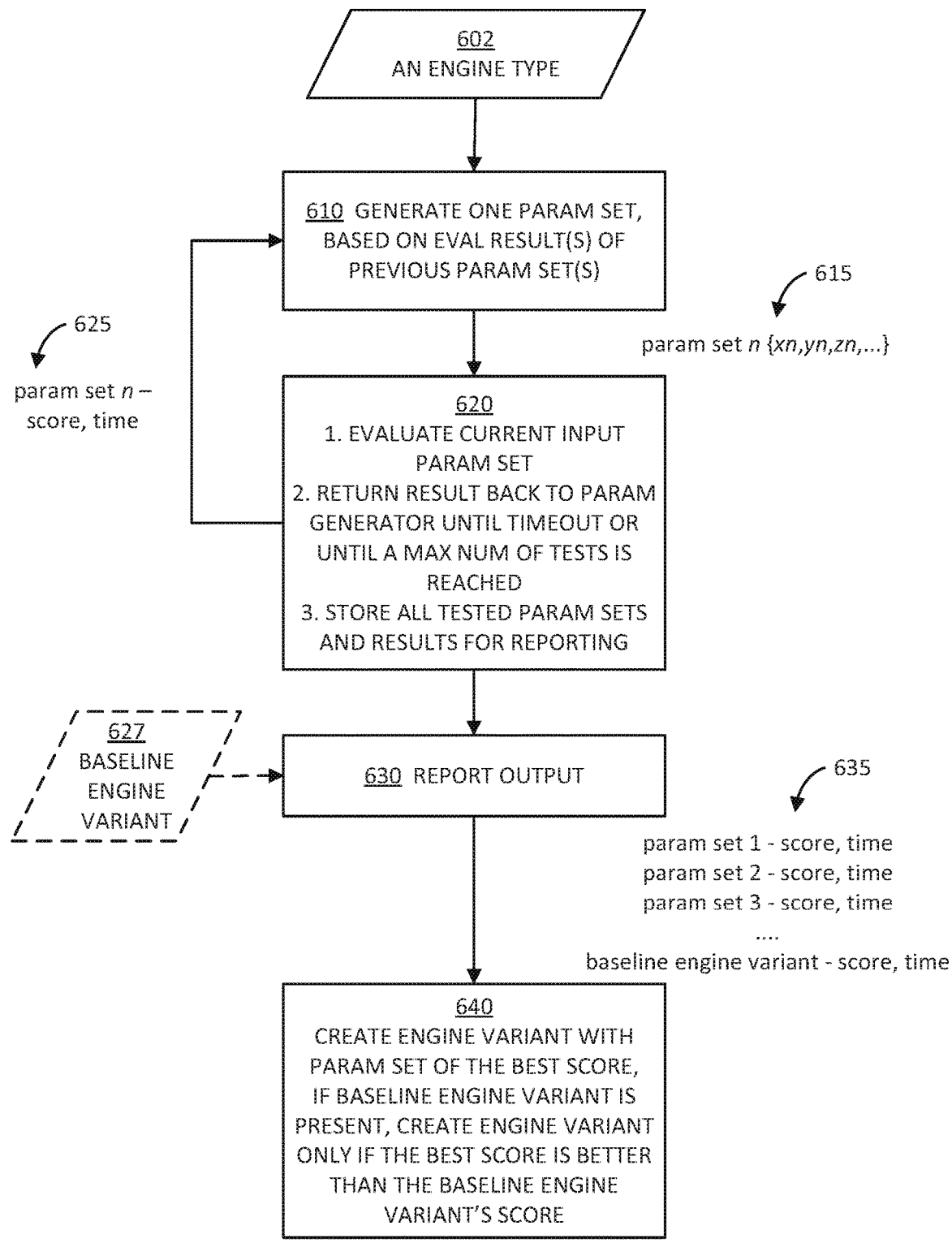
FIG. 6A depicts a method for automatically tuning parameters of a predictive engine by evaluating iteratively generated parameter sets in accordance with described embodiments.

FIG. 6A depicts a method for automatically tuning parameters of a predictive engine by evaluating iteratively generated parameter sets in accordance with described embodiments.

Figure 6B:
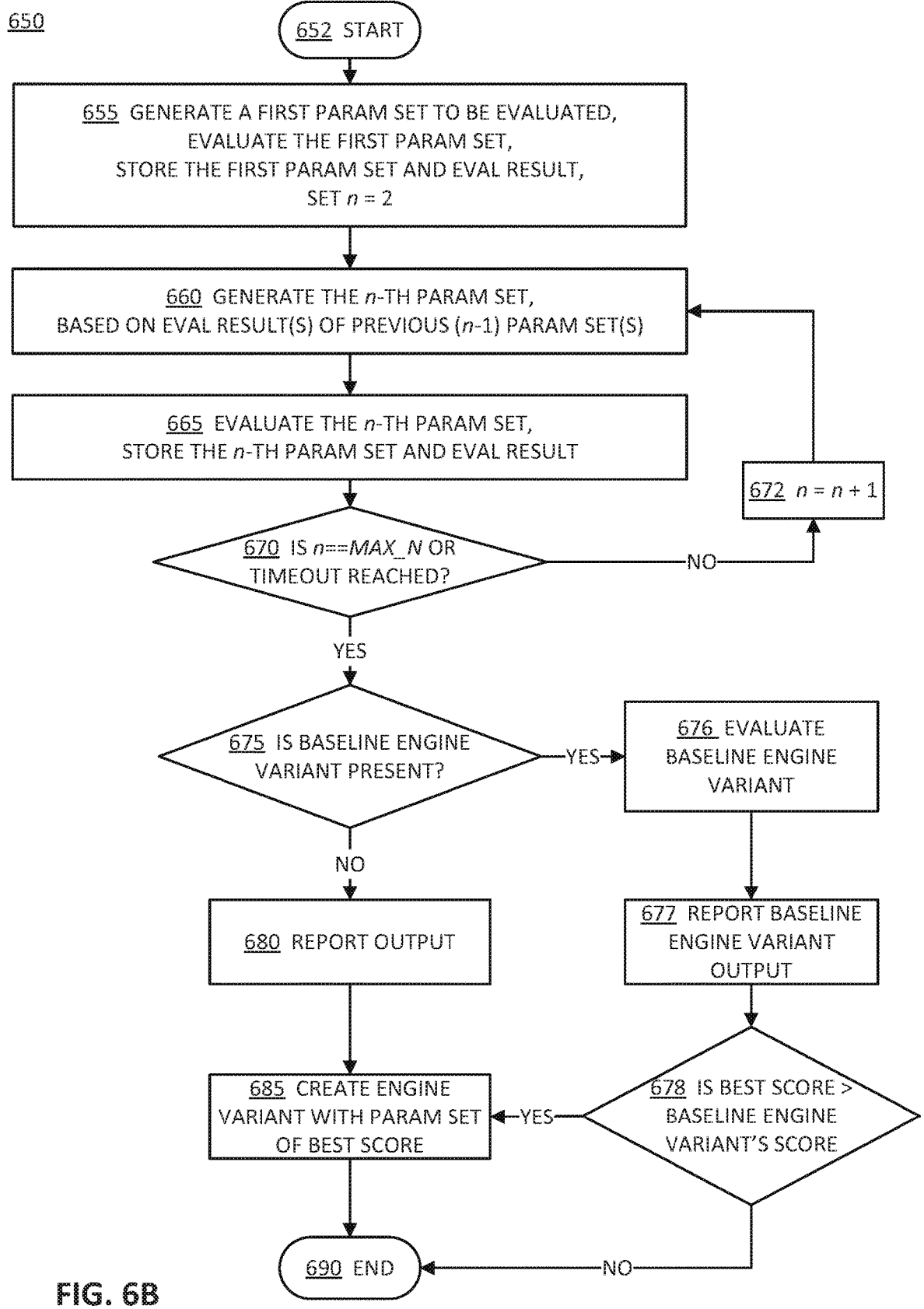
FIG. 6B depicts a method for automatically tuning parameters of a predictive engine by evaluating iteratively generated parameter sets in accordance with described embodiments.

More particularly, FIG. 6A depicts a use flow diagram 600 showing a method of automatically tuning parameters of a predictive engine by evaluating iteratively-generated parameter sets, according to one embodiment. Correspondingly, FIG. 6B is an exemplary flow diagram 650 showing a detailed implementation of the use flow 600 shown in FIG. 6A. In FIG. 6A, given an engine type 602, a parameter generator generates a first engine parameter set at step 610. The newly-generated engine parameter set 615 is evaluated at step 620 according to one or more pre-defined metrics, and the evaluation result 625 is returned to the parameter generator, unless a maximum number of tests or time out has been reached. The parameter generator then generates the next engine parameter set, based on evaluation results of some or all of the previous engine parameter sets. In some embodiments, a baseline engine variant is presented as an optional input 627 and is also evaluated. Baseline engine variant 627 is of engine type 602, and may take on default engine parameter values stored in a PredictionIO or machine learning platform, may be generated manually by an operator, or may be generated automatically. The parameter value, evaluation score and computation time of each of the parameter set and the baseline engine variant are reported at step 630 as output 635, and an engine variant is created, or chosen, with the parameter set of the best score at step 640. If a baseline engine variant is present, a new engine variant is created only if the best score is better than the baseline engine variant's score. This illustrative example shows the tuning of engine parameter sets. In other words, the Data source/data preparator, Algorithm, Serving, and Evaluation components and their parameters can all be tuned in this manner as presented herein.

FIG. 6B depicts a method for automatically tuning parameters of a predictive engine by evaluating iteratively generated parameter sets in accordance with described embodiments.

More particularly, FIG. 6B illustrates an exemplary implementation of the engine parameter tuning process shown in FIG. 6A as a flow diagram 650 which starts 652 at step 655, where a first set of engine parameters is generated, evaluated, and the corresponding results are stored. The iteration index n is set to 2. The first set of engine parameters may be generated from a base engine parameter set, where the base engine parameter set may take on stored default values, or may be derived from previous engine parameter set tuning and evaluation steps not shown here. The first set of engine parameters may equal to the base engine parameter set. At step 660, the n-th engine parameter set is generated, based on evaluation results of some or all of the previous (n−1) engine parameter sets. Evaluation of the n-th parameter set is carried out at step 665, and the evaluation result is stored in addition to the n-th engine parameter set itself, for later reporting. If neither a maximum number of tests MAX_N nor timeout has been reached at step 670, the parameter generation and evaluation processes continue through step 672. Otherwise, the presence of an optional baseline engine variant is considered at step 675. Without a baseline engine variant, the parameter sets and corresponding evaluation results are reported at step 680, and a new engine variant with a parameter set of the best score is created at step 685 before the tuning process terminates at step 690. If a baseline engine variant is present, it is evaluated at step 676, the evaluation result is reported at step 677, and the evaluation result is compared to that of the best score out of the list of parameter sets at step 678. An engine variant is then created only if the best score is better. In addition to the process shown in flow chart 650, alternative implementations of the use flow 600 is also possible.

In some embodiments, a PredictionIO or machine learning platform may deploy a variant of a given predictive engine with an initial set of engine parameters or an initial engine parameter setting. The initial engine parameter set may take on default values stored in memory, may be generated manually by an operator, or may be determined automatically. The deployed engine variant then receives queries, responds with predicted results, and receives back actual results. Evaluation results are then generated and the current engine parameter set and evaluation results are passed to an engine parameter generator. From time to time, the engine parameter generator generates a new parameter set based on evaluation results of the current variant, and sometimes, evaluation results of previously deployed variants. Such previously deployed variants may have been replaced by previously generated new engine parameter sets, and evaluation results of previously deployed variants may have been stored by the PredictionIO or machine learning platform. The new engine parameter set generated in the current round may then be deployed to replace the existing engine variant. Replacing old engine variants is an optional feature, as old engine variants may also remain in memory for future analysis and comparison, if desired or necessary.

Figure 7A:
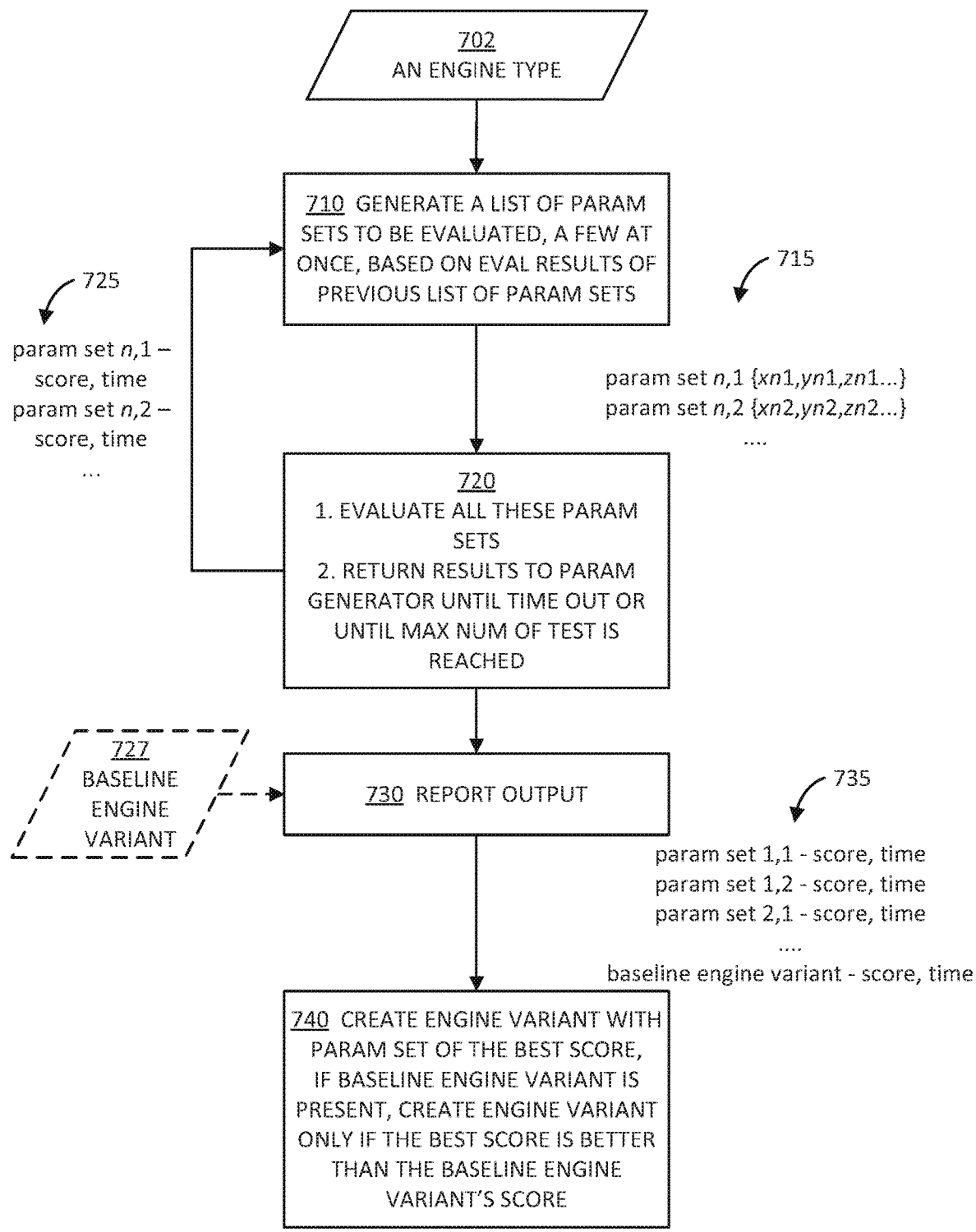
FIG. 7A depicts a method for automatically tuning parameters of a predictive engine by evaluating iteratively generated lists of parameters sets in accordance with described embodiments.

FIG. 7A depicts a method for automatically tuning parameters of a predictive engine by evaluating iteratively generated lists of parameters sets in accordance with described embodiments.

Figure 7B:
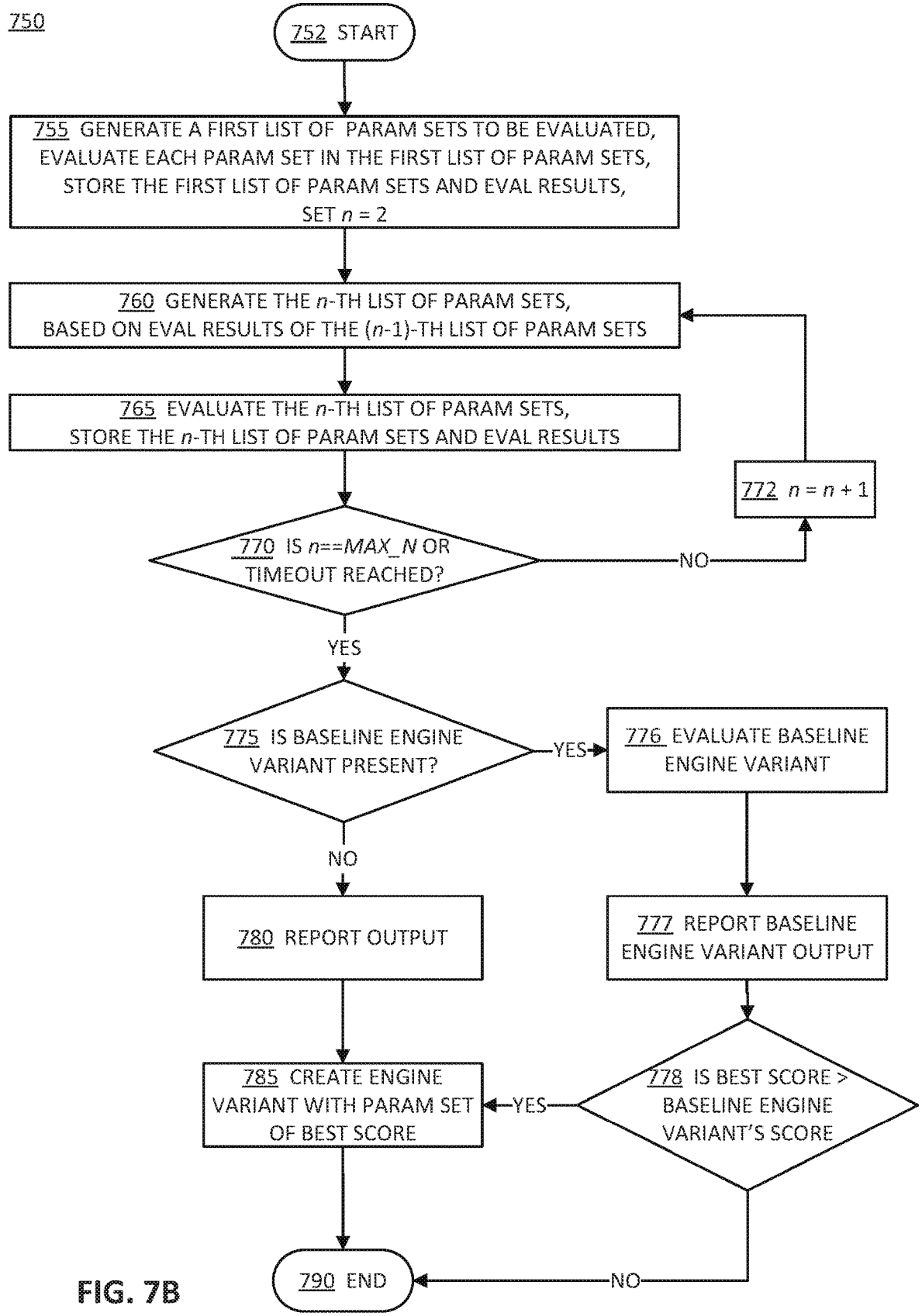
FIG. 7B depicts a method for automatically tuning parameters of a predictive engine by evaluating iteratively generated lists of parameters sets in accordance with described embodiments.

More particularly, FIG. 7A depicts a use flow diagram 700 showing a method of automatically tuning parameters of a predictive engine by evaluating iteratively-generated lists of parameter sets, according to one embodiment. Correspondingly, FIG. 7B is an exemplary flow diagram 750 showing a detailed implementation of the use flow 700 shown in FIG. 7A. In FIG. 7A, given an engine type 702, a parameter generator generates a first list, or batch, of engine parameter sets at step 710. The current list of engine parameter sets 715 is then evaluated according to one or more pre-defined metrics at step 720, and the evaluation results 725 are returned to the parameter generator, unless a maximum number of tests or time out has been reached. The parameter generator then generates the next list of engine parameter sets, based on evaluation results of the previous list of engine parameter sets. In this example shown in FIG. 7A, the n-th list of engine parameter sets is represented as tuples $\{(xn1, yn1, zn1, \ldots), (xn2, yn2, zn2, \ldots), \ldots\}$, where each element of a parameter set may take on textual or numerical values. In some embodiments, a baseline engine variant is presented as optional input 727 and is also evaluated. Baseline engine variant 727 is of engine type 702, and may take on default engine parameter values stored in a PredictionIO or machine learning platform, may be generated manually by an operator, or may be generated automatically. The parameter values, evaluation scores and computation times of each of the generated engine parameter sets and the baseline engine variant are reported at step 730 as output 735, and a new engine variant is created with the parameter set of the best score at step 740. If a baseline engine variant is present, a new engine variant is created only if the best score is better than the baseline engine variant's score. This illustrative example shows the tuning of engine parameter sets. In other words, the Data source/data preparator, Algorithm, Serving, and Evaluation components and their parameters can all be tuned in this manner as presented herein.

FIG. 7B depicts a method for automatically tuning parameters of a predictive engine by evaluating iteratively generated lists of parameters sets in accordance with described embodiments.

More particularly, FIG. 7B illustrates an exemplary implementation of the engine parameter tuning process shown in FIG. 7A as a flow diagram 750 which starts 752 at step 755, where a first list of engine parameter sets is generated, evaluated, and the corresponding results are stored. The iteration index n is set to 2. The first or initial list of engine parameter set may be generated from a base engine parameter set, or a base list of engine parameter sets, where the base engine parameter set or base list of engine parameter sets may take on stored default values, or may be derived from previous engine parameter set tuning and evaluation steps not show here. The first list of engine parameter sets may include the base engine parameter set or the base list of engine parameter sets. At step 760, the n-th list of engine parameter sets is evaluated, based on evaluation results of the (n−1)-th list of engine parameter sets. Alternatively, the n-th list of engine parameter sets may be evaluated based on evaluation results of all (n−1) previous lists of engine parameter sets. Evaluation of the n-th list of parameter sets is carried out at step 765, and the evaluation results are stored in addition to the n-th list of engine parameter sets itself, for later reporting. If neither a maximum number of tests MAX_N nor timeout has been reached at step 770, the parameter generation and evaluation processes continue through step 772. Otherwise, the presence of an optional baseline engine variant is considered at step 775. Without a baseline engine variant, the parameter sets and corresponding evaluation results are reported at step 780, and a new engine variant with a parameter set of the best score is created at step 785 before the tuning process terminates at step 790. If a baseline engine variant is present, it is evaluated at step 776, the evaluation result for the baseline engine variant is reported at step 777, and compared to that of the best score out of the list of parameter sets at step 778. A new engine variant is then created only if the best score is better that the score of the baseline engine variant. In addition to the process shown in flow chart 750, alternative implementations of the use flow 700 is also possible.

Prediction History Tracking

In addition to evaluating the performance of predictive engines and tuning engine parameter sets, a PredictionIO or machine learning platform may record actual results, including subsequent user actions, actual correct results, or actual information of the previously unknown event now revealed, after a prediction has been made. Thus, prediction history can be tracked for updating predictive engines during deployment. Such prediction history tracking may be performed in real-time, with live evaluation results returned as feedback to predictive engines for further engine parameter tuning and prediction accuracy improvement. Prediction history may also be individually or collectively replayed to operators of predictive engines for troubleshooting purposes.

In some embodiments, a PredictionIO or machine learning server generates and logs a unique tracking tag for each user query. Correspondingly, predicted results generated in response to the current query and parameters of the engine variant deployed are associated with the same tracking tag. A tracking tag may be an alphanumerical string, such as "X" or "X1", a tuple of alphanumerical strings such as "(X, 1)", or any other identifier capable of identifying individual queries. Recall that in some embodiments, a query may include identifying information including user ID, product ID, time, and location. Similarly, a tracking tag may be in the form of (user-device ID, user ID, time stamp). Subsequent actual results including user actions and behaviors, and actual correct results revealed after the prediction result has been served, are also logged under the same tracking tag. As a result, prediction results and actual results can be segmented or categorized according to identifying information such as product name, time, day of week, user categories, and/or attributes. User actions and/or behaviors may be monitored over a long period of time such as several hours, days, or even months. User actions or behaviors may also be logged as sequences instead of a set of individual events. For example, a user may click on five products before purchasing a particular product. All five user clicks and the purchase may be viewed together as a sequence of user actions. User actions or behaviors may also be further segmented according to connection sessions or even browsing windows. For example, user actions performed on one webpage may be recorded separately from user actions performed on another webpage, or they can be combined under the same user ID. Collectively, such tracking data as identified by the possibly unique tracking tag can be replayed to a developer of a predictive engine automatically or upon request to assist in improving and understanding the performance of predictive engines. Tracking tags are thus also called replay tags. As previously discussed, a "user" refers to any entity that interacts with a PredictionIO or machine learning server or predictive engines, and may or may not be a person.

More specifically, a PredictionIO or machine learning server may include a replay loop to perform live evaluation of predictive engines with great details and high levels of accuracy. In some embodiments, a PredictionIO or machine learning server provides a special data source (data reader) or event datastore that can use the tracking data to replay how a prediction engine performs. This data source is able to reconstruct the complete history of each user that queries the system. In addition to tracking tags specific to individual queries, other types of data characteristics or meta-data can be employed to group and sort tracking data. Such meta-data may or may not be part of the tracking tags themselves. A replay loop may be displayed graphically or textually to a developer of the system or an operator of the replay loop. Exemplary displays include event logs and graphs, time-series plots, performance curves, charts, and so on. The PredictionIO server may also provide a special evaluator component that takes the complete history of each user and produce accurate and detailed reports of how each prediction performed. Besides obtaining a better picture of how the prediction engine performs in contrast to black-box tests, this level of detail enables fine tuning and troubleshooting of the prediction engine by data scientist and engine developers.

Figure 8:
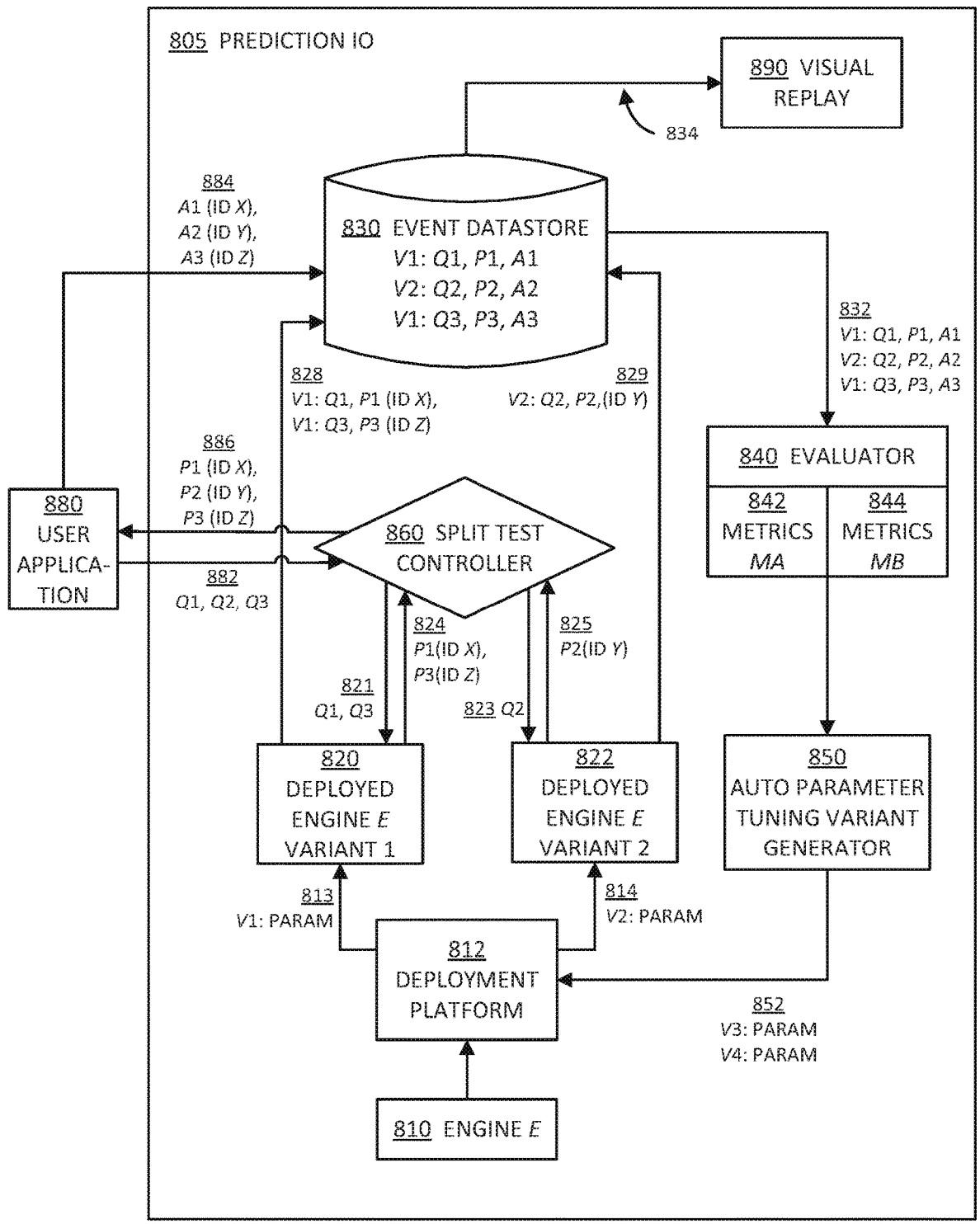
FIG. 8 depicts an exemplary process for evaluating and tuning two variants of a predictive engine in accordance with described embodiments.

FIG. 8 depicts an exemplary process for evaluating and tuning two variants of a predictive engine in accordance with described embodiments.

More particularly, FIG. 8 depicts an exemplary diagram 800 showing a PredictionIO or machine learning platform 805 in the process of evaluating and tuning two engine variants, according to one embodiment. Other than user application 880, all components shown in FIG. 8 may be implemented as part of a PredictionIO or machine learning platform 805. A distributed implementation is also possible.

In this embodiment, two variants of a predictive engine E are deployed through a PredictionIO or machine learning platform. Each of the two variants receives queries from a user application and generates predicted results. Such predicted results are tagged with tracking or replay IDs, and are subsequently evaluated, with their corresponding engine parameter sets tuned to generate two new variants of the predictive engine E. An engine variant is a deployable instance of a predictive engine specified by an engine parameter set. In FIG. 8, the first variant 820 of engine E 810 is specified by engine parameter set 813, while the second variant 822 of engine E 810 is specified by engine parameter set 814. As depicted here, deployed engine E variant 1 at element 820 passes V1: Q1, P1(ID X), V1: Q3, P3 (ID Z) as depicted by element 828 into the event data store at element 830 and similarly, deployed engine E variant 2 at element 822 passes V2: Q2, P2(ID 2) as depicted by element 829 into the event data store at element 830. Given the collection of parameters within event datastore 830, it is possible to initiate visual replay 890 by passing the parameters and replay tracking data 834 from the event datastore 830 to the visual replay 890 module.

An exemplary value of the parameter set 813 is as follows:

```
Parameter Set 813 {
    DataSource: x2
    AlgorithmList:
        Algorithm 4:
            AlgoParam1: b1
            AlgoParam2: a2
        Algorithm 2:
            AlgoParamY: 33
}
```

Parameter set 813 states that variant 820 uses DataSource x2, and Algorithms 4 and 2. The values of algorithm parameter1 and algorithm parameter2 of Algorithm 4 are set to b1 and a2 respectively, while the value of the parameter Y of Algorithm 2 is set to 33.

Similarly, an exemplary value of the parameter set 814 is as follows:

```
Parameter Set 814 {
    DataSource: x1
    AlgorithmList:
        Algorithm 1:
            AlgoParam1: a1
            AlgoParam2: a2
        Algorithm 2:
            AlgoParamZ: 23
}
```

Parameter set 814 states that variant 820 uses DataSource x1, and Algorithms 1 and 2. The values of algorithm parameter1 and algorithm parameter2 of Algorithm 1 are set to a1 and a2, while the value of the parameter Z of Algorithm 2 is set to 23.

According to various embodiments, the evaluation and tuning processes may start at either deployment platform 812 or user application 880. For example, after deployment platform 812 deploys engine variant 820 and engine variant 822, user application 880 may send three queries Q1, Q2, and Q3 (882) to the PredictionIO or machine learning platform 805. In some embodiments, a query may include identifying information including user ID, product ID, time, and location. A split test controller 860 determines where each query shall be transferred to in terms of processing via an available deployed variant. In some embodiments, a single query may be transferred to more than one deployed engine variants. In this example, queries Q1 and Q3 (821) are passed to first variant 820, while query Q2 (823) is passed to second variant 822. Deployed engine variant 820 then generates predicted results 824 including predicted result P1 with replay ID X, and predicted result P3 with replay ID Z. Replay IDs in this example are alphanumeric tracking tags specific to individual queries. Similarly, deployed engine variant 822 generates predicted results 825 including predicted result P2 with replay ID Y. Predicted results 824 and 825 are then passed back to split test controller 860, to be exported as output 886 to user application 880. In embodiments where more than one user application is present, the split test controller may track which user application a particular query is generated from, and then transfer the corresponding predicted results to the respective application. In some embodiments, predicted results may be served to user applications other than the one where queries have been generated.

In addition to passing predicted results to the split test controller, each deployed engine variant 820 and 822 also passes data 828 and 829 to datastore 830 in this example shown in FIG. 8. Data 815 include two sets of tracking data, one specified by replay ID X and one specified by replay ID Z. The first set of tracking data specified by replay ID X includes query Q1, predicted result P1, and a description of engine variant V1. This description of engine variant V1 may be engine parameter set 813 itself, or some meta-data that uniquely identifies engine parameter set 813 to event datastore 830. Similarly, the second set of tracking data specified by replay ID Z includes query Q3, predicted result P3, and a description of engine variant V1. Data 829 include a single set of tracking data specified by replay ID Y, and are comprised of query Q2, predicted result P2, and a description of engine variant V2.

In this embodiment, at user application 880, user actions and/or behaviors collected subsequent to receiving predicted results P1, P2, and P3 (886) from the PredictionIO or machine learning platform 805 are considered as actual results A1, A2, and A3 (884) respectively, and tagged with corresponding Replay IDs. Such user actions may be collected in real-time, or over a given time span such as a few hours, a day, or a week. Recall that each query evokes a prediction process to generate a predicted result, and each query is uniquely identified by a replay ID. Hence, multiple user actions or actual results corresponding to a particular query with a given replay ID may be tagged with the same replay ID. For example, actual result A1 shown in FIG. 8 may represent a sequence of user clicks and browsed product pages, all corresponding to query Q1, product recommendation P1 and replay ID X.

After actual results 884 are transferred to datastore 830, engine variant parameter sets, queries, predicted results, and actual results corresponding to the same Replay ID are aggregated within datastore 830, using the data source (data reader) or event datastore mentioned above. Aggregated data sets 832 are sent to evaluator 840 for evaluation. In this embodiment, two metrics 842 and 844 are used within evaluator 840, individually or in combination. Evaluation results are sent to auto parameter tuning variant generator 850. Auto parameter tuning variant generator 850 functions in cooperation with evaluator 840 according to one of the processes discussed with reference to FIGS. 5A to 7B, before outputting updated engine parameter sets 852 that specify two new variants V3 and V4 for Engine E. The newly generated engine variants may be subsequently deployed by deployment platform 812. The cycle of prediction, evaluation, and auto parameter tuning continues as more user queries are imported into the system.

In some embodiments, engine variant V3 is generated based on engine variant V1 alone, and engine variant V4 is generated based on engine variant V2 alone. In some embodiments, both engine variants V3 and V4 are generated based on both engine variants V1 and V2. For example, as part of evaluator 840 or auto parameter tuning variant generator 850, variants V1 and V2 of engine E 810 may be compared according to computed metrics 842 and 844. Such pair-wise comparison may provide a better-performing engine variant, the engine parameter set of which may in turn serve as a base parameter set for generating new variants V3 and V4. In another example, more than two variants may be deployed and evaluated at the same time. Evaluator 840 may sort or rank the performances of such multiple engine variants, with pair-wise or multiple-way comparisons, before generating new engine variants for further deployment and evaluation.

In some embodiments, one or more new engine variants may be determined manually by an operator. For example, the operator may examine evaluation results output by evaluator 840, and manually input a new set of engine parameters as new engine variant V3. In another example, the operator may directly modify the output of auto parameter tuning variant generator 850.

In addition to auto parameter tuning, a developer of the predictive engine E or an operator of the replay loop as shown in FIG. 8 may prefer to examine prediction history to tune engine parameter sets directly and to troubleshoot issues in predictive engine design. For example, Prediction platform 805 may include an interface or a hook to such an interface for users or operators to provide actual results directly. According to certain embodiments, the PredictionIO or machine learning platform 805 may also allow operators to tag debugging information, so each prediction will have debugging information that can be examined using a Replay feature as will be discussed next. Visual replay 890 may replay tracking data from datastore 830 and available debugging information to operators, thus providing insights into the selection and tuning of data sources, algorithms, algorithm parameters, as well as other engine parameters that may affect the performance of a predictive engine. Such extensive replay of prediction history allows operators to understand and deduce why particular prediction results are generated and how prediction performances can be improved.

Replay Examples

According to various embodiments, users may replay prediction scenarios to analyze, visualize and detect the change of prediction accuracy over various segmentations, such as time. Take the following three types of prediction problems as examples, shown in Table 1.

TABLE 1

Replay Examples

| | Query | Predicted Result | Actual Result (or user actual action) |
|---|---|---|---|
| 1 | Text | Suggestion | Complaint |
| 2 | <P1, P2, P3> | <P10, P11> | <P10, P20> |
| 3 | <user id> | <P10, P11> | <P10, P20> |

The examples shown in Table 1 correspond to:
1. Classification. Given a document of text body, predict whether it is a suggestion or a complaint.
2. Similar item recommendation. Given a list of items, predict which other ones are similar to them.
3. Personalized recommendation. Given a user id, predict which items the user will incline to take actions on.

The Replay process may further allow operators to visualize the predicted results with actual results during the evaluation phase.

Replay for Performance Analysis and Monitoring

As prediction history and tracking data are collected and stored, prediction scenarios may be replayed and the complete prediction history of each user that queries the system may be reconstructed, allowing operators of the replay process to analyze, visualize, and detect changes of prediction accuracy over various segmentations, such as different time periods. Recall from the discussion of evaluator 450 in FIG. 4 that actual results such as actual user behaviors may be received from a datastore or a user application during the evaluation phase. Such actual results may be visualized with predicted results through visual replay 890 for comparative purposes. Given a particular replay ID, visual replay 890 may retrieve and selectively display associated query, predicted result, actual result, additional auxiliary user information or meta-data, and possibly the corresponding engine variant as given by the engine parameter set. In some embodiments, a selected subset of tracking data may be visually displayed, where the subset is pre-defined or manually configured by an operator of visual replay 890. Patterns, anomalies, and trends in tracking data may thus be analyzed by the system or by the operator directly. A replay of prediction history or engine performance may or may not be followed by further engine parameter tuning processes.

As the cycle of prediction, evaluation, and auto parameter tuning takes place, visual replay 890 may function as a task monitor, allowing the operator to selectively and incrementally view tracking data thus collected. In some embodiments, operators can be notified when user conversion (decision to purchase) drops below a certain predefined threshold for a particular engine or engine variant. The operator can then utilize the replay feature of the PredictionIO or machine learning platform for troubleshooting and continuous prediction performance monitoring.

Figure 9:
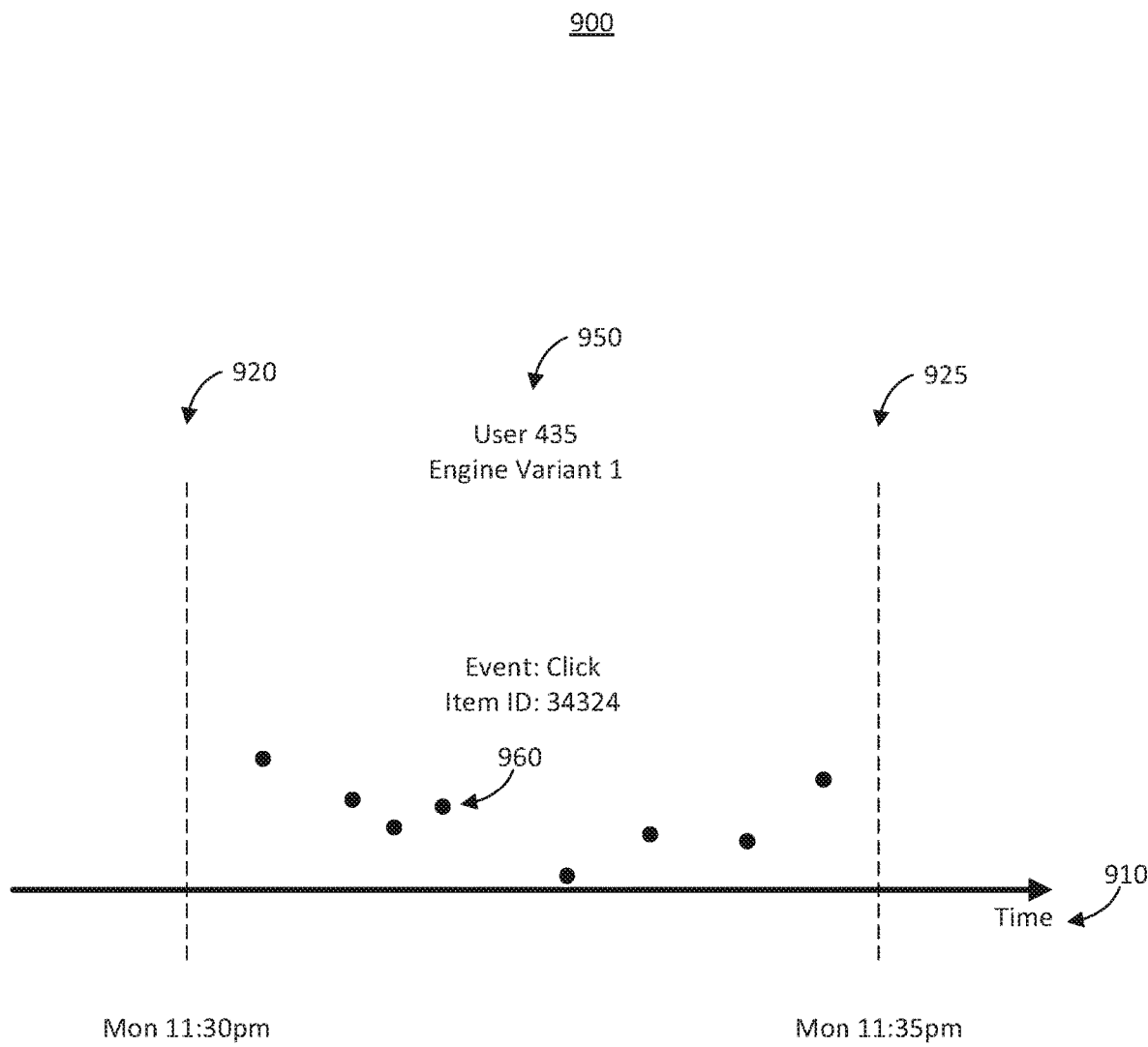
FIG. 9 depicts an exemplary graph of user actions recorded over a given time period in accordance with described embodiments.

FIG. 9 depicts an exemplary graph of user actions recorded over a given time period in accordance with described embodiments.

More particularly, FIG. 9 depicts an exemplary graph 900 of results, in this case, actual user actions recorded over a given time period, according to one embodiment. In this particular visualization example, user actions are plotted between a starting time 920 at 11:30 pm on a given Monday and an end time 925 at 11:30 pm on the given Monday. Each data point on the plot represents a particular user action or event that occurred after a target prediction has been made in response to a user query with a replay ID. Tracking data 950 are displayed on the graph to show that the plotted actual user actions are taken by user 435, after an engine variant 1 has been employed to make predictions. Alternatively, a replay ID or the engine parameter set may be displayed. In some embodiments, the replay ID may comprise the displayed user ID, engine variant, and a given time span, with the horizontal axis depicting the direction of time 910 from left to right. In other words, visual replay of tracking data may be based on user segments. In this particular example, tracking data 960 are displayed next to a data point to indicate that a click event has been detected and assigned an item ID of 34324.

In this example, actual user actions over a five-minute time period of segmentation are plotted. In some embodiments, actual results or other types of tracking data may be plotted over shorter or longer time segmentations. In some embodiments, tracking data associated with multiple users, multiple queries, or multiple replay IDs are plotted on the same graph. Moreover, data may be grouped by cohort, session, and other types of data characteristics. The PredictionIO or machine learning platform may automatically detect patterns in tracking data, and cluster them accordingly. On the other hand, operators may specify desired groupings directly. For example, operators can select a specific user and session, to see all the events associated with the user or session.

In addition to displaying tracking data directly, the PredictionIO or machine learning platform may produce detailed reports on prediction histories, enabling the further fine tuning of prediction engines.

Figure 10:
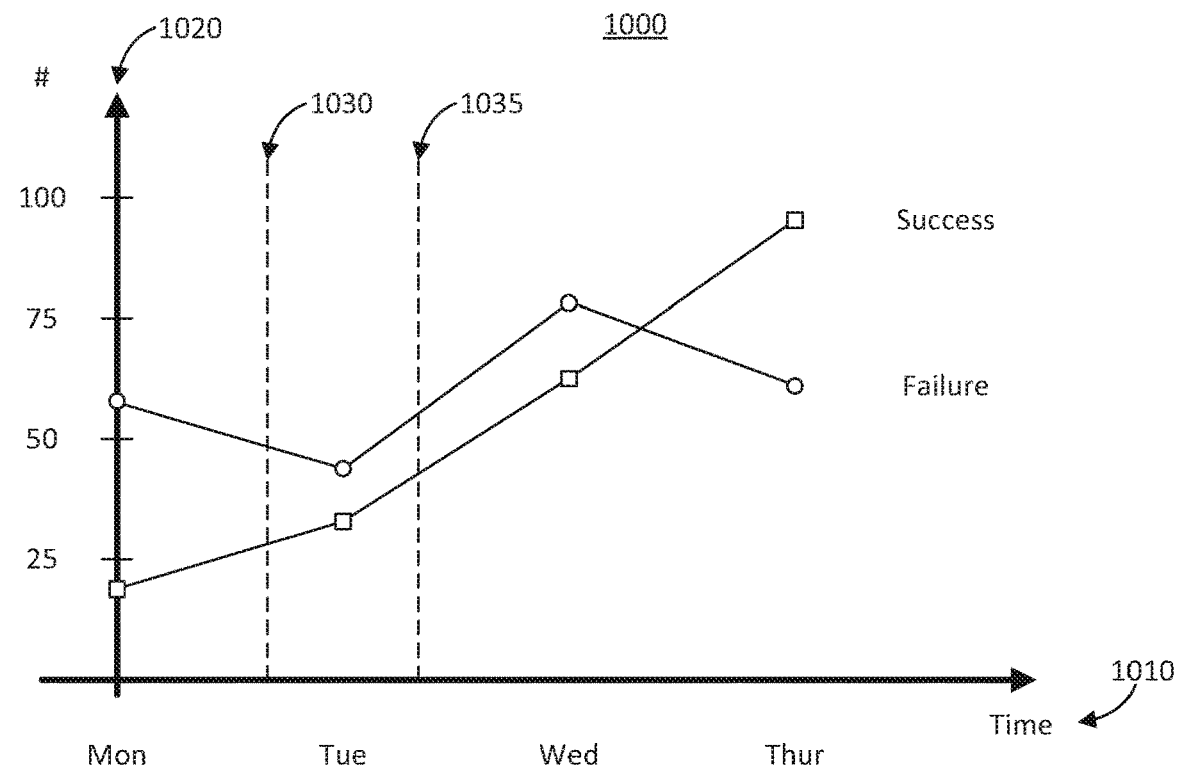
FIG. 10 depicts an exemplary plot showing how reports of prediction results may be viewed graphically in accordance with described embodiments.
Figure 11:
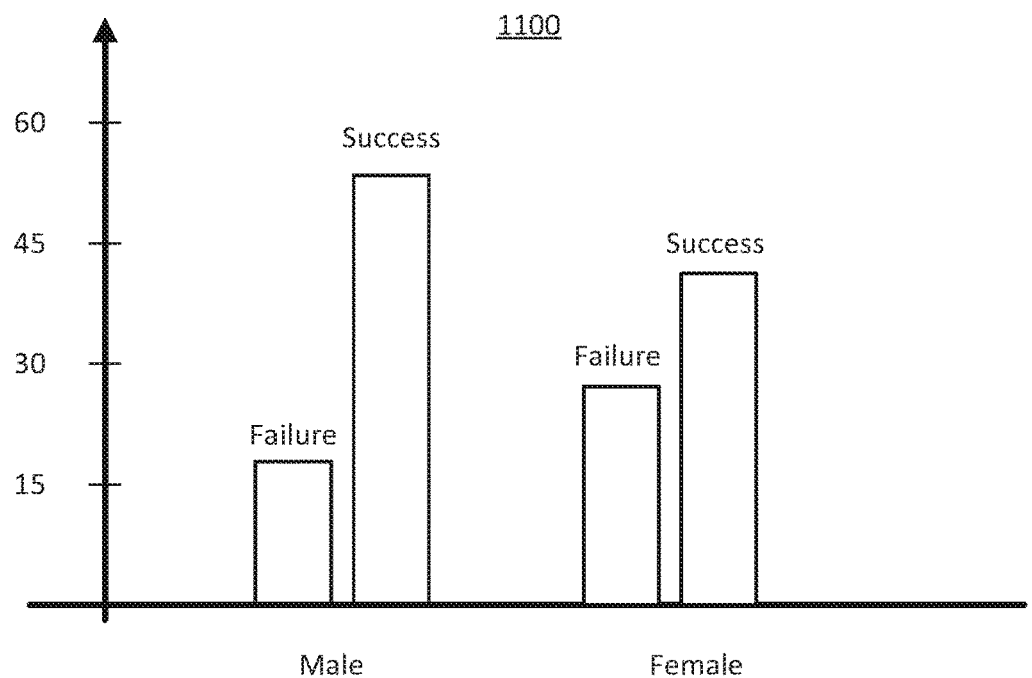
FIG. 11 depicts an another exemplary plot showing how reports of prediction results may be viewed graphically in accordance with described embodiments.

FIG. 10 depicts an exemplary plot 1000 showing how reports of prediction results may be viewed graphically in accordance with described embodiments and FIG. 11 depicts an another exemplary plot 1100 showing how reports of prediction results may be viewed graphically in accordance with described embodiments.

More particularly, FIGS. 10 and 11 are two illustrative plots showing how reports of prediction results may be viewed graphically, according to certain embodiments. FIG. 10 shows the number of prediction successes and failures over a four-day time-span. In this example, the horizontal time axis 1010 is divided into individual days, while the vertical axis 1020 represents the number of occurrences. The piecewise-linear success and failure curves may refer to a particular engine variant, or all variants of a particular predictive engine. In some embodiments, vertical axis 1020 may be set in a percentage scale or a log scale. In addition to graphical representations, this report of prediction results may alternatively be generated as a table.

An operator of the replay process may further zoom in and out of a certain time period such as a single day, as indicated by lines 1030 and 1035, to examine additional details and to further troubleshoot issues in predictive engine design and engine parameter tuning. Although only four data points are shown for each time-series data curve in FIG. 10, in some embodiments, number of prediction successes and failures may be statistically summarized over strategically generated samples and time-spans. The PredictionIO or machine learning platform may provide default values for the time scale. In some embodiments, the PredictionIO or machine learning platform may take into account the amount of data available to dynamically determine optimal time scale values for binning purposes. In yet some other embodiments, the PredictionIO or machine learning platform may further generate and display linear or non-linear regression curves to model the observed tracking data. The "Success" and "Failure" metrics shown here are two examples of statistics useful for analyzing prediction performances. Operators may define additional metrics such as success rates and confidence statistics, and more than two metrics may be provided in a report, and shown graphically in a visualization.

As previously discussed, data may be grouped by cohort, session, and other types of data characteristics in generating useful statistics for analyzing prediction results. FIG. 11 is a bar chart of prediction successes and failures plotted against different genders. By considering different genders separately, it becomes clear that the current engine or engine variant under consideration is more tailored for male users instead of female users. Consequently, an operator or developer may decide to include gender as an additional variable in the predictive model. In some embodiments, other types of charts such as histograms and scatter plots may be displayed.

Data Augmentation

In FIG. 11, success and failure metrics are plotted against different genders. In some embodiments, the PredictionIO or machine learning platform provides a data augmentation feature for augmenting available user data with additional information such as gender. For example, external information to be augmented may include ZIP code, age group, ethnicity, occupation, and family size. Additional information to be augmented may also be mined from behavior data. For example, users may be classified into high-spending and low-spending groups, or frequent on-line shopping or non-frequent on-line shopping groups. Data augmentation provides new ways of categorizing tracking data for better performance monitoring and analysis.

Support for Multiple Experiments

Recall from the discussion with reference to FIG. 8, that multiple engine variants may be tested and studied at the same time, with a split test controller determining to which engine variant any given a user query is dispatched.

Figure 12:
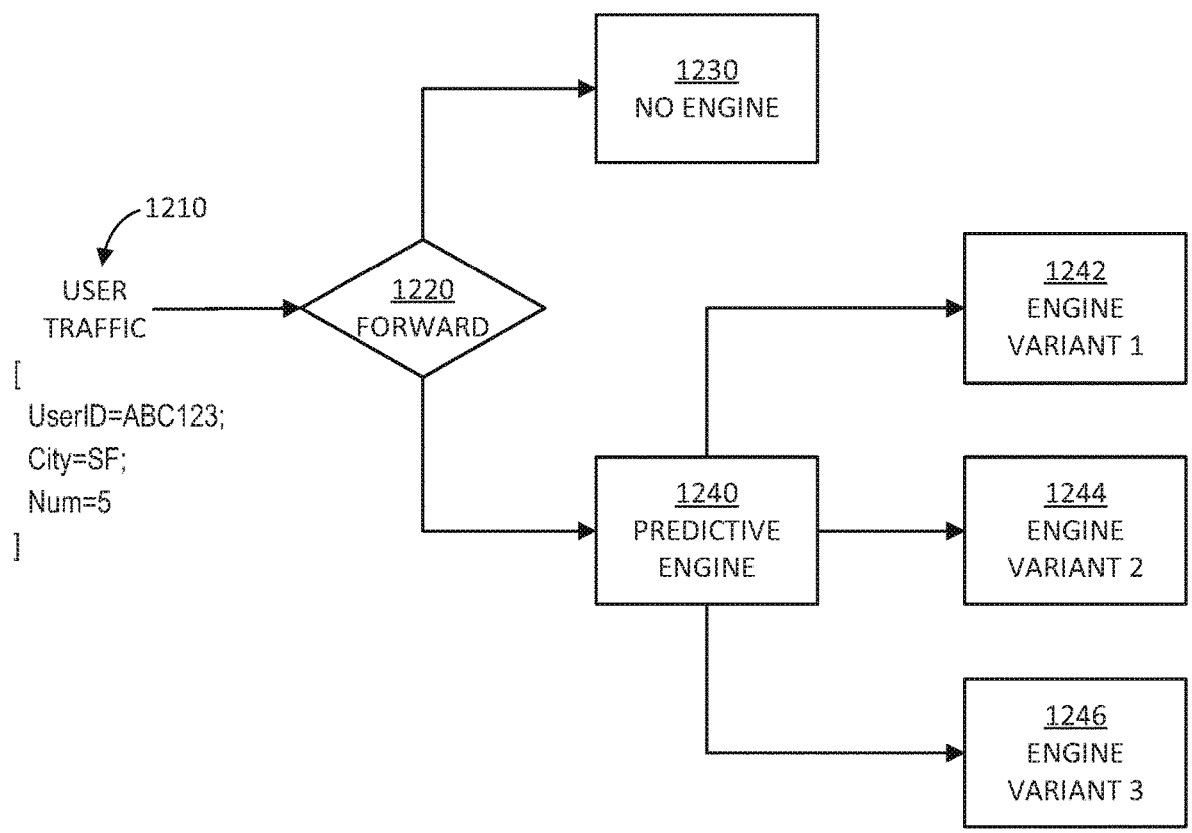
FIG. 12 depicts an exemplary system for testing multiple engine variants at the same time in accordance with described embodiments.

FIG. 12 depicts an exemplary system for testing multiple engine variants at the same time in accordance with described embodiments.

More particularly, FIG. 12 depicts an exemplary system 1200 for testing multiple engine variants at the same time, according to certain embodiments.

In system 1200, input user traffic 1210 may be allocated dynamically through forward 1220, based on the performance of each engine variant under consideration. For example, initially, half of new user traffic or queries 1210 may be directed to the predictive engine 1240, while the remaining half are simply stored and thus not directed to a predictive engine, as indicated by the No Engine placeholder 1230. In some embodiments, forward 1220 is a split test controller similar to component 860 shown in FIG. 8. Predictive traffic through predictive engine 1240 may be equally shared among its three variants 1242, 1244, and 1246. Thus each engine variant takes on one-sixth of the overall user traffic. Overtime, it may be determined that a specific variant such as engine variant 1242 provides higher prediction accuracy. As a result, forward 1220 may automatically direct more than one-sixth of overall traffic to engine variant 1242 to optimize overall system performance. The PredictionIO or machine learning platform seeks to strike a balance between exploration and exploitation. In yet some other embodiments, forward 1220 may direct the same predictive traffic to multiple engine variants, thus enabling direct comparison of prediction results and prediction accuracy across the multiple engine variants.

In some embodiments, a PredictionIO or machine learning platform may deploy multiple engine variants with initial sets of engine parameters or initial engine parameter settings. The deployed engine variants then receive queries, as allocated by a splitter, and respond with predicted results. Corresponding actual results are also received. Evaluation results are then generated and the current engine parameter sets and evaluation results are passed to an engine parameter generator. From time to time, the engine parameter generator generates one or more new parameter sets based on evaluation results of the current variants, and sometimes, evaluation results of some or all previously deployed variants. Such previously deployed variants may have been replaced by previously generated new engine parameter sets, and evaluation results of previously deployed variants may have been stored by the PredictionIO or machine learning platform. The one or more new engine parameter sets generated in the current round may then be deployed to replace the existing engine variants.

In yet other embodiments, a PredictionIO or machine learning platform may perform evaluation, tuning, and/or comparison of multiple engines. For example, multiple engines may be implemented by different developers and data scientists for a particular prediction problem such as classification of incoming mail as spam or non-spam, or recommendation of similar items. A PredictionIO or machine learning platform may provide, to externally or internally implemented predictive engines, engine evaluation, engine parameter set tuning, prediction history tracking, and replay services as discussed throughout the current disclosure. For multiple engines targeting the same prediction problem, the PredictionIO or machine learning platform may serve as an interface for cross-comparison and engine selection. For multiple engines targeting different prediction problems based on queries from the same user, PredictionIO or machine learning platform may serve as an interface for cross-examination, selection, and aggregation.

Visual Replay

In addition to illustrative plots depicted at FIGS. 9, 10, and 11, the additional FIGS. 13-18 provide illustrative visual displays of prediction performances over one or more replay groups. A replay group refers to a pre-defined or operator-defined segment of queries that satisfy one or more conditions as provided through query segment filters. Replay groups may be created for textual or visual displays. Examples of query segment filters include engine variant filters, user attribute filters, item attribute filters, query attribute filters, and other property filters or conditional filters capable of selecting a subset of available queries for performance analysis and monitoring. For example, an engine variant filter may select queries that have been, or will be processed through a given engine variant, and a single query may be assigned to multiple replay groups if it has been or will be processed through multiple engine variants; a user attribute filter may be applied if queries contain at least a user, and may be used to select queries associated with users in a particular age group; an item attribute filter may be applied if queries contain at least an item; and an query time attribute filter may be applied if queries have associated timestamps. Multiple query segment filters may be used jointly, and filtered results may be combined as intersections or unions of query segments. Query segment filters may be pre-defined or operator-defined, and may be applied automatically or upon request by an operator. In addition, since query segment filters select subsets of queries without necessarily affecting the prediction process, they may be applied during any stage of the predictive engine tuning, evaluation, and replay process. In one example, a query segment filter may be applied to a query as the query is received from an end-user device, before the prediction process takes place. In another example, a query segment filter may be applied to stored queries or query records after predictions have been made already. Each query may be associated with one or more replay group IDs as query segment filters are applied.

As a more specific example, a recommendation engine may be deployed as an Engine Variant e_v_100, with an initial or default engine parameter set. A query to ask this engine to recommend five products to an exemplary user ABC123 when the user is in San Francisco may look like [userid=ABC123, city=SF, num=5]. Since userid refers to a user, a filter of a new replay group for Engine Variant e_v_100 may have user attribute options. User attributes can be anything that the system has stored about users. For instance, age, gender, sign up date, plan or service a user has signed-up for, range of user ids, dates, and so on. If the system contains users' behavior data, the filter can even go further to select queries that have targeted users who have performed certain actions during a certain time range. For example, one or more filters may be applied to generate a replay group by selecting queries for recommending five products to female users when they are in San Francisco.

Figure 13:
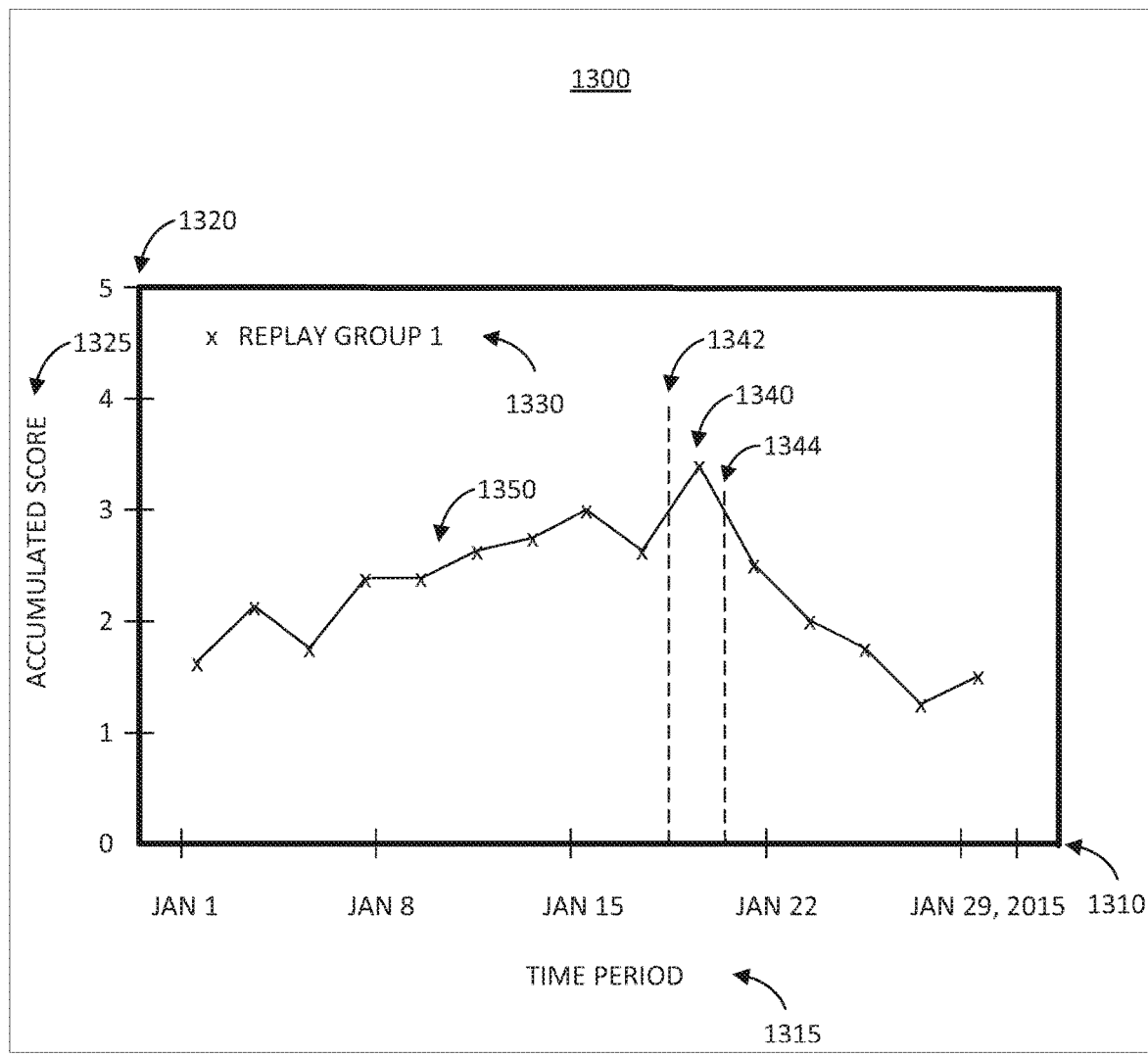
FIG. 13 depicts an exemplary visual display of prediction performances of a predictive engine over a replay group in accordance with described embodiments.

FIG. 13 depicts an exemplary visual display of prediction performances of a predictive engine over a replay group in accordance with described embodiments.

More particularly, FIG. 13 depicts an illustrative visual display of prediction performances of a predictive engine over a replay group, according to one embodiment. In this example, performance of the prediction process evoked in response to a given query is quantified, or quantitatively represented, by a prediction score. A prediction score may be calculated by at least one pre-defined or operator-defined score function based on the predicted result(s) and actual result(s) associated with the query. Generally, the deployed engine variant, derived predicted results, actual results, and corresponding computed prediction scores are all associated with the replay ID specific to the given query. In some embodiments, the prediction score is computed by evoking a score function using a score_function(PredictedResult, ActualResult) command. A score function may also take on additional inputs that further configure the score computation process. Different score functions may be provided by a PredictionIO or machine learning platform. In some embodiments, an operator may define multiple score functions and each replay group may have more than one set of prediction scores.

Depending on how such score functions are defined, computed prediction scores may take on both positive and negative values in some embodiments, but be non-negative in some other embodiments. Computed prediction scores may also be normalized, and may take on continuous or discrete values. For example, consider an input predicted result containing two items, such as (P10, P11), and an input actual result also containing two items. In some embodiments, a score function may return a value of 1 if the input actual result is exactly the same, i.e., (P10, P11), and 0 otherwise. In some embodiments, a score function may return a score of 0, 1, or 2, depending on the number of overlapping items from the predicted result and the actual result. Such a score may also be normalized to 0, 0.5, or 1, representing the percentage of correctly predicted items.

In this and subsequent illustrative examples shown in FIGS. 13 to 18, prediction performances are plotted in terms of accumulated prediction scores over time. Here an accumulated prediction score is calculated by an accumulation function that summarizes the prediction scores of all queries of a replay group within defined time intervals over a given time period. For example, each query may have an associated timestamp, representing the time at which the query was received by the predictive engine. According to such timestamps, queries within a replay group may be segmented for computing accumulated prediction scores. In another example, a timestamp may represent when a prediction has been made, or a sign-up date/time at which a user has signed-up for prediction service. Generally, computation of accumulated predicted scores may be carried out over any categorization or segmentation of queries within a replay group. Furthermore, when multiple score functions are defined, multiple accumulated scores may be displayed on the same visualization chart or on separate charts.

The exemplary visual chart 1300 depicted by FIG. 13 shows prediction scores accumulated over two-day intervals during the month of January, 2015 for a Replay Group 1. Data points have been connected to generate a piecewise-linear curve 1350. The horizontal axis 1310 with label 1315 shows the time period of interest, between Jan. 1, 2015 inclusive, and Jan. 31, 2015 exclusive. In some embodiments, this time period of interest may cover one or more specific dates, consecutive or non-consecutive, or a range of dates. The vertical axis 1320 with label 1325 refers to accumulated prediction scores. Recall that each query may have a timestamp indicating the time and/or date at which the query has been received or when a prediction has been made by a PredictionIO or machine learning platform in response to the query. Although not shown explicitly here, Replay Group 1 may have been obtained through a query segment filter that selects all queries with timestamps within January, 2015. In FIG. 13, data point 1340 is the prediction score accumulated over all queries with a timestamp between time 1342 (Jan. 19, 2015) inclusive, and time 1344 (Jan. 21, 2015) exclusive. Time intervals such as the one between time 1342 and time 1344 represent how the system groups queries together over the whole time period of January, 2015. In a similar example, queries may be grouped into one-day intervals over a four-day period, and the prediction score may be defined to take on the value of 1 or 0 depending on whether an input prediction result is the same as an input actual result. The resulting plot of accumulated scores will then be similar to the success curve shown in FIG. 10.

An operator of the replay process may zoom in and out of the time period shown in FIG. 13, to examine additional details in the prediction performance visualization, thus further troubleshoot issues in predictive engine design. For example, although prediction scores are accumulated over two-day intervals during a single month in FIG. 13, in some embodiments, the system may allow an operator to manually configure the time interval(s) and time period for plotting. The PredictionIO or machine learning platform may also take into account the amount of data available to dynamically determine optimal time intervals for prediction score accumulation and visualization.

In some other embodiments, Replay Group 1 may be generated by selecting queries containing users who have signed up for prediction service during January, 2015. Generally, the time period 1315 may refer to any time-related query attribute. In other embodiments, prediction scores may be accumulated over different categories such as user gender, leading to accumulated score plots similar to the diagram shown in FIG. 11. Moreover, although accumulation has referred to a direct summarization operation in generating the plot shown in FIG. 13, in some embodiments, accumulation may refer to other algebraic or statistical operations such as averaging, weighed summation, and such. A direct summation operation is a weighed summation with weights equal to 1. An averaging operation is a weighed summation with weights equal to the reciprocal of the number of queries. A statistical sampling process followed by direct summation may be considered as a weighed summation with weights equal to 1 or 0. Non-linear weighing is also permissible according to certain embodiments.

In FIG. 13, only a single replay group has been visualized as curve 1350 and labeled by legend 1330.

Figure 14:
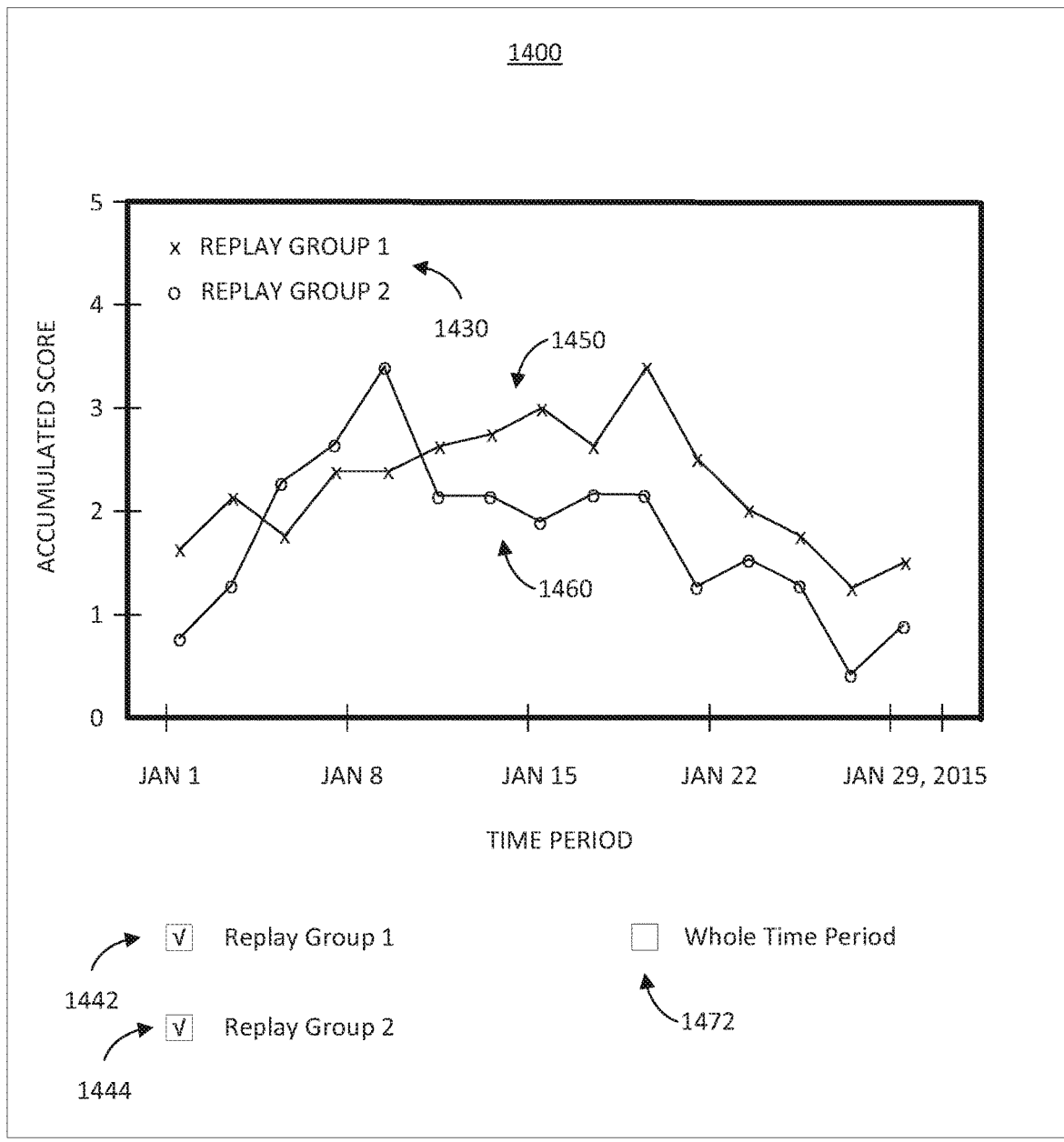
FIG. 14 depicts another exemplary visual display of prediction performances over two replay groups in accordance with described embodiments.

FIG. 14 depicts another exemplary visual display of prediction performances over two replay groups in accordance with described embodiment.

More particularly, FIG. 14 depicts an exemplary visual display 1400 of prediction performances over two replay groups, according to one embodiment. In addition to Replay Group 1 as represented by the curve 1450, accumulated scores for queries within Replay group 2 is visualized as curve 1460. Both replay groups are labeled by legend 1430. In addition, visual display 1400 includes three checkboxes 1442, 1444, and 1472, placed below the plotting window. Checking and un-checking boxes 1442 and 1444 turn the display of curves 1450 and 1460 on and off respectively. Box 1472 provides a "Whole Period" option, which sets the time interval for prediction score accumulation to the entire time period of interest. Checking box 1472 turns each of curves 1450 and 1460 into a single data point. In other words, under the whole period option, all queries within the time period of the chart will be summarized to generate a single accumulated prediction score.

Figure 15:
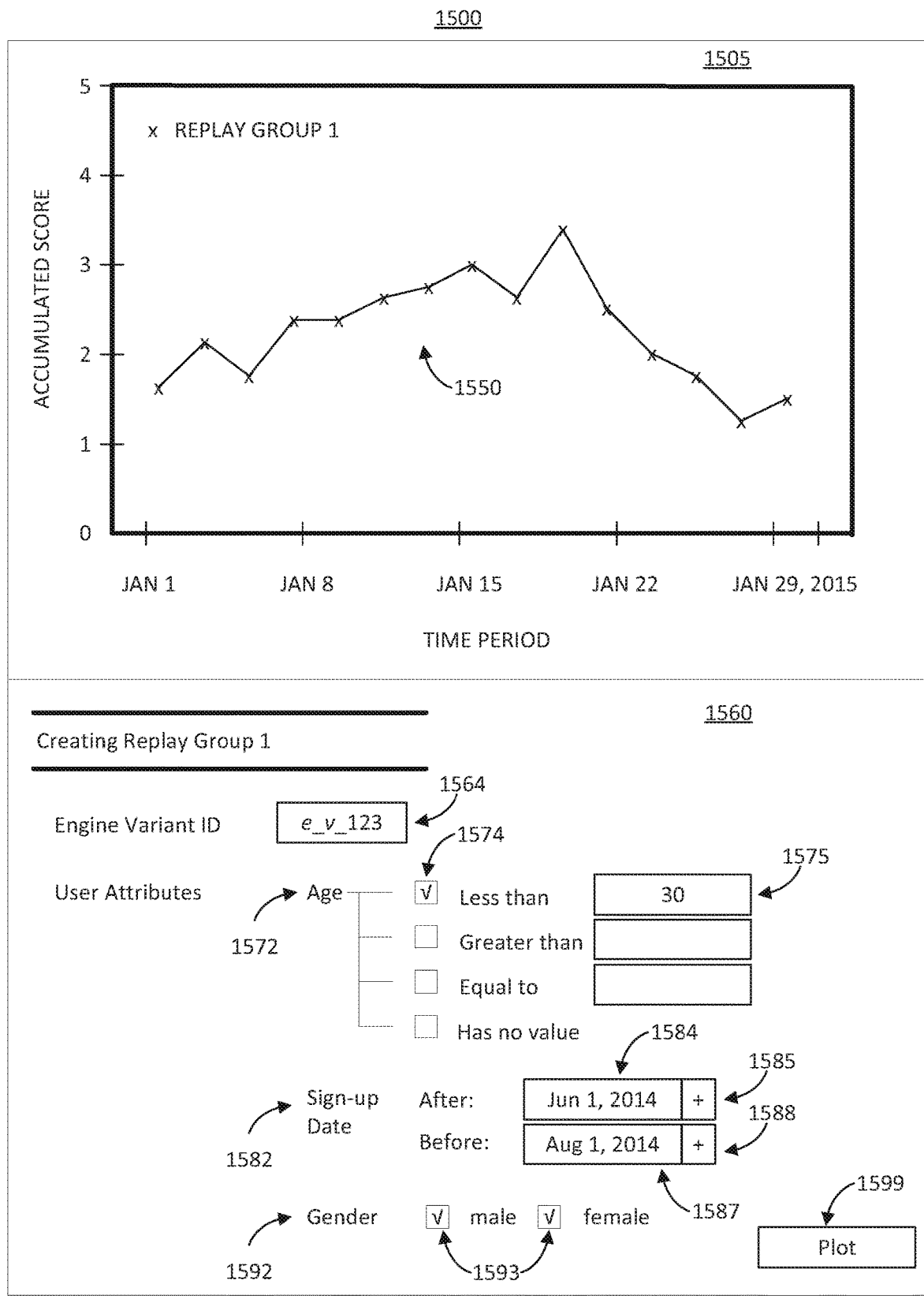
FIG. 15 depicts another exemplary visual display of prediction performances over a replay group created using query segment filters in accordance with described embodiments.

FIG. 15 depicts another exemplary visual display of prediction performances over a replay group created using query segment filters in accordance with described embodiments.

More particularly, FIG. 15 depicts an illustrative visual display 1500 of prediction performances over a replay group created using query segment filters, according to one embodiment. In this embodiment, the visual display 1500 is divided into two windows, plotting window 1505 for visualizing accumulated prediction scores, and interactive display 1560 that allows an operator to create Replay Group 1 dynamically for generating curve 1550. Upon initialization, fields in interactive display 1560 may take on default values, which may be pre-defined or may be automatically calculated by the system. Given a deployed engine variant, box or field 1564 allows an operator to assign a name to the engine variant for easy identification. Labels 1572, 1582, and 1592 indicate user attributes that can be set by the operator. Such user attributes may be pre-defined or operator-defined. In addition, the PredictionIO or machine learning platform may assess all available queries to determine if users are present, and if so, which user attributes are present and can be selected for generating replay groups. In this particular example, age, sign-up date, and gender are three available user attributes. Checkboxes 1574 allow the operator to determine a user age group. In this example, accumulated scores are generated based on users in the below-30 age group, as indicated by value 30 in field 1575. Boxes 1584 and 1587 allow the operator to select users who have signed-up during a particular time period, for example, after Jun. 1, 2014, but before Aug. 1, 2014. Pull-down menus may be activated through buttons 1585 and 1588 to select dates from a calendar. In addition, checkboxes 1593 allow the operator to select both male and female users.

Once user attributes have been input by the operator, Replay Group 1 may be updated automatically, and accumulated prediction scores may be visualized in plotting window 1505. Alternatively, a request for updating the replay group and the corresponding accumulated prediction score visualization may be received by the system when the operator clicks on the "Plot" button 1599.

In some embodiments, operators can create as many replay groups on a visual chart as they like. Each replay group may be created through interfaces similar to interactive display 1560, or may be loaded from storage. Operators can assign a name label to each replay group for easy identification, and can use different colors or symbols for each replay group.

In some embodiments, accumulated prediction scores of one or more replay groups within the time period of interest can be displayed on the visual chart through different graphical representations such as line plots, histograms, bar charts, and scatter plots.

Figure 16:
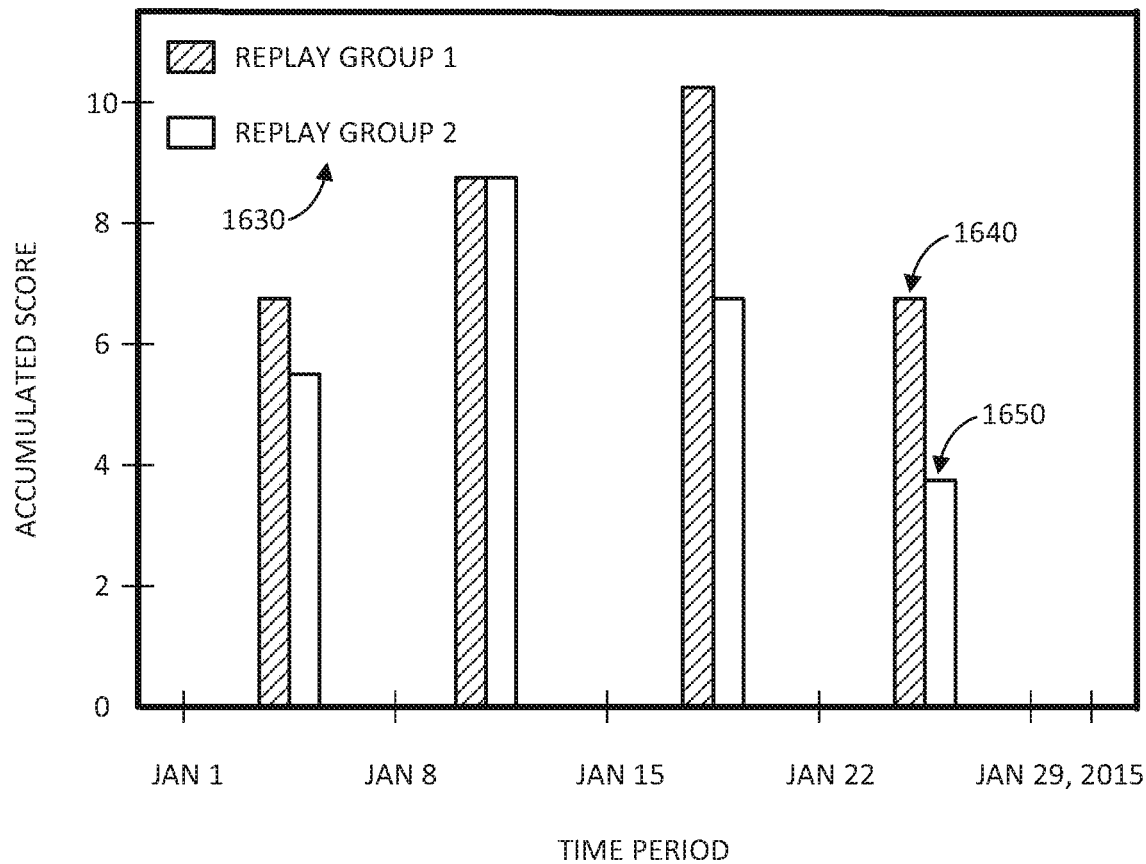
FIG. 16 depicts an exemplary histogram representing prediction performances over two replay groups in accordance with described embodiments.

FIG. 16 depicts an exemplary histogram representing prediction performances over two replay groups in accordance with described embodiments.

For example, FIG. 16 shows an illustrative histogram 1600 representing prediction performances over two replay groups, according to one embodiment. The same Replay Groups 1 and 2 from FIG. 14 are shown here as identified by element 1630. Each bar, such as bars 1640 and 1650, corresponds to prediction scores accumulated over one-week intervals during the one-month period of January, 2015.

Although not shown explicitly in FIGS. 13-16, in some embodiments, an operator may manually adjust the values of the time period and time interval, as well as definitions for the score function and accumulation function. The visual chart may be updated automatically once these values are changed, or upon request when such requests are received from the operator.

Figure 17:
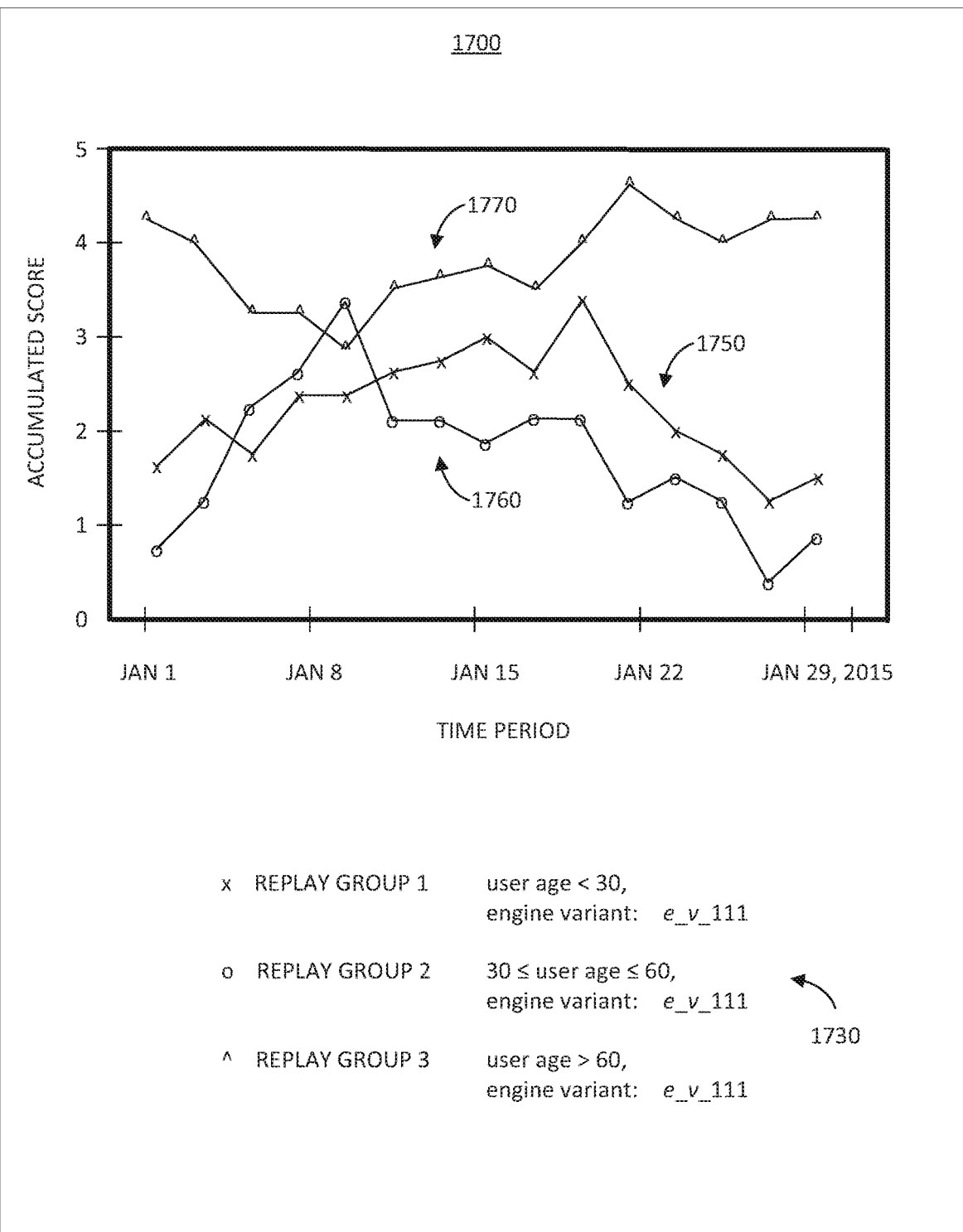
FIG. 17 depicts an exemplary visual display of prediction performances over multiple replay groups in accordance with described embodiments.
Figure 18:
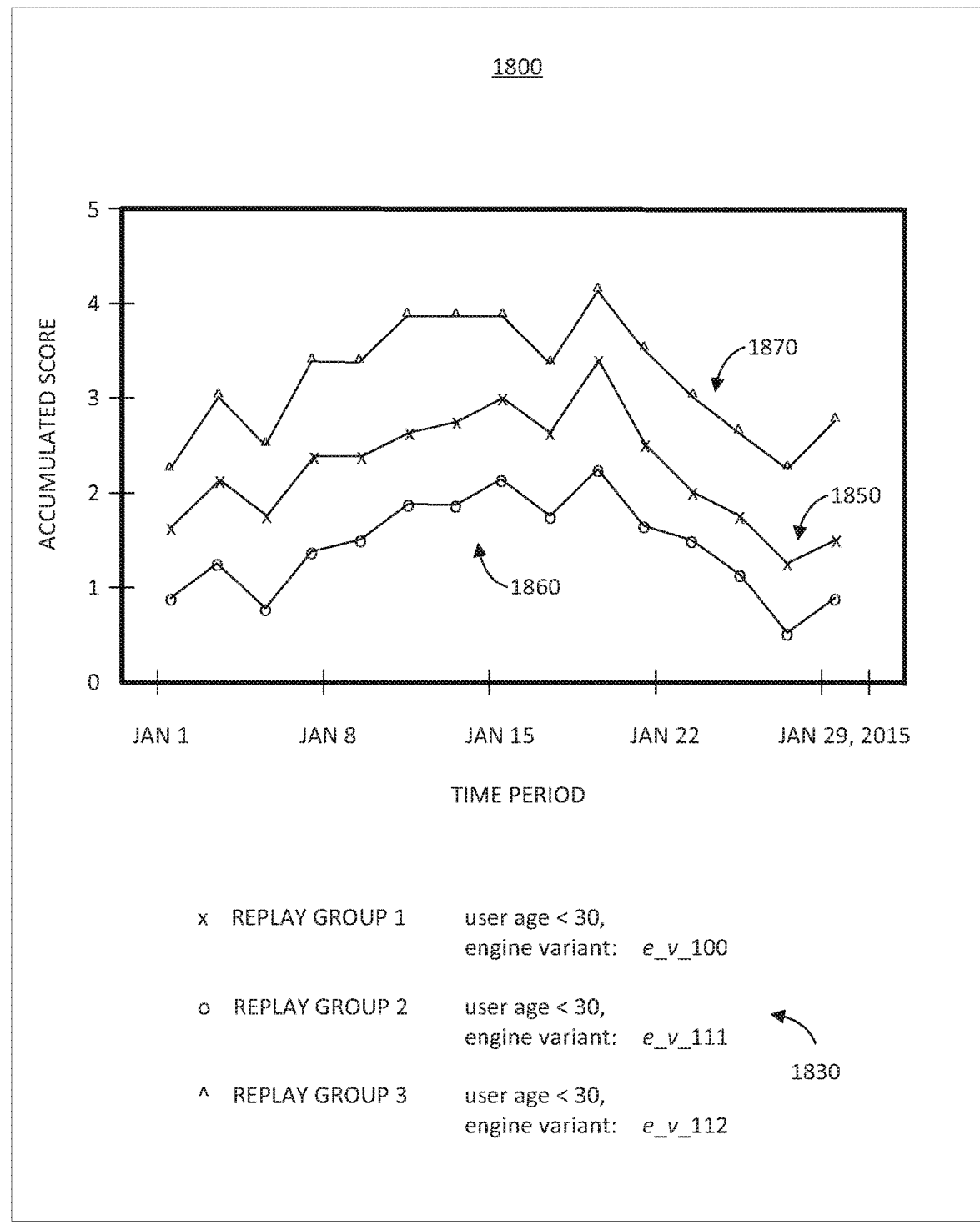
FIG. 18 depicts another exemplary visual display of prediction performances over multiple replay groups in accordance with described embodiments.

FIG. 17 depicts an exemplary visual display of prediction performances over multiple replay groups in accordance with described embodiments and FIG. 18 depicts another exemplary visual display of prediction performances over multiple replay groups in accordance with described embodiments.

More particularly, FIGS. 17 and 18 show illustrative visual displays of prediction performances over multiple replay groups, according to certain embodiments. In FIG. 17, visualization 1700 shows how well one engine variant performs over a given one-month period for three different user segments divided by age groups. Curves 1750, 1760, and 1770 correspond to Replay Groups 1, 2, and 3 respectively, as indicated by legend 1730. Queries are divided into below-30, 30-to-60, and above-60 age groups, and queries within each replay group are processed through engine variant e_v_111. In some embodiments, Replay Groups 1, 2, and 3 are generated by applying a user attribute filter that examines the user age attribute. All queries within each replay group are processed through engine variant e_v_111, either before or after the user attribute filter is applied.

In FIG. 18, visualization 1800 compares how three engine variants perform over a given one-month period for the below-30 age group. Curves 1850, 1860, and 1870 correspond to Replay groups 1, 2, and 3 respectively, as indicated by legend 1830. In some embodiments, Replay Groups 1, 2, and 3 are obtained by applying a user attribute filter as well as an engine variant filter. Once a query is processed by an engine variant to generate a corresponding predicted result, the query may include the engine variant information as part of the resulting query record. A query record may include the input query, engine variant information, predicted results, actual results, prediction score, and/or any other information relevant to the input query and how the input query has been processed by the prediction system. Thus, a single input query to a predictive engine may lead to multiple query records; and query records corresponding to the same input query may be segmented into different replay groups. An input query may also be associated with multiple replay group IDs, depending on how it is processed by the prediction system.

Detailed Prediction Debugging

Once a visual replay of prediction performances is generated, an operator of the replay process may further zoom in and out, or mouse-over the visualization to examine additional details in the prediction process, hence further troubleshoot issues in predictive engine design. The PredictionIO or machine learning platform thus provides method and systems for detailed prediction debugging.

Figure 19:
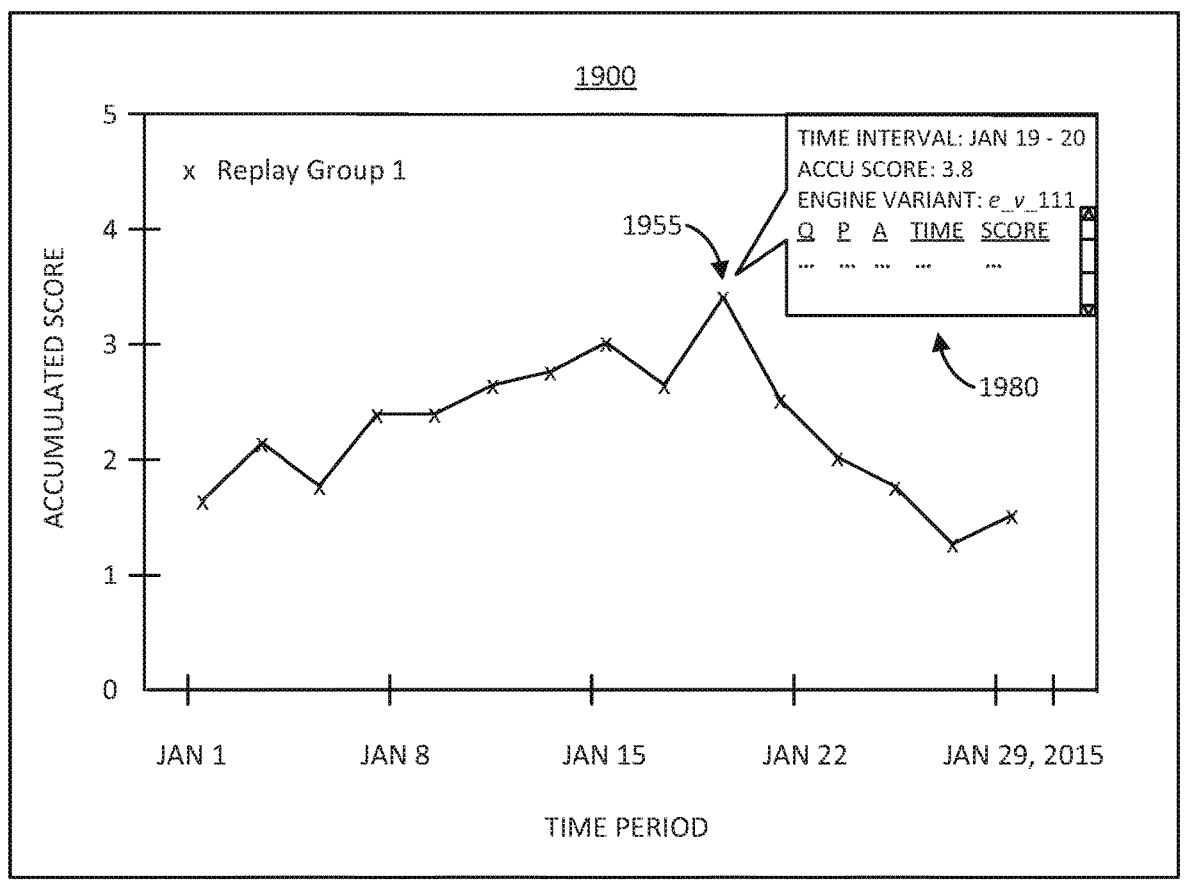
FIG. 19 depicts an exemplary visual display of prediction performances over a replay group with query records in accordance with described embodiments.
Figure 19:
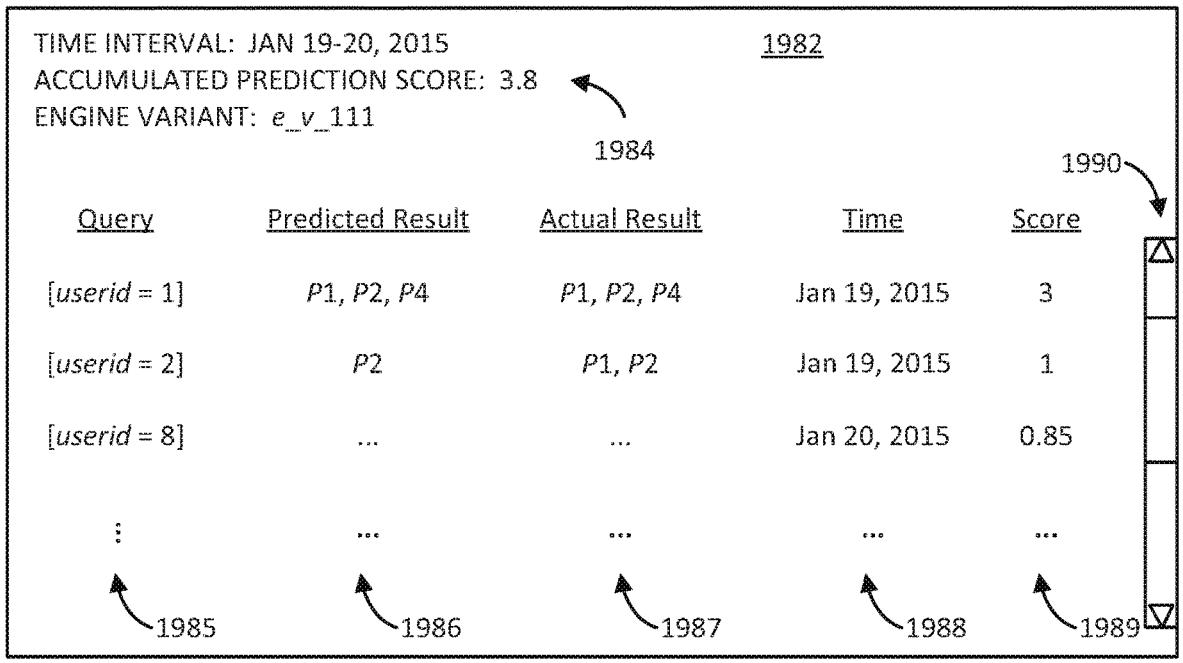

FIG. 19 depicts an exemplary visual display of prediction performances over a replay group with query records in accordance with described embodiments.

More particularly, FIG. 19 depicts an illustrative visual display 1900 of prediction performances over a replay group, with query records, according to one embodiment. In this example, when the operator hovers their mouse over or clicks on an accumulated prediction score point such as 1955 of Replay Group 1 on the chart, a floating table 1980 is displayed, showing corresponding query records from Replay Group 1. Query records in table 1980 are involved in computing the accumulated prediction score represented by data point 1955.

Window 1982 provides a detailed and zoomed-in view of table 1980. In some embodiments, window 1982 may be displayed on its own without the floating table 1980. Label 1984 specifies the time interval and accumulated prediction score associated with data point 1955, and shows that query records displayed in this window have been processed through Engine Variant e_v_111. In this example, query records include attributes such as Query 1985 (Q), Predicted Result 1986 (P), Actual Result 1987 (A), Query Time 1988 (Time), and Prediction Score 1989 (Score). The displayed time interval and engine variant may also be part of the query records. In one specific embodiment, in which no replay ID is utilized, the system may replay based on time or other user defined condition and display the associated query records. In other embodiments, dedicated replay IDs may be assigned to each individual query or individual query record, and may or may not be displayed with other parts of the query records. A scrolling bar 1990 with up and down arrows allows the operator to scroll through query records when not enough space is available to display all query records at the same time.

Figure 20:
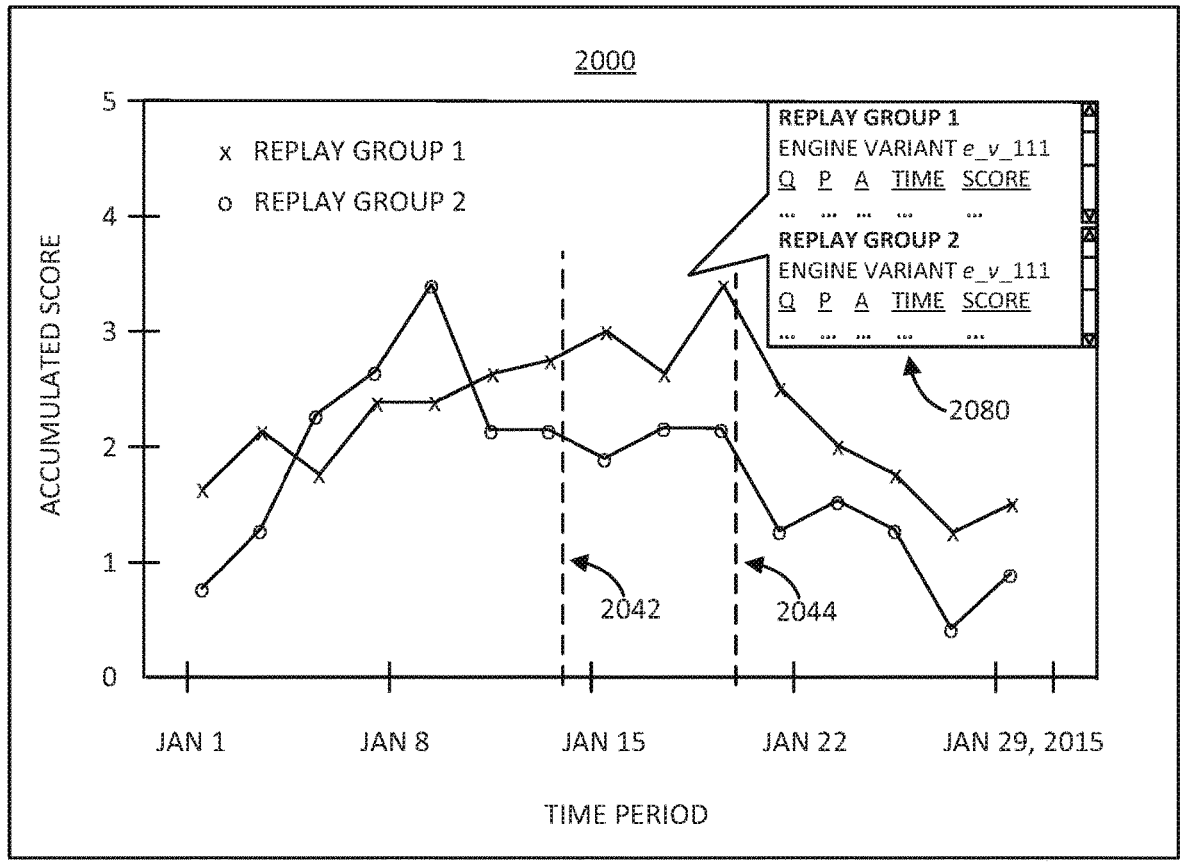
FIG. 20 depicts an exemplary visual display of prediction performances over two replay groups with query records in accordance with described embodiments.

FIG. 20 depicts an exemplary visual display of prediction performances over two replay groups with query records in accordance with described embodiments.

More particularly, FIG. 20 depicts an illustrative visual display 2000 of prediction performances over two replay groups, with query records, according to one embodiment. When the operator selects a period of time on the chart, for example, between time 2042 and 2044, a table 2080 of query records that fall into this time period is displayed. Window 2082 is a zoomed-in view of table 2080. Displayed in this window are query records from Replay Groups 1 and 2, with attributes such as Query(Q), Predicted Results (P), Actual Results (A), Query Time (Time) and Prediction Score (Score).

In some embodiments, the system also provides statistical features to summarize the prediction performance. For example, the system may automatically select queries with outlier scores on the table. The system also provides statistical information such as mean, variance, and distribution of the scores. In FIG. 20, label 2086 provides the total number of query records and the average accumulated score across the given time period between time 2042 and 2044.

Machine Learning Model Management

In addition to creating, evaluating, tuning, and replaying machine learning models from the ground up, one version of the PredictionIO or machine learning platform, PredictionIO λ may further provide extensive management services for models produced by different technologies and environments. PredictionIO λ may integrate with existing software control management systems and continuous integration infrastructures. For example, it may integrate with popular version control systems Git, and continuous integration infrastructure Jenkins. PredictionIO λ is agnostic to a machine learning technology stack and programming language. It allows the management, evaluation, update, and maintenance of models produced both locally and by different technologies under external environments. Exemplary model management features include, but are not limited to, model version control, model evaluation and employment, multi-tenancy support, and external infrastructure support.

More particularly, PredictionIO λ may provide model version control features to allow a user to exactly pinpoint the software version that produced a particular model, time when models are produced, experiment and training data source that produced a particular model, and the owner tenant of models. PredictionIO λ may further facilitate reproduction of historical models for auditing, debugging, delayed evaluation, and state rollback with automatic version control and tracking. PredictionIO λ may also leverage existing infrastructure to control the flow of model evaluation and deployment, thus allow continuous evaluation and monitoring, to ensure newly trained models meet both business and production requirements. For example, multiple evaluations and deployments may be run simultaneously, where individual results of parallel runs may be viewed and directly compared if necessary. Evaluation and deployments may also be scheduled, or triggered when one or more pre-defined criteria is satisfied. Alerts may be generated when any evaluation fail to meet expectations, and new models may be automatically deployed if they pass evaluations defined or customized by the user. Moreover, PredictionIO λ and other variants of the PredictionIO or the machine learning platform may be integrated with continuous integration and alerting systems. Furthermore, PredictionIO λ or the machine learning platform may provide multi-tenancy support, to streamline the logistics of training and serving predictive models for multiple customers.

Figure 21:
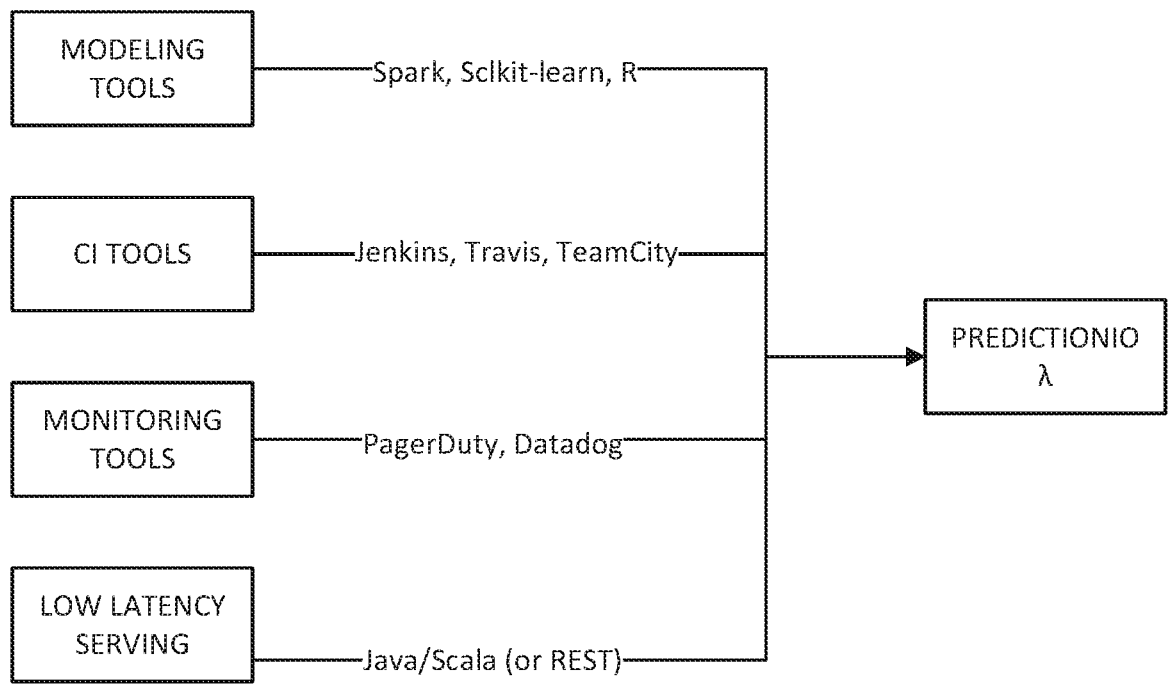
FIG. 21 depicts an exemplary schematic diagram of software integration between existing stacks and a machine learning model management platform in accordance with described embodiments.

FIG. 21 depicts an exemplary schematic diagram of software integration between existing stacks and a machine learning model management platform in accordance with described embodiments.

More particularly, FIG. 21 depicts a schematic diagram showing software integration between existing stacks and PredictionIO λ or the machine learning platform, implemented according to one embodiment. PredictionIO λ or the machine learning platform may support modeling tools such as Spark, Scikit-learn and R, Continuous Integration (CI) tools such as Jenkins, Travis, and TeamCity, monitoring tools such as PagerDuty and Datadog, and low-latency serving stacks using Java, Scala, or REST. IPython, matplotlib, SciPy, NumPy are exemplary software tools that PredictionIO λ or the machine learning platform may support.

Figure 22:
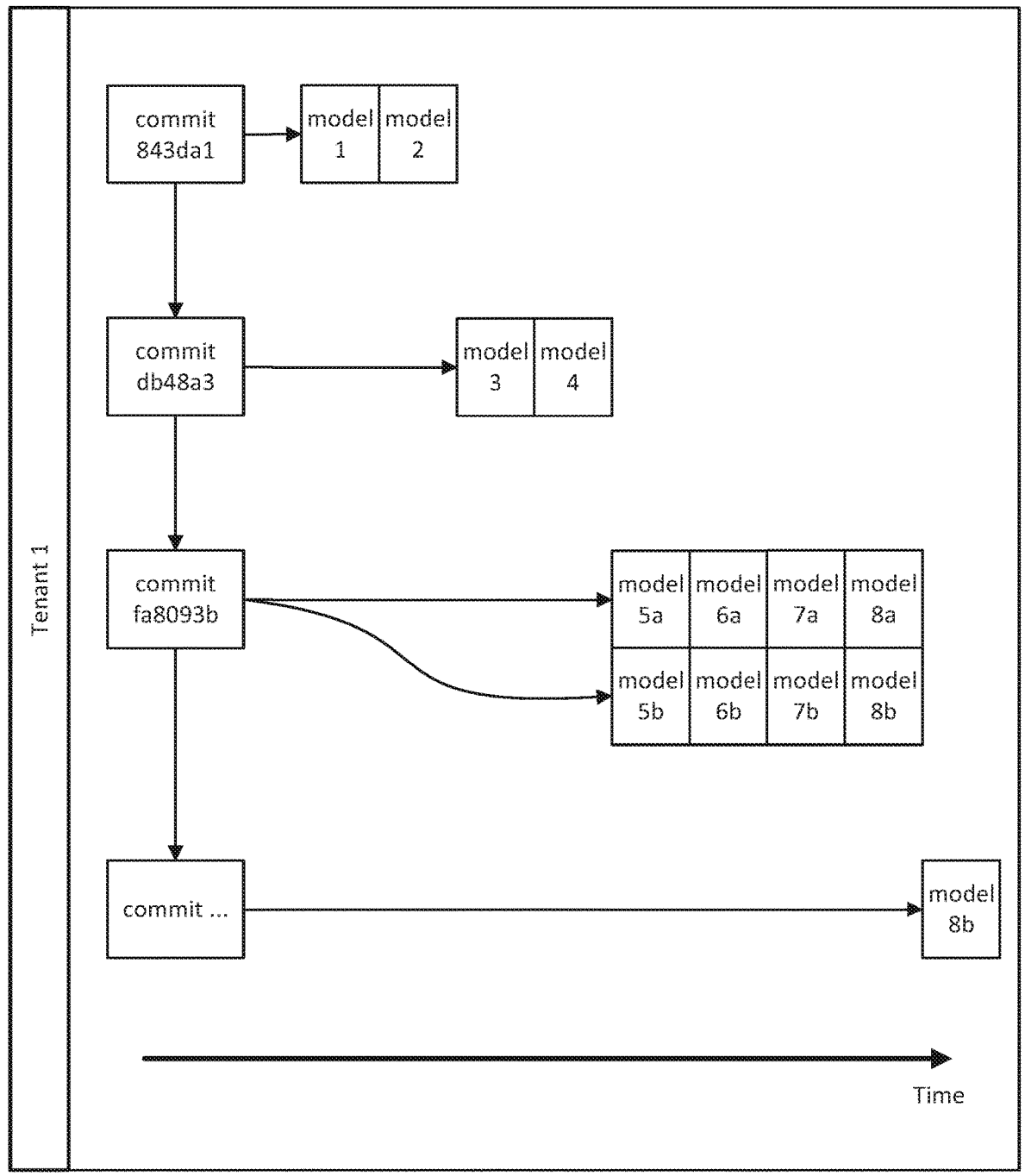
FIG. 22 depicts an exemplary machine learning deployment scenario using a machine learning model management platform in accordance with described embodiments.

FIG. 22 depicts an exemplary machine learning deployment scenario using a machine learning model management platform in accordance with described embodiments.

More particularly, FIG. 22 depicts an exemplary machine learning deployment scenario using PredictionIO λ or the machine learning platform, implemented according to one embodiment. Tenant 1 owns a Git repository containing machine learning code that produces models. PredictionIO λ or the machine learning platform associates itself with the tenant and the Git Repository. Users of PredictionIO λ or the machine learning platform can run code from different commit to produce models. Advanced users can define multiple data sources and multiple experiments to be run in parallel. Such tools provided by PredictionIO λ or the machine learning platform increases productivity by allowing quick insights into any problems regarding experiment or deployment runs.

Git is a version control system (VCS) for tracking changes in computer files and coordinating work on those files among multiple people, typically used for software development, but also used to keep track of changes in any files. As a distributed revision control system it is aimed at speed, data integrity, and support for distributed, non-linear workflows. Other versioning control systems may be utilized in place of Git.

In some embodiments, PredictionIO λ or the machine learning platform comes with a server component as a bookkeeper of all model information. It may centralize internal data and information to major SQL and NoSQL databases. To support existing continuous integration infrastructures, PredictionIO λ or the machine learning platform may require full access to such systems. Once installed and granted access, a PredictionIO λ or the machine learning platform server may be initiated to listen on networked port to accept commands from command-line interface client. For example, PredictionIO λ or the machine learning platform may work with a Git repository, and the PredictionIO λ or the machine learning platform server may be initialized anywhere in the source code repository to create a new tenant with a particular tenant name. Such a tenant name may be automatically associated with all subsequent PredictionIO λ or the machine learning platform commands. Once a code repository has been associated with PredictionIO λ or the machine learning platform, the status of the setup and available models may be examined, through text or graphically outputs. A successfully created new tenant may indicate that a blank PredictionIO λ or the machine learning platform project has been initiated.

In some embodiments, one or more evaluations may be added or removed to a PredictionIO λ or the machine learning platform project, and may be run directly under the management by PredictionIO λ or the machine learning platform. Multiple evaluations may be run sequentially, in parallel simultaneously, periodically, or asynchronously upon different triggering events. As running a given evaluation under PredictionIO λ or the machine learning platform leverages existing continuous integration infrastructure, PredictionIO λ or the machine learning platform may support and utilize any available underlying scheduling mechanisms provided by the continuous integration infrastructure. It is also possible to set trigger criteria for running one or more evaluations. For example, the code repository may be checked periodically, and evaluation runs may be performed wherever there is a code change.

In some embodiments, PredictionIO λ or the machine learning platform utilizes data sources to enable the running of multiple evaluations in parallel. For example, x data sources and y evaluations may be defined, and PredictionIO λ or the machine learning platform may be instructed by the user to run each of the y evaluations x times, each time with a different data source, for a total of xy evaluation instances in parallel. Each of these evaluation instances may be a unique combination of a particular data source and a particular command. Data sources may be added or removed globally to the PredictionIO λ or the machine learning platform, and each data source may be associated to particular projects managed by PredictionIO λ or the machine learning platform. In some embodiments, PredictionIO λ or the machine learning platform provides data source display, search, rank, rating, and similar management features, so a large number of data sources may be stored and retrieved, or shared among different projects.

Once a set of given machine learning models is evaluated and become ready for deployment, PredictionIO λ or the machine learning platform allows the running of deployments directly. New deployment may be added, while previous deployments of a given machine learning model may be stored and rolled back to if necessary.

In addition to direct control of evaluations and deployments, PredictionIO λ or the machine learning platform may provide run logs, for automatic or manual inspection by users. For example, PredictionIO λ or the machine learning platform may keep track of all models produced by all evaluation and deployment runs, and provide text or graphical interfaces for inspecting the parameter and results of each evaluation or deployment run.

Multiple projects within the same code repository may be defined under PredictionIO λ or the machine learning platform. Such multi-tenant support streamlines the logistics of training and serving predictive models for multiple customers in an application. For instance, any existing tenant may be quickly cloned to a new one to handle any special needs.

Consider for instance the following exemplary context-specific examples in which disclosed embodiments may be carried out. The languages in the examples or elaborations below are context-specific and are therefore not to be construed as limiting the broader spirit of the disclosed embodiments.

Building machine learning an application from scratch is hard; you need to have the ability to work with your own data and train your algorithm with it, build a layer to serve the prediction results, manage the different algorithms you are running, their evaluations, deploy your application in production, manage the dependencies with your other tools, etc.

Disclosed embodiments provide for a Machine Learning server that addresses these concerns. It aims to be the key software stack for data analytics.

Consider for instance a recommender as an example; usually predictive modeling is based on users' behaviors to predict product recommendations.

Convert the data (in Json) into binary Avro format.
//Read training data
val     trainingData=sc.textFile("trainingData.txt").map
    (_.split(',') match {..})
which yields:
user1 purchases product1, product2
user2 purchases product2
Then build a predictive model with an algorithm:
//collaborative filtering algorithm
val model=ALS.train(trainingData, 10, 20, 0.01)
Then start using the model:
//collaborative filtering algorithm
allUsers.foreach     {user=>model.recommendProducts
    (user, 5)}
Output: This recommends 5 products for each user.

While such code is appropriate for a development environment, operation within a in production environment requires additional accommodations. Such accommodations are supported by the on-demand cloud based environment on behalf of customers of the host organization in conjunction with practice of the disclosed embodiments and include facilities such as integration with existing data; unification of data from multiple sources; deployment of a scalable service that responds to dynamic prediction queries; persisting the predictive model, in a distributed environment; implementing Spark as a storage layer and enabling algorithms to interoperate and communication with one another; preparation of the data for model training; updating models with new data while avoiding service downtime; providing business logic tie-ins; making the code base configurable, reusable and manageable; building in a separation of concern (SOC); supporting a real-time operational environment; customization of the recommender on a per-location basis; discarding of data that is out of inventory; and performing different tests on the selected.

The PredictionIO or the machine learning platform provides an event server for storage, that collects data (say, from a mobile app, web, etc.) in a unified way, from multiple channels. For instance, an operator can plug multiple engines within the PredictionIO or the machine learning platform, in which each engine represents a type of prediction problem.

In a production system, there are typically multiple engines. For example, such a recommendation engine may return as output: if you bought this, recommend that. Nevertheless, it may be desirable to run a different algorithm on the front page of an e-commerce site for article discovery, and yet another algorithm for an email campaign based on what users have browsed for retargeting purposes. PredictionIO or the machine learning platform provides such functionality in accordance with the described embodiments.

Deployment of a Predictive Model Service:

In a typical mobile app, the user behavior data will send user actions. The prediction model will be trained on these, and the prediction engine will be deployed as a Web service once the mobile app can communicate with the engine via a REST API interface. Other SDKs additionally provide different languages and the engine will return a list of results in JSON format.

PredictionIO or the machine learning platform manages the dependencies of SPARK and HBASE and the algorithms automatically. Users simply launch with a one-line command.

According to certain embodiments, a framework is written in Scala, to take advantage of the JVM support and is a natural fit for distributed computing. Conversely, R is not so easy to scale. According to certain embodiments, PredictionIO or the machine learning platform uses Spark, one of the best-distributed system frameworks available and proven to scale in production. According to certain embodiments, algorithms are implemented via MLLib. Lastly, events are stored in Apache HBase as the NoSQL storage layer according to such embodiments.

Preparing the Data for Model Training

Preparing the data for model training is a matter of running the Event server (launched via ('pio eventserver') and interacting with it, by defining the action (i.e. change the product price), product (i.e. give a rating A for product x), product name, attribute name, all in free format.

Building the engine is made easy because PredictionIO or the machine learning platform offers templates for recommendation and classification. The engine is built on an MVC architecture, and has the following components:

1. Data source: data comes from any data source, and is preprocessed automatically into the desired format. Data is prepared and cleansed according to what the engine expects. This follows the Separation of Concerns concept.
2. Algorithms: machine learning algorithms at your disposal to do what you need; ability to combine multiple algorithms.
3. Serving layer: ability to serve results based on predictions, and add custom business logic to them.
4. Evaluator layer: ability to evaluate the performance of the prediction to compare algorithms.

Live Evaluation

PredictionIO Enterprise Edition is capable of performing live evaluation of its prediction performance. This is more accurate because it is capable of tracking all subsequent actions of a user after a prediction has been presented to the user.

PredictionIO or the machine learning platform provides two types of deployable servers: event server and prediction engine server. In live evaluation mode, a prediction engine server will do the following additional actions per query: (i) generate a unique tracking tag for the current query; (ii) log the current query, predictions of the current query, and the unique tracking tag; and (iii) present predictions and the unique tracking tag to the user. Subsequent actions of the user will be logged and tracked using the aforementioned unique tracking tag. This is called the "tracking data" according to such embodiments.

Replay Loop

Utilizing the above features, disclosed embodiments further provide a replay loop to perform live evaluation of prediction engines with unmatched accuracy and level of details that otherwise A/B testing, or offline evaluations simply are not able to provide.

PredictionIO Enterprise Edition provides a special data source (data reader) that can use the "tracking data" to replay how a prediction engine performs. This data source is able to reconstruct the complete history of each user that queried the system.

PredictionIO Enterprise Edition provides a special evaluator component that takes the complete history of each user and produce accurate and detailed reports of how each prediction performed. Besides obtaining a better picture of how the prediction engine performs in contrast to black box A/B tests, this level of detail enables fine tuning of the prediction engine by data scientists and engine developers. Visual Replay is allowed for replay loops, providing more information to the operators.

Certain embodiments provide a library/engine templates gallery so developers can build their own engines or customize templates to their own needs; ready to use right away and also customizable. All engines follow the same DASE architecture described above. Engines are deployed as a web service, which are deployed as a service. Unifying data for predictive analytics—provide an event server to train the data. Event server can connect to existing systems, like mail servers for example. Certain embodiments provide may be installed on premises whereas others are deployable via a publically accessible on-demand cloud environment or a private cloud. Certain users will elect to install on their own cloud so as to improve customization options.

Benefits are numerous and include the ability to differentiate between engine and algorithms; keep focus on the engine, not algorithm; evaluating the algorithm and also evaluating the data sources; accommodation of business logic parameters; means for engine level comparison versus algorithm parameter tuning based on algorithm; means for tuning parameters of an algorithm versus merely tuning parameters of an engine; providing engine parameters which account for business logic and not just prediction accuracy of a single algorithm; supports deployment of multiple variants of engines, each permissibly with different algorithms; allows selection of variants by the user based on a template provided by PredictionIO; supports automatic generation; provides templates which give the engine parameters that the user can tune with the default settings in which the parameter generator deploys the variants via, for instance, engine.json which will thus contain a list of parameters that an operator can tune.

Still further benefits include a time horizon on replay which is different from advertising real-time, entire lifecycle supported in prediction; providing a real-time environment; and replays which take into account a longer time horizon of user actions than previously possible.

Still further benefits include predictive capability for user response versus any event, such as immediate events, or delayed, or multiple, including actions such as when the user clicked, tracking providing regardless of whether the user purchases or clicks including how the user behaves and tracking of all of the actions the user initiates on the page; sequencing of user actions, for instance, where a user does not click on several product yet elects to buy a product later.

Still further benefits include providing a generic query interface such that predictive results are output in a generic form rather than output of an advertisement which is specific; tracking of how well any given predictive result performs; and disconnecting the results of actual conversion for future predictions if desired for the chosen implementation.

Still further benefits include enhanced replay means such that an entire situation may be replayed rather than simply yielding a result as positive or negative; outputting predictive results of what users will do with the predictions; replay means to provide a debugger of engine performance as needed; problem testing for any A/B scenario to determine where variant 1 performs better than variant 2 (e.g., whether a first trained model performs better or worse than a second trained model); enhanced debugger/replay means to determine why variant 1 performs better or worse than variant 2 as observed by operators via the debug/reply mechanism such that an operator may replay a scenario and understand the behavior of that particular engine variant as well as the ability to replay why the engine is giving a bad or a good recommendation and means for the operator to evaluate and determine why.

Still further benefits of the replay means include providing of visual elements in a visual replay mode which are graphical and/or textual, giving more insight to the operators; evaluating user interactions and more intuitive means by which to tune the engine and algorithms, for instance, by changing the scenario ad-hoc based on replay results such as making modifications to the email header, and replaying how results will perform for that engine variant, etc. Still further provided is support for both off-line and live evaluation prediction types. According to such embodiments, both types are off-line in one sense, but the off-line type may be simulated whereas the other live evaluation type affects causality. With live evaluation predictions, something which is shown to the user ultimately affects the outcome of the user whereas with off-line type predictions there is no effect on any user.

Figure 23:
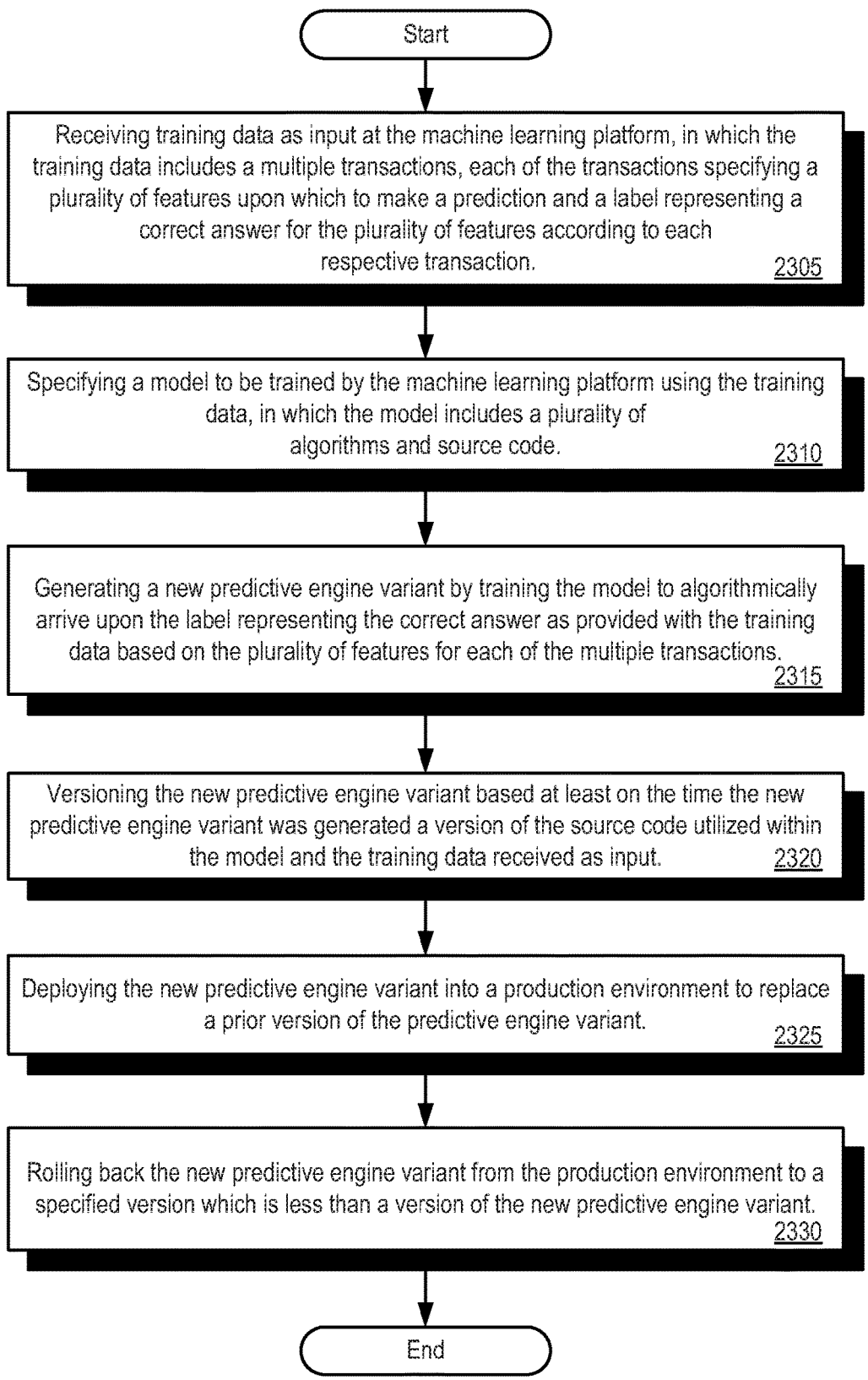
FIG. 23 depicts a flow diagram illustrating a method for implementing machine learning model training and deployment with a rollback mechanism within a computing environment in accordance with disclosed embodiments.
Figure 24:
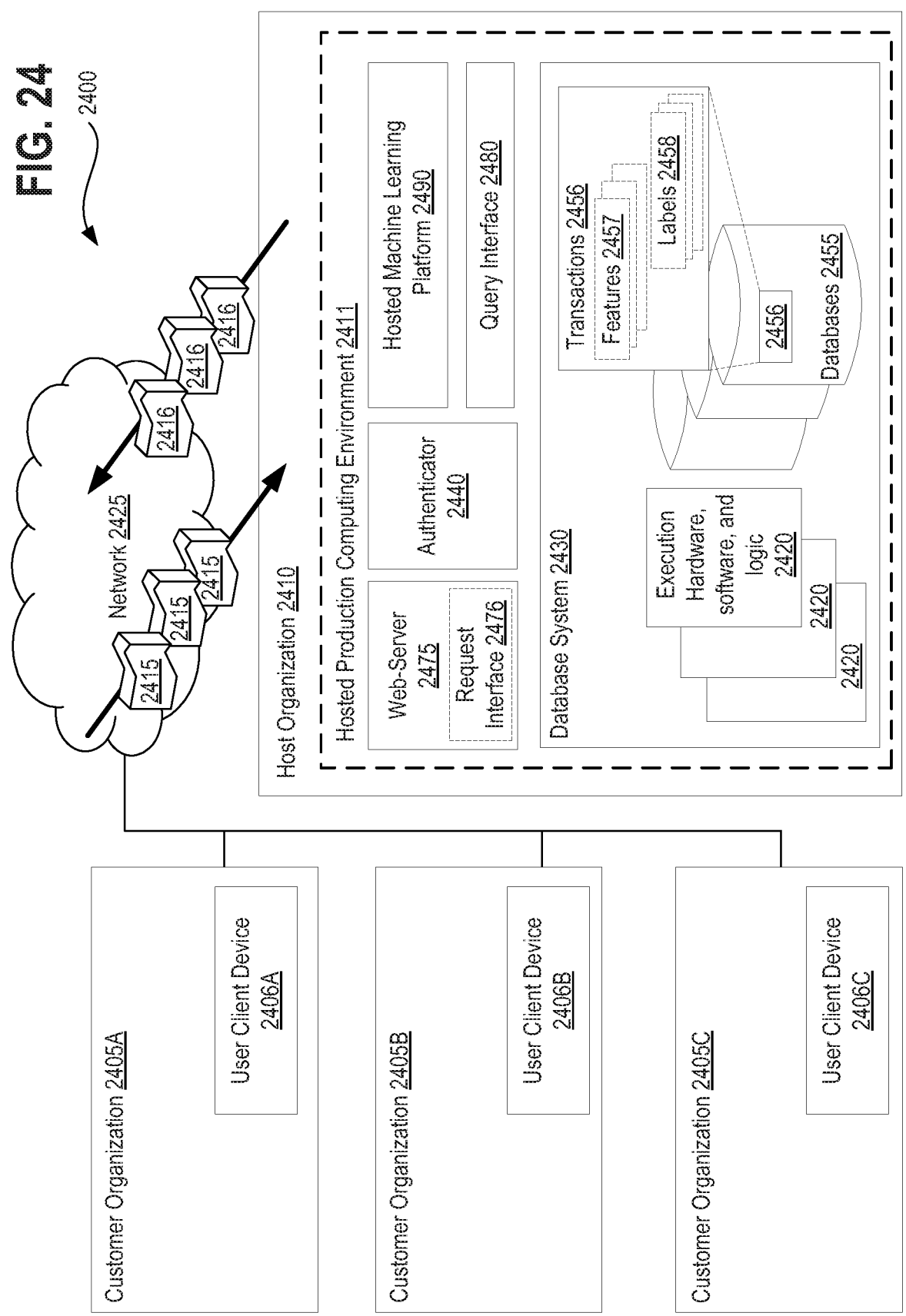
FIG. 24 depicts an exemplary architecture in accordance with described embodiments.

FIG. 23 depicts a flow diagram illustrating a method 2300 for implementing machine learning model training and deployment with a rollback mechanism within a computing environment in accordance with disclosed embodiments. Method 2300 may be performed by processing logic that may include hardware (e.g., circuitry, dedicated logic, programmable logic, microcode, etc.), software (e.g., instructions run on a processing device) to perform various operations such as receiving, specifying, generating, versioning, deploying, rolling back, downrevving, storing, maintaining, executing, creating, operating, restricting, returning, presenting, interfacing, communicating, transmitting, querying, processing, providing, determining, triggering, displaying, retrieving, updating, sending, etc., in pursuance of the systems and methods as described herein. For example, the hosted production computing environment 2411 and its database system 2430 as depicted at FIG. 24, may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 2300 depicted at FIG. 23, at block 2305, processing logic receives training data as input at the machine learning platform, in which the training data includes a multiple transactions, each of the transactions specifying a plurality of features upon which to make a prediction and a label representing a correct answer for the plurality of features according to each respective transaction.

At block 2310, processing logic specifies a model to be trained by the machine learning platform using the training data, in which the model includes a plurality of algorithms and source code.

At block 2315, processing logic generates a new predictive engine variant by training the model to algorithmically arrive upon the label representing the correct answer as provided with the training data based on the plurality of features for each of the multiple transactions.

At block 2320, processing logic versions (e.g., creates a new version of) the new predictive engine variant based at least on the time the new predictive engine variant was generated a version of the source code utilized within the model and the training data received as input.

At block 2325, processing logic deploys the new predictive engine variant into a production environment to replace a prior version of the predictive engine variant.

At block 2330, processing logic rolls back the new predictive engine variant from the production environment to a specified version which is less than a version of the new predictive engine variant.

In accordance with another embodiment of method 2300, rolling back the new predictive engine variant includes rolling back to a specified version identifier.

In accordance with another embodiment of method 2300, rolling back the new predictive engine variant includes rolling back to a version of the predictive engine variant having been created by training the model utilizing training data corresponding to a specified date range.

In accordance with another embodiment of method 2300, deploying the new predictive engine variant into a production environment includes exposing the new predictive engine variant at a query interface; and in which the method further includes: receiving a query directed toward the new predictive engine variant having been deployed into the production environment, in which the query requests a prediction from the new predictive engine variant; in which the query specifies a plurality of features; and returning from the new predictive engine variant in response to the query, a label representing a predicted correct answer based on the features specified with the query.

In accordance with another embodiment of method 2300, deploying the new predictive engine variant into a production environment includes rendering predictive results as output from the new predictive engine variant, in which the predictive results yield labels as output from the new predictive engine variant based on a plurality of never before seen features provided as input to the new predictive engine variant.

In accordance with another embodiment of method 2300, deploying the new predictive engine variant into a production environment includes deploying a latest trained model into production; and in which rolling back the new predictive engine variant from the production environment includes downrevving the latest trained model by re-deploying a prior trained model from a source code repository linked to the machine learning platform based on a previous_model_id corresponding to the prior trained model.

In accordance with another embodiment of method 2300, the machine learning platform operates within a host organization which provides on-demand cloud computing services to a plurality of tenants; and in which receiving the training data includes receiving the training data as input from one of the plurality of tenants of the host organization.

In accordance with another embodiment, the method 2300 further includes: receiving an initiation command to generate the new predictive engine variant from the one of the plurality of tenants of the host organization having provided the training data as input to the machine learning platform; and in which versioning the new predictive engine variant is based further upon the one of the plurality of tenants of the host organization from whom the training data was received and from whom the initiation command was received.

In accordance with another embodiment of method 2300, the multiple transactions within the training data include any one or more of: simulated transactions; past actual user transactions; user records; product records; behavioral data; user activities data; events data; images; voice data; and text.

In accordance with another embodiment of method 2300, the source code includes a source code repository linked to the machine learning platform or a unique source code version within the source code repository for use in training the model.

In accordance with another embodiment, the method 2300 further includes: receiving a replay request; and replaying performance of the deployed new predictive engine variant.

In accordance with another embodiment, the method 2300 further includes: receiving as configuration input at the machine learning platform any one or more of: one or more engine parameters for tuning the machine learning platform; one or more algorithmic parameters for tuning algorithms utilized by the machine learning platform; one or more hyperparameters specifying data sources for training the machine learning platform, algorithms utilized by the machine learning platform, business logic parameters utilized by the machine learning platform, and/or data inputs to individual algorithms utilized by the machine learning platform; and one or more prediction engine level comparisons for use by the machine learning platform.

In accordance with another embodiment of method 2300, the configuration input received by the machine learning platform includes the specification of the configuration to alter generated prediction engine variants according to developer specification or according to developer selectable templates with changeable default values or according to automatically generated default configuration parameters provided by the machine learning platform.

In accordance with another embodiment, the method 2300 further includes: receiving as configuration input at the machine learning platform any one or more of: one or more algorithmic tuning parameters; additional selection of data sources for use as training data input; additional algorithms; and one or more business rules to be observed by the machine learning platform when training the prediction engine.

In accordance with another embodiment of method 2300, the input includes an alphanumerical string representing all or part of a paragraph of free form text input from a user and a classification indicating whether the alphanumerical string corresponds to a customer complaint, a customer suggestion, or a customer compliment.

In accordance with another embodiment of method 2300, the prediction output from the machine learning platform specifies a set of multiple item IDs, a set of recommended item IDs, a set of product IDs indicated as being predictively similar to input product IDs, one or more numerical scores returned responsive to a query and/or non-numerical criteria returned as the prediction output responsive to a query.

In accordance with a particular embodiment there is non-transitory computer readable storage media having instructions stored thereupon that, when executed by a processor and memory of a machine learning platform, the instructions cause the machine learning platform to perform operations including: receiving training data as input at the machine learning platform, in which the training data includes a multiple transactions, each of the transactions specifying a plurality of features upon which to make a prediction and a label representing a correct answer for the plurality of features according to each respective transaction; specifying a model to be trained by the machine learning platform using the training data, in which the model includes a plurality of algorithms and source code; generating a new predictive engine variant by training the model to algorithmically arrive upon the label representing the correct answer as provided with the training data based on the plurality of features for each of the multiple transactions; versioning the new predictive engine variant based at least on the time the new predictive engine variant was generated a version of the source code utilized within the model and the training data received as input; deploying the new predictive engine variant into a production environment to replace a prior version of the predictive engine variant; and rolling back the new predictive engine variant from the production environment to a specified version which is less than a version of the new predictive engine variant.

FIG. 24 depicts an exemplary architecture 2400 in accordance with described embodiments. In one embodiment, a hosted production computing environment 2411 is communicably interfaced with a plurality of user client devices 2406A-C (e.g., such as mobile devices, smart phones, tablets, PCs, etc.) through host organization 2410. According to described embodiments, trained new predictive engine variants may be deployed into production, meaning they are released into and made accessible from within the hosted production computing environment 2411 on behalf of a customer organization 2405A-C or a tenant corresponding to one such customer organization.

The hosted machine learning platform 2490 is additionally shown here and is made available to tenants and customer organizations, for instance, as an on-demand or cloud computing platform as provided by the host organization.

In one embodiment, a database system 2430 includes databases 2455, for example, to store object data, tables, datasets, and underlying database records with user data on behalf of customer organizations 2405A-C (e.g., users of such a database system 2430 or tenants of a multi-tenant database type database system or the affiliated users of such a database system). In alternative embodiments, a client-server computing architecture may be utilized in place of the database system 2430 or alternatively, a computing grid, or a pool of work servers, or some combination of hosted computing architectures may be utilized to carry out the computational workload and processing demanded of the host organization 2410.

The database system 2430 depicted in the embodiment shown includes a plurality of underlying hardware, software, and logic elements 2420 that implement database functionality and a code execution environment within the host organization 2410.

In accordance with one embodiment, database system 2430 further implements databases 2455 to service database queries and other data interactions with the databases 2455. The hardware, software, and logic elements 2420 of the database system 2430 are separate and distinct from a plurality of customer organizations (2405A, 2405B, and 2405C) which utilize the services provided by the host organization 2410 by communicably interfacing to the host organization 2410 via network 2425. In such a way, host organization 2410 may implement on-demand services, on-demand database services or cloud computing services to subscribing customer organizations 2405A-C.

Within the databases 2455 of the database system 2430 there are provided a plurality of transactions 2456 by to, for example, train the machine learning models. As depicted, there defined by the transactions 2456, features 2457 and labels 2458, each being stored with the transactions within the databases 2455 as shown here.

The hosted production computing environment 2411 is supported by the execution hardware, software, and logic elements 2420, including at least a processor and a memory to execute such functionality.

Further depicted is the host organization 2410 receiving input and other requests 2415 from a plurality of customer organizations 2405A-C via network 2425 (such as a public Internet). For example, incoming search queries, database queries, API requests, interactions with displayed graphical user interfaces and displays at the user client devices 2406A-C, or other inputs may be received from the customer organizations 2405A-C to be processed against the database system 2430, or such queries may be constructed from the inputs and other requests 2415 for execution against the databases 2455 or the query interface 2480, pursuant to which results 2416 are then returned to an originator or requestor, such as a user of one of a user client device 2406A-C at a customer organization 2405A-C.

In one embodiment, each customer organization 2405A-C is an entity selected from the group consisting of: a separate and distinct remote organization, an organizational group within the host organization 2410, a business partner of the host organization 2410, or a customer organization 2405A-C that subscribes to cloud computing services provided by the host organization 2410.

In one embodiment, requests 2415 are received at, or submitted to, a web-server 2475 within host organization 2410. Host organization 2410 may receive a variety of requests for processing by the host organization 2410 and its database system 2430. Incoming requests 2415 received at web-server 2475 may specify which services from the host organization 2410 are to be provided, such as query requests, search request, status requests, database transactions, graphical user interface requests and interactions, processing requests to retrieve, update, or store data on behalf of one of the customer organizations 2405A-C, code execution requests, and so forth. Web-server 2475 may be responsible for receiving requests 2415 from various customer organizations 2405A-C via network 2425 on behalf of the query interface 2480 and for providing a web-based interface or other graphical displays to an end-user user client device 2406A-C or machine originating such data requests 2415.

Host organization 2410 may implement a request interface 2476 via web-server 2475 or as a stand-alone interface to receive requests packets or other requests 2415 from the user client devices 2406A-C. Request interface 2476 further supports the return of response packets or other replies and responses 2416 in an outgoing direction from host organization 2410 to the user client devices 2406A-C.

The host organization 2410 additionally provides a query interface 2480 capable of receiving and executing requested queries against the databases and storage components of the database system 2430 so as to return a result set, response, or other requested data in furtherance of the methodologies described. Query interface 2480 additionally provides functionality to pass queries from web-server 2475 into the database system 2430 for execution against the databases 2455 for processing search queries, or into the other available data stores of the host organization's computing environment 2411. In one embodiment, the query interface 2480 implements an Application Programming Interface (API) through which queries may be executed against the databases 2455 or the other data stores.

Authenticator 2440 operates on behalf of the host organization to verify, authenticate, and otherwise credential users attempting to gain access to the host organization.

Figure 25:
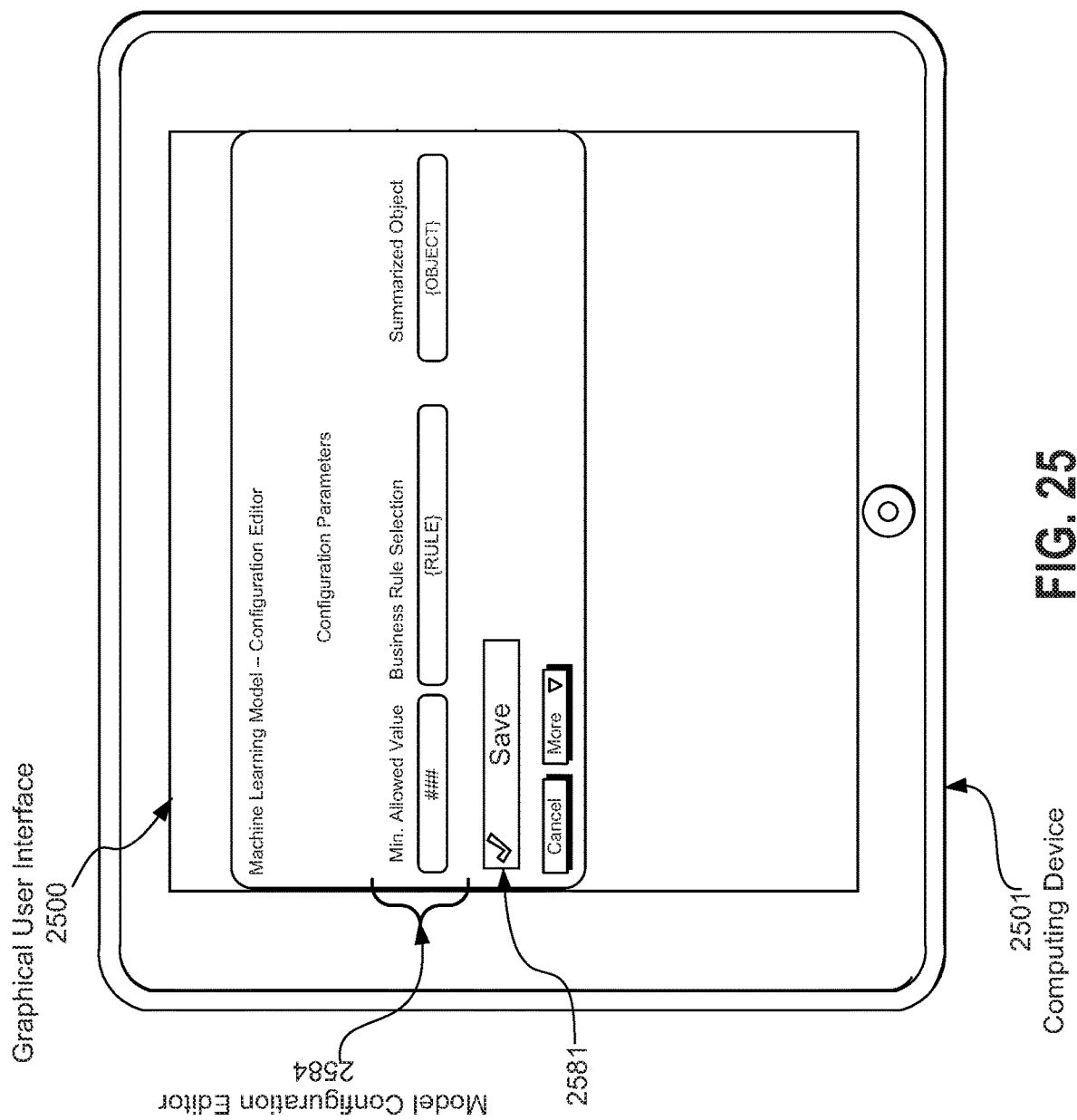
FIG. 25 depicts an exemplary graphical interface operating at a computing device such as a personal computer, a mobile, smartphone, tablet computing device, etc., in accordance with described embodiments.

FIG. 25 depicts an exemplary graphical interface 2500 operating at a computing device 2501 such as a personal computer, a mobile, smartphone, tablet computing device, etc., in accordance with described embodiments.

In particular, there is depicted a configuration editor 2584 which provides an API or UI through which a developer having provided training data as input for training a machine learning model may enter the requisite values as mandated by the configuration, or select changeable values from a template or otherwise specify tuning parameters and other configuration information, such as algorithms and algorithm parameters for use in training the machine learning model for the creation of the new predictive engine variant.

The model Configuration Editor 2584 provides means by which to enter such configuration information and may be provided by the source code of the model or the machine learning platform to allow for entry of the values for the model configuration information.

Element 2581 provides a confirmation box to save the entered information provided by the developer or user as entered into the model configuration editor 2584.

Figure 26:
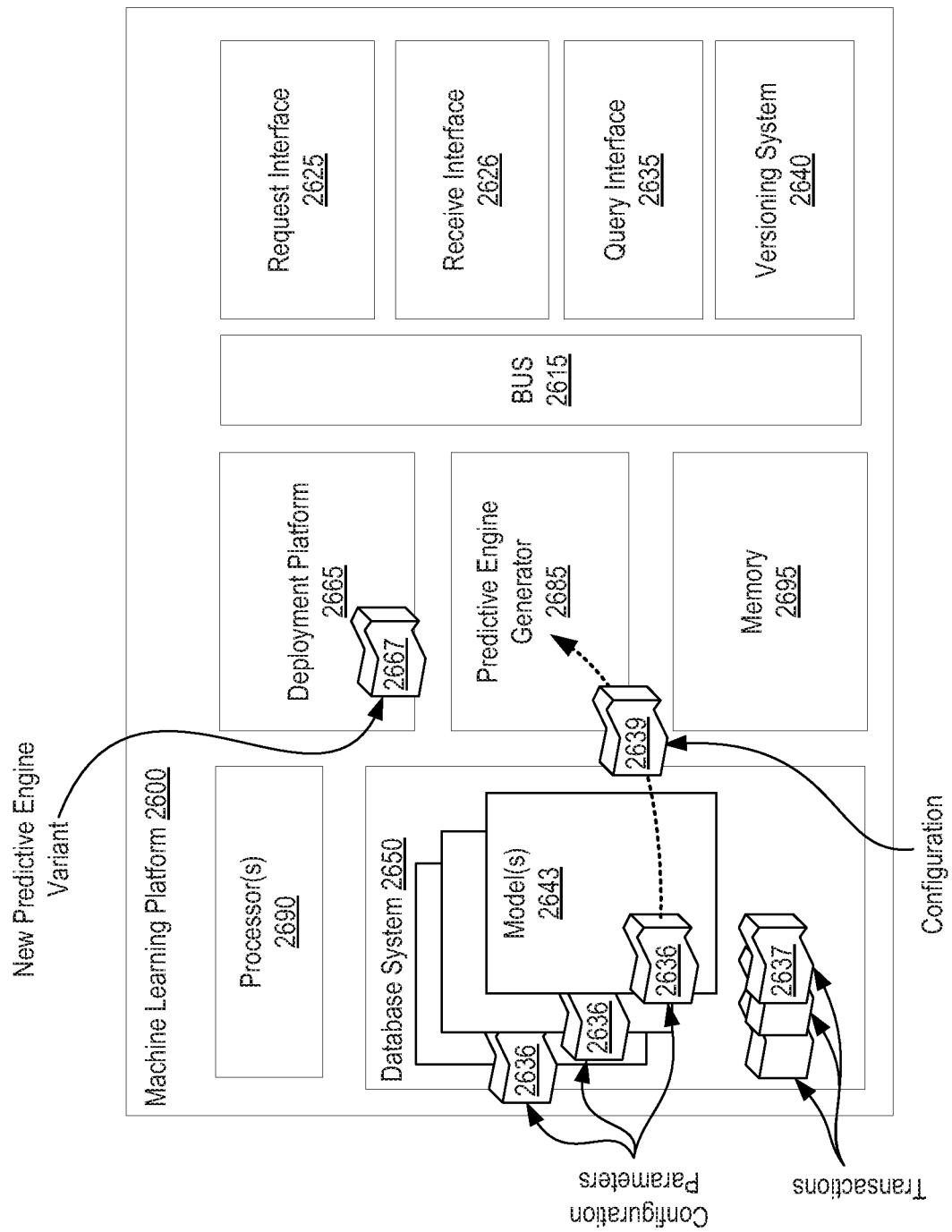
FIG. 26 shows a diagrammatic representation of a machine learning platform type system within which embodiments may operate, be installed, integrated, or configured in accordance with described embodiments.

FIG. 26 shows a diagrammatic representation of a machine learning platform 2600 type system within which embodiments may operate, be installed, integrated, or configured. In accordance with one embodiment, there is machine learning platform system 2600 having at least a processor 2690 and a memory 2695 therein to execute a predictive engine generator 2685. Such a machine learning platform 2600 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the machine learning platform 2600 includes the processor 2690 and the memory 2695 to execute instructions at the machine learning platform 2600; a database system 2650 to store a plurality of machine learning models 2643, each such model including configuration parameters 2636 defined by a developers, templates, or the machine learning platform. Further stored within database system 2650 are a plurality of transactions defining features and labels representing correct answers for the features from which the machine learning models 2643 may be trained based on, for example, the configuration parameters 2636 and other provided configuration information 2639.

According to another embodiment, the system further includes a deployment platform 2665 to package and release and deploy the new predictive engine variant 2667 as, for example, a deployable and installable package.

Query interface 2635 is capable of receiving queries on behalf of the deployed new predictive engine variant while request interface and receive interface are communicably interfaced with customer organization systems and interfaces capable of receiving information from and returning information back to such customer organizations. The versioning system is either part of or linked to the machine learning platform to perform versioning of created new predictive engine variants and tracking of such predictive engine variants.

Bus 2615 interfaces the various components of the machine learning platform 2600 amongst each other, with any other peripheral(s) of the machine learning platform 2600, and with external components such as external network elements, other machines, client devices, cloud computing services, etc. Communications may further include communicating with external devices via a network interface over a LAN, WAN, or the public Internet.

It is therefore in accordance with disclosed embodiments that there is a machine learning platform having therein at least a memory 2695 to store instructions; a processor 2690 to execute instructions; a receive interface 2626 to receive training data as input at the machine learning platform 2600, wherein the training data includes a multiple transactions 2637, each of the transactions specifying a plurality of features upon which to make a prediction and a label representing a correct answer for the plurality of features according to each respective transaction 2637; the receive interface 2626 to receive a specified model 2643 to be trained by the machine learning platform 2600 using the training data, wherein the model 2643 includes a plurality of algorithms and source code; a predictive engine generator 2685 to generate a new predictive engine variant 2667 by training the model to algorithmically arrive upon the label representing the correct answer as provided with the training data based on the plurality of features for each of the multiple transactions; a versioning system 2640 interfaced with the machine learning platform 2600 to version the new predictive engine variant 2667 based at least on the time the new predictive engine variant was generated a version of the source code utilized within the model and the training data received as input; a deployment platform 2665 to deploy the new predictive engine variant 2667 into a production environment to replace a prior version of the predictive engine variant; and the deployment platform 2665 to roll back the new predictive engine variant from the production environment to a specified version maintained by the versioning system 2640 which is less than a version of the new predictive engine variant.

According to another embodiment, the machine learning platform 2600 further includes a request interface 2625 to receive a query directed toward the new predictive engine variant having been deployed into the production environment, in which the query requests a prediction from the new predictive engine variant, the query specifying a plurality of features; and in which the machine learning platform further includes a query interface 2635 to return from the new predictive engine variant in response to the query, a label representing a predicted correct answer based on the features specified with the query. According to another embodiment, the machine learning platform 2600 further includes a query interface 2635 to render predictive results as output from the new predictive engine variant, in which the predictive results yield labels as output from the new predictive engine variant based on a plurality of never before seen features provided as input to the new predictive engine variant.

Figure 27A:
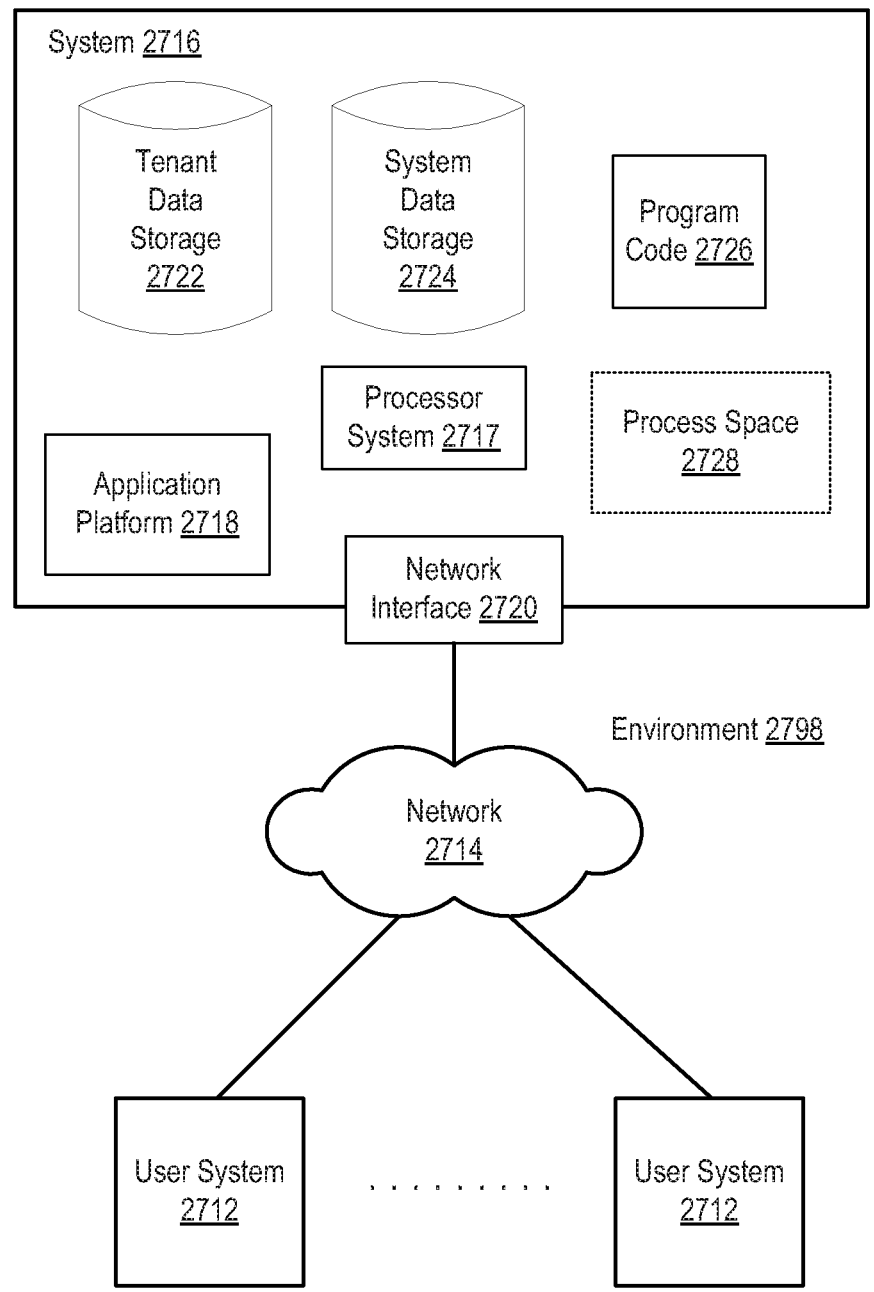
FIG. 27A illustrates a block diagram of an environment in which an on-demand database service may operate in accordance with the described embodiments.

FIG. 27A illustrates a block diagram of an environment 2798 in which an on-demand database service may operate in accordance with the described embodiments. Environment 2798 may include user systems 2712, network 2714, system 2716, processor system 2717, application platform 2718, network interface 2720, tenant data storage 2722, system data storage 2724, program code 2726, and process space 2728. In other embodiments, environment 2798 may not have all of the components listed and/or may have other elements instead of, or in addition to, those listed above.

Environment 2798 is an environment in which an on-demand database service exists. User system 2712 may be any machine or system that is used by a user to access a database user system. For example, any of user systems 2712 can be a handheld computing device, a mobile phone, a laptop computer, a work station, and/or a network of computing devices. As illustrated in FIG. 27A (and in more detail in FIG. 27B) user systems 2712 might interact via a network 2714 with an on-demand database service, which is system 2716.

An on-demand database service, such as system 2716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 2716" and "system 2716" is used interchangeably herein. A database image may include one or more database objects. A relational database management system (RDMS) or the equivalent may execute storage and retrieval of information against the database object(s). Application platform 2718 may be a framework that allows the applications of system 2716 to run, such as the hardware and/or software, e.g., the operating system. In an embodiment, on-demand database service 2716 may include an application platform 2718 that enables creation, managing and executing one or more applications developed by the provider of the on-demand database service, users accessing the on-demand database service via user systems 2712, or third party application developers accessing the on-demand database service via user systems 2712.

The users of user systems 2712 may differ in their respective capacities, and the capacity of a particular user system 2712 might be entirely determined by permissions (permission levels) for the current user. For example, where a salesperson is using a particular user system 2712 to interact with system 2716, that user system has the capacities allotted to that salesperson. However, while an administrator is using that user system to interact with system 2716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2714 is any network or combination of networks of devices that communicate with one another. For example, network 2714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 2712 might communicate with system 2716 using TCP/IP and, at a higher network level, use other common Internet protocols to communicate, such as HTTP, FTP, AFS, WAP, etc. In an example where HTTP is used, user system 2712 might include an HTTP client commonly referred to as a "browser" for sending and receiving HTTP messages to and from an HTTP server at system 2716. Such an HTTP server might be implemented as the sole network interface between system 2716 and network 2714, but other techniques might be used as well or instead. In some implementations, the interface between system 2716 and network 2714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2716, shown in FIG. 27A, implements a web-based customer relationship management (CRM) system. For example, in one embodiment, system 2716 includes application servers configured to implement and execute CRM software applications as well as provide related data, code, forms, webpages and other information to and from user systems 2712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2716 implements applications other than, or in addition to, a CRM application. For example, system 2716 may provide tenant access to multiple hosted (standard and custom) applications, including a CRM application. User (or third party developer) applications, which may or may not include CRM, may be supported by the application platform 2718, which manages creation, storage of the applications into one or more database objects and executing of the applications in a virtual machine in the process space of the system 2716.

One arrangement for elements of system 2716 is shown in FIG. 27A, including a network interface 2720, application platform 2718, tenant data storage 2722 for tenant data 2723, system data storage 2724 for system data 2725 accessible to system 2716 and possibly multiple tenants, program code 2726 for implementing various functions of system 2716, and a process space 2728 for executing MTS system processes and tenant-specific processes, such as running applications as part of an application hosting service. Additional processes that may execute on system 2716 include database indexing processes.

Several elements in the system shown in FIG. 27A include conventional, well-known elements that are explained only briefly here. For example, each user system 2712 may include a desktop personal computer, workstation, laptop, PDA, cell phone, or any wireless access protocol (WAP) enabled device or any other computing device capable of interfacing directly or indirectly to the Internet or other network connection. User system 2712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 2712 to access, process and view information, pages and applications available to it from system 2716 over network 2714. Each user system 2712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2716 or other systems or servers. For example, the user interface device can be used to access data and applications hosted by system 2716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 2712 and all of its components are operator configurable using applications, such as a browser, including computer code run using a central processing unit such as an Intel Pentium® processor or the like. Similarly, system 2716 (and additional instances of an MTS, where more than one is present) and all of their components might be operator configurable using application(s) including computer code to run using a central processing unit such as processor system 2717, which may include an Intel Pentium® processor or the like, and/or multiple processor units.

According to one embodiment, each system 2716 is configured to provide webpages, forms, applications, data and media content to user (client) systems 2712 to support the access by user systems 2712 as tenants of system 2716. As such, system 2716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 27B:
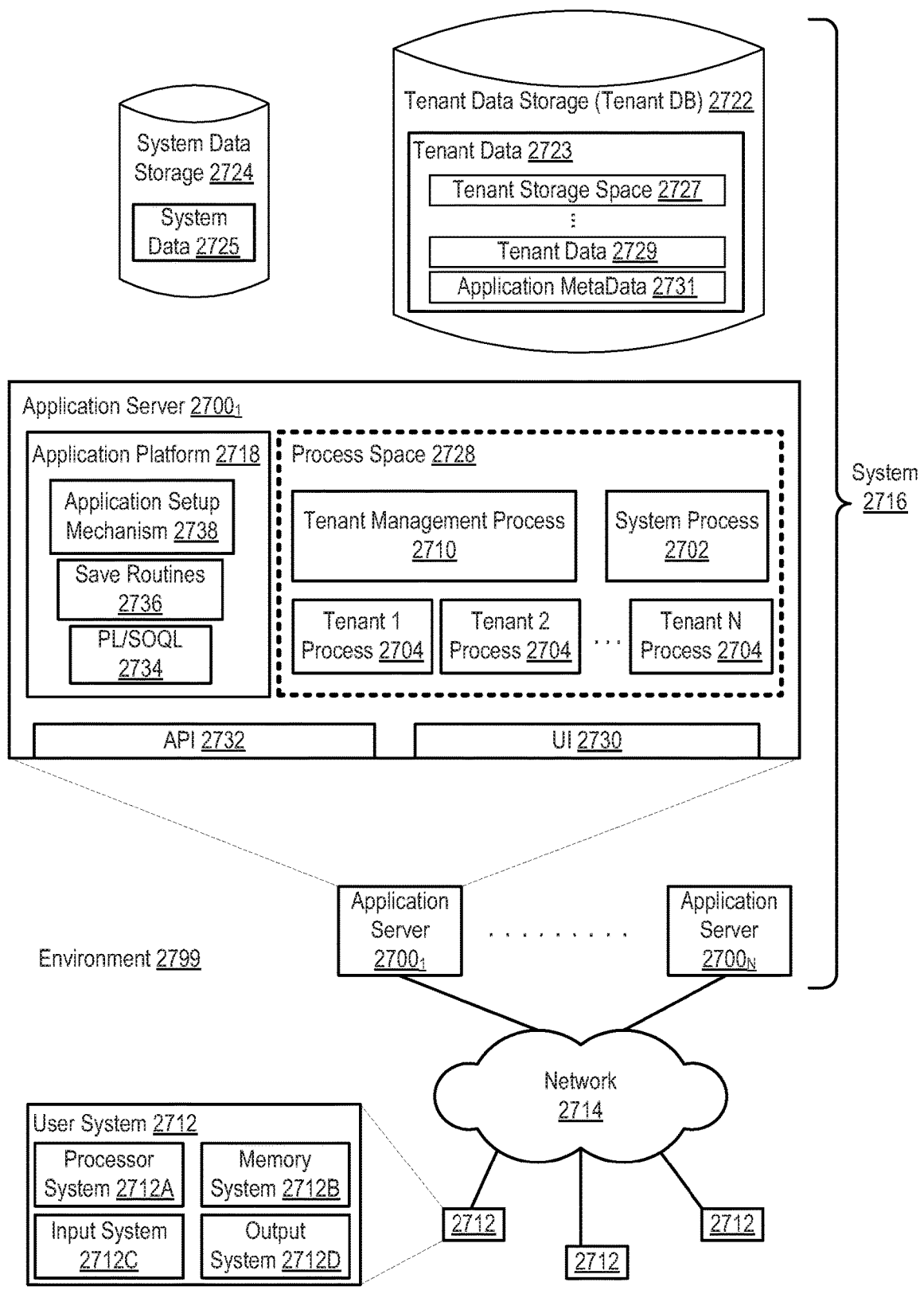
FIG. 27B illustrates another block diagram of an embodiment of elements of FIG. 27A and various possible interconnections between such elements in accordance with the described embodiments.

FIG. 27B illustrates another block diagram of an embodiment of elements of FIG. 27A and various possible interconnections between such elements in accordance with the described embodiments. FIG. 27B also illustrates environment 2799. However, in FIG. 27B, the elements of system 2716 and various interconnections in an embodiment are illustrated in further detail. More particularly, FIG. 27B shows that user system 2712 may include a processor system 2712A, memory system 2712B, input system 2712C, and output system 2712D. FIG. 27B shows network 2714 and system 2716. FIG. 27B also shows that system 2716 may include tenant data storage 2722, having therein tenant data 2723, which includes, for example, tenant storage space 2727, tenant data 2729, and application metadata 2731. System data storage 2724 is depicted as having therein system data 2725. Further depicted within the expanded detail of application servers $2700_{1-N}$ are User Interface (UI)

2730, Application Program Interface (API) 2732, application platform 2718 includes PL/SOQL 2734, save routines 2736, application setup mechanism 2738, process space 2728 includes system process space 2702, tenant 1-N process spaces 2704, and tenant management process space 2710. In other embodiments, environment 2799 may not have the same elements as those listed above and/or may have other elements instead of, or in addition to, those listed above.

User system 2712, network 2714, system 2716, tenant data storage 2722, and system data storage 2724 were discussed above in FIG. 27A. As shown by FIG. 27B, system 2716 may include a network interface 2720 (of FIG. 27A) implemented as a set of HTTP application servers 2700, an application platform 2718, tenant data storage 2722, and system data storage 2724. Also shown is system process space 2702, including individual tenant process spaces 2704 and a tenant management process space 2710. Each application server 2700 may be configured to tenant data storage 2722 and the tenant data 2723 therein, and system data storage 2724 and the system data 2725 therein to serve requests of user systems 2712. The tenant data 2723 might be divided into individual tenant storage areas (e.g., tenant storage space 2727), which can be either a physical arrangement and/or a logical arrangement of data. Within each tenant storage space 2727, tenant data 2729, and application metadata 2731 might be similarly allocated for each user. For example, a copy of a user's most recently used (MRU) items might be stored to tenant data 2729. Similarly, a copy of MRU items for an entire organization that is a tenant might be stored to tenant storage space 2727. A UI 2730 provides a user interface and an API 2732 provides an application programmer interface into system 2716 resident processes to users and/or developers at user systems 2712. The tenant data and the system data may be stored in various databases, such as one or more Oracle™ databases.

Application platform 2718 includes an application setup mechanism 2738 that supports application developers' creation and management of applications, which may be saved as metadata into tenant data storage 2722 by save routines 2736 for execution by subscribers as one or more tenant process spaces 2704 managed by tenant management process space 2710 for example. Invocations to such applications may be coded using PL/SOQL 2734 that provides a programming language style interface extension to API 2732. Invocations to applications may be detected by one or more system processes, which manages retrieving application metadata 2731 for the subscriber making the invocation and executing the metadata as an application in a virtual machine.

Each application server 2700 may be communicably coupled to database systems, e.g., having access to system data 2725 and tenant data 2723, via a different network connection. For example, one application server 2700$_1$ might be coupled via the network 2714 (e.g., the Internet), another application server 2700$_{N-1}$ might be coupled via a direct network link, and another application server 2700$_N$ might be coupled by yet a different network connection. Transfer Control Protocol and Internet Protocol (TCP/IP) are typical protocols for communicating between application servers 2700 and the database system. However, it will be apparent to one skilled in the art that other transport protocols may be used to optimize the system depending on the network interconnect used.

In certain embodiments, each application server 2700 is configured to handle requests for any user associated with any organization that is a tenant. Because it is desirable to be able to add and remove application servers from the server pool at any time for any reason, there is preferably no server affinity for a user and/or organization to a specific application server 2700. In one embodiment, therefore, an interface system implementing a load balancing function (e.g., an F5 Big-IP load balancer) is communicably coupled between the application servers 2700 and the user systems 2712 to distribute requests to the application servers 2700. In one embodiment, the load balancer uses a least connections algorithm to route user requests to the application servers 2700. Other examples of load balancing algorithms, such as round robin and observed response time, also can be used. For example, in certain embodiments, three consecutive requests from the same user may hit three different application servers 2700, and three requests from different users may hit the same application server 2700. In this manner, system 2716 is multi-tenant, in which system 2716 handles storage of, and access to, different objects, data and applications across disparate users and organizations.

As an example of storage, one tenant might be a company that employs a sales force where each salesperson uses system 2716 to manage their sales process. Thus, a user might maintain contact data, leads data, customer follow-up data, performance data, goals and progress data, etc., all applicable to that user's personal sales process (e.g., in tenant data storage 2722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2716 might also maintain system level data usable by multiple tenants or other data. Such system level data might include industry reports, news, postings, and the like that are sharable among tenants.

In certain embodiments, user systems 2712 (which may be client systems) communicate with application servers 2700 to request and update system-level and tenant-level data from system 2716 that may require sending one or more queries to tenant data storage 2722 and/or system data storage 2724. System 2716 (e.g., an application server 2700 in system 2716) automatically generates one or more SQL statements (e.g., one or more SQL queries) that are designed to access the desired information. System data storage 2724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 28 illustrates a diagrammatic representation of a machine 2800 in the exemplary form of a computer system, in accordance with one embodiment, within which a set of instructions, for causing the machine/computer system 2800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 2800 includes a processor 2802, a main memory 2804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 2818 (e.g., a persistent storage device including hard disk drives and a persistent database and/or a multi-tenant database implementation), which communicate with each other via a bus 2830. Main memory 2804 includes machine learning models 2824 and a database 2823 to store predictive engine variants, transactions, customer data, etc. Additionally depicted here is main memory 2804 which includes training input data 2825 for use with training the machine learning models 2824 in accordance with the embodiments described herein. Main memory 2804 and its sub-elements are operable in conjunction with processing logic 2826 and processor 2802 to perform the methodologies discussed herein.

Processor 2802 represents one or more general-purpose processing devices such as a microprocessor, central processing unit, or the like. More particularly, the processor 2802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 2802 may also be one or more special-purpose processing devices such as an application specific integrated circuit (ASIC), a field programmable gate array (FPGA), a digital signal processor (DSP), network processor, or the like. Processor 2802 is configured to execute the processing logic 2826 for performing the operations and functionality which is discussed herein.

The computer system 2800 may further include a network interface card 2808. The computer system 2800 also may include a user interface 2810 (such as a video display unit, a liquid crystal display, etc.), an alphanumeric input device 2812 (e.g., a keyboard), a cursor control device 2814 (e.g., a mouse), and a signal generation device 2816 (e.g., an integrated speaker). The computer system 2800 may further include peripheral device 2836 (e.g., wireless or wired communication devices, memory devices, storage devices, audio processing devices, video processing devices, etc.).

The secondary memory 2818 may include a non-transitory machine-readable storage medium or a non-transitory computer readable storage medium or a non-transitory machine-accessible storage medium 2831 on which is stored one or more sets of instructions (e.g., software 2822) embodying any one or more of the methodologies or functions described herein. The software 2822 may also reside, completely or at least partially, within the main memory 2804 and/or within the processor 2802 during execution thereof by the computer system 2800, the main memory 2804 and the processor 2802 also constituting machine-readable storage media. The software 2822 may further be transmitted or received over a network 2820 via the network interface card 2808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a machine learning platform having at least a processor and a memory therein, wherein the method comprises:

receiving training data as input at the machine learning platform, wherein the training data includes multiple transactions, each of the transactions specifying a plurality of features upon which to make a prediction and a label representing a correct answer for the plurality of features according to each respective transaction;

specifying a model to be trained by the machine learning platform using the training data, wherein the model includes a plurality of algorithms and source code;

generating a new predictive engine variant by training the model to algorithmically arrive upon the label representing the correct answer as provided with the training data based on the plurality of features for each of the multiple transactions;

versioning the new predictive engine variant based on: (i) the time the new predictive engine variant was generated, (ii) a version of the source code utilized within the model, and (iii) the training data received as input;

deploying the new predictive engine variant into a production environment to replace a prior version of the predictive engine variant;

receiving a replay request;

replaying performance of the deployed new predictive engine variant; and rolling back the new predictive engine variant from the production environment to a specified version which is less than a version of the new predictive engine variant.

2. The method of claim 1, wherein rolling back the new predictive engine variant comprises rolling back to a specified version identifier.

3. The method of claim 1, wherein rolling back the new predictive engine variant comprises rolling back to a version of the predictive engine variant having been created by training the model utilizing training data corresponding to a specified date range.

4. The method of claim 1:
wherein deploying the new predictive engine variant into a production environment comprises exposing the new predictive engine variant at a query interface; and
wherein the method further comprises:
receiving a query directed toward the new predictive engine variant having been deployed into the production environment, wherein the query requests a prediction from the new predictive engine variant;
wherein the query specifies a plurality of features; and
returning from the new predictive engine variant in response to the query, a label representing a predicted correct answer based on the features specified with the query.

5. The method of claim 1, wherein deploying the new predictive engine variant into a production environment comprises rendering predictive results as output from the new predictive engine variant, wherein the predictive results yield labels as output from the new predictive engine variant based on a plurality of never before seen features provided as input to the new predictive engine variant.

6. The method of claim 1, wherein deploying the new predictive engine variant into a production environment comprises deploying a latest trained model into production; and
wherein rolling back the new predictive engine variant from the production environment comprises downrevving the latest trained model by re-deploying a prior trained model from a source code repository linked to the machine learning platform based on a previous_model_id corresponding to the prior trained model.

7. The method of claim 1, wherein the multiple transactions within the training data include any one or more of:
simulated transactions;
past actual user transactions;
user records;
product records;
behavioral data;
user activities data;
events data;
images;
voice data; and
text.

8. The method of claim 1, wherein the source code comprises a source code repository linked to the machine learning platform or a unique source code version within the source code repository for use in training the model.

9. The method of claim 1:
wherein the machine learning platform operates within a host organization which provides on-demand cloud computing services to a plurality of tenants;
wherein receiving the training data comprises receiving the training data as input from one of the plurality of tenants of the host organization; and
wherein the method further comprises receiving an initiation command to generate the new predictive engine variant from the one of the plurality of tenants of the host organization having provided the training data as input to the machine learning platform, wherein versioning the new predictive engine variant is based further upon the one of the plurality of tenants of the host organization from whom the training data was received and from whom the initiation command was received.

10. The method of claim 1, further comprising:
receiving as configuration input at the machine learning platform any one or more of:
one or more engine parameters for tuning the machine learning platform;
one or more algorithmic parameters for tuning algorithms utilized by the machine learning platform;
one or more hyperparameters specifying data sources for training the machine learning platform, algorithms utilized by the machine learning platform, business logic parameters utilized by the machine learning platform, and/or data inputs to individual algorithms utilized by the machine learning platform; and
one or more prediction engine level comparisons for use by the machine learning platform.

11. The method of claim 10, wherein the configuration input received by the machine learning platform includes the specification of the configuration to alter generated prediction engine variants according to developer specification or according to developer selectable templates with changeable default values or according to automatically generated default configuration parameters provided by the machine learning platform.

12. The method of claim 1, further comprising:
receiving as configuration input at the machine learning platform any one or more of:
one or more algorithmic tuning parameters;
additional selection of data sources for use as training data input;
additional algorithms; and
one or more business rules to be observed by the machine learning platform when training the prediction engine.

13. The method of claim 1, wherein the prediction output from the machine learning platform specifies a set of multiple item IDs, a set of recommended item IDs, a set of product IDs indicated as being predictively similar to input product IDs, one or more numerical scores returned responsive to a query and/or non-numerical criteria returned as the prediction output responsive to a query.

14. A method performed by a machine learning platform having at least a processor and a memory therein, wherein the method comprises:
   receiving training data as input at the machine learning platform, wherein the training data includes multiple transactions, each of the transactions specifying a plurality of features upon which to make a prediction and a label representing a correct answer for the plurality of features according to each respective transaction;
   specifying a model to be trained by the machine learning platform using the training data, wherein the model includes a plurality of algorithms and source code;
   generating a new predictive engine variant by training the model to algorithmically arrive upon the label representing the correct answer as provided with the training data based on the plurality of features for each of the multiple transactions;
   versioning the new predictive engine variant based on: (i) the time the new predictive engine variant was generated, (ii) a version of the source code utilized within the model, and (iii) the training data received as input;
   deploying the new predictive engine variant into a production environment to replace a prior version of the predictive engine variant;
   rolling back the new predictive engine variant from the production environment to a specified version which is less than a version of the new predictive engine variant;
   wherein the machine learning platform operates within a host organization which provides on-demand cloud computing services to a plurality of tenants; and
   wherein receiving the training data comprises receiving the training data as input from one of the plurality of tenants of the host organization.

15. The method of claim 14, further comprising:
   receiving an initiation command to generate the new predictive engine variant from the one of the plurality of tenants of the host organization having provided the training data as input to the machine learning platform; and
   wherein versioning the new predictive engine variant is based further upon the one of the plurality of tenants of the host organization from whom the training data was received and from whom the initiation command was received.

16. A method performed by a machine learning platform having at least a processor and a memory therein, wherein the method comprises:
   receiving training data as input at the machine learning platform, wherein the training data includes multiple transactions, each of the transactions specifying a plurality of features upon which to make a prediction and a label representing a correct answer for the plurality of features according to each respective transaction;
   specifying a model to be trained by the machine learning platform using the training data, wherein the model includes a plurality of algorithms and source code;
   generating a new predictive engine variant by training the model to algorithmically arrive upon the label representing the correct answer as provided with the training data based on the plurality of features for each of the multiple transactions;
   versioning the new predictive engine variant based on: (i) the time the new predictive engine variant was generated, (ii) a version of the source code utilized within the model, and (iii) the training data received as input;
   deploying the new predictive engine variant into a production environment to replace a prior version of the predictive engine variant;
   rolling back the new predictive engine variant from the production environment to a specified version which is less than a version of the new predictive engine variant; and
   wherein the input comprises an alphanumerical string representing all or part of a paragraph of free form text input from a user and a classification indicating whether the alphanumerical string corresponds to a customer complaint, a customer suggestion, or a customer compliment.

17. Non-transitory computer readable storage media having instructions stored thereupon that, when executed by a processor and memory of a machine learning platform, the instructions cause the machine learning platform to perform operations including:
   receiving training data as input at the machine learning platform, wherein the training data includes multiple transactions, each of the transactions specifying a plurality of features upon which to make a prediction and a label representing a correct answer for the plurality of features according to each respective transaction;
   specifying a model to be trained by the machine learning platform using the training data, wherein the model includes a plurality of algorithms and source code;
   generating a new predictive engine variant by training the model to algorithmically arrive upon the label representing the correct answer as provided with the training data based on the plurality of features for each of the multiple transactions;
   versioning the new predictive engine variant based on: (i) the time the new predictive engine variant was generated, (ii) a version of the source code utilized within the model, and (iii) the training data received as input;
   deploying the new predictive engine variant into a production environment to replace a prior version of the predictive engine variant;
   receiving a replay request;
   replaying performance of the deployed new predictive engine variant; and
   rolling back the new predictive engine variant from the production environment to a specified version which is less than a version of the new predictive engine variant.

18. The non-transitory computer readable storage media of claim 17, wherein rolling back the new predictive engine variant comprises rolling back to a specified version identifier.

19. The non-transitory computer readable storage media of claim 17, wherein rolling back the new predictive engine variant comprises rolling back to a version of the predictive engine variant having been created by training the model utilizing training data corresponding to a specified date range.

20. The non-transitory computer readable storage media of claim 17:
   wherein deploying the new predictive engine variant into a production environment comprises exposing the new predictive engine variant at a query interface; and
   wherein the instructions, when executed by the processor and the memory, cause the machine learning platform to perform additional operations including:

receiving a query directed toward the new predictive engine variant having been deployed into the production environment, wherein the query requests a prediction from the new predictive engine variant;

wherein the query specifies a plurality of features; and returning from the new predictive engine variant in response to the query, a label representing a predicted correct answer based on the features specified with the query.

21. A machine learning platform comprising:

a memory to store instructions;

a processor to execute instructions;

a receive interface to receive training data as input at the machine learning platform, wherein the training data includes multiple transactions, each of the transactions specifying a plurality of features upon which to make a prediction and a label representing a correct answer for the plurality of features according to each respective transaction;

the receive interface to receive a specified model to be trained by the machine learning platform using the training data, wherein the model includes a plurality of algorithms and source code;

a predictive engine generator to generate a new predictive engine variant by training the model to algorithmically arrive upon the label representing the correct answer as provided with the training data based on the plurality of features for each of the multiple transactions;

a versioning system interfaced with the machine learning platform to version the new predictive engine variant based on: (i) the time the new predictive engine variant was generated, (ii) a version of the source code utilized within the model, and (iii) the training data received as input;

a deployment platform to deploy the new predictive engine variant into a production environment to replace a prior version of the predictive engine variant;

the receive interface to further receive a replay request;

wherein the system is to replay a performance of the deployed new predictive engine variant; and the deployment platform to roll back the new predictive engine variant from the production environment to a specified version maintained by the versioning system which is less than a version of the new predictive engine variant.

22. The machine learning platform of claim 21, wherein the deployment platform to roll back the new predictive engine variant comprises the deployment platform to roll back to a specified version identifier.

23. The machine learning platform of claim 21, wherein the deployment platform to roll back the new predictive engine variant comprises the deployment platform to roll back the new predictive engine variant to version of the predictive engine variant created by training the model utilizing training data corresponding to a specified date range.

24. The machine learning platform of claim 21:

wherein the deployment platform to deploy the new predictive engine variant into a production environment comprises the deployment platform to expose the new predictive engine variant at a query interface; and wherein the machine learning platform further comprises a request interface to receive a query directed toward the new predictive engine variant having been deployed into the production environment, wherein the query requests a prediction from the new predictive engine variant, the query specifying a plurality of features; and wherein the machine learning platform further comprises a query interface to return from the new predictive engine variant in response to the query, a label representing a predicted correct answer based on the features specified with the query.

25. The machine learning platform of claim 21, further comprising a query interface to render predictive results as output from the new predictive engine variant, wherein the predictive results yield labels as output from the new predictive engine variant based on a plurality of never before seen features provided as input to the new predictive engine variant.

* * * * *